United States Patent
Vastrad et al.

(10) Patent No.: US 11,614,883 B2
(45) Date of Patent: *Mar. 28, 2023

(54) DISTRIBUTED DATA STORAGE SYSTEM USING ERASURE CODING ON STORAGE NODES FEWER THAN DATA PLUS PARITY FRAGMENTS

(71) Applicant: Commvault Systems, Inc., Tinton Falls, NJ (US)

(72) Inventors: Anand Vishwanath Vastrad, Santa Clara, CA (US); Avinash Lakshman, Fremont, CA (US); Suhani Gupta, Milpitas, CA (US); Srinivas Lakshman, San Jose, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,103

(22) Filed: Jun. 1, 2021

(65) Prior Publication Data

US 2022/0019372 A1 Jan. 20, 2022

Related U.S. Application Data

(60) Provisional application No. 63/053,414, filed on Jul. 17, 2020, provisional application No. 63/065,722, filed on Aug. 14, 2020.

(51) Int. Cl.
*G06F 3/06* (2006.01)

(52) U.S. Cl.
CPC .......... *G06F 3/0655* (2013.01); *G06F 3/0604* (2013.01); *G06F 3/064* (2013.01);
(Continued)

(58) Field of Classification Search
CPC ...... G06F 3/0655; G06F 3/0604; G06F 3/067; G06F 3/0652; G06F 3/0619; G06F 3/064; G06F 3/065; G06F 3/0664
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Gupta, et al., U.S. Appl. No. 17/336,081 Published as 2022/0019355A1, filed Jun. 1, 2021, Healing Failed Erasure-Coded Write Attempts in a Distributed Data Storage System Configured With Fewer Storage Nodes Than Data Plus Parity Fragments.

(Continued)

*Primary Examiner* — Mark A Giardino, Jr.
(74) *Attorney, Agent, or Firm* — Commvault Systems, Inc.

(57) ABSTRACT

A distributed data storage system using erasure coding (EC) provides advantages of EC data storage while retaining high resiliency for EC data storage architectures having fewer data storage nodes than the number of EC data-plus-parity fragments. An illustrative embodiment is a three-node data storage system with EC 4+2. Incoming data is temporarily replicated to ameliorate the effects of certain storage node outages or fatal disk failures, so that read and write operations can continue from/to the storage system. The system is equipped to automatically heal failed EC write attempts in a manner transparent to users and/or applications: when all storage nodes are operational, the distributed data storage (Continued)

system automatically converts the temporarily replicated data to EC storage and reclaims storage space previously used by the temporarily replicated data. Individual hardware failures are healed through migration techniques that reconstruct and re-fragment data blocks according to the governing EC scheme.

20 Claims, 24 Drawing Sheets

(52) U.S. Cl.
CPC .............. *G06F 3/065* (2013.01); *G06F 3/067* (2013.01); *G06F 3/0619* (2013.01); *G06F 3/0652* (2013.01); *G06F 3/0664* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,954,446 B2 | 2/2015 | Vijayan Retnamma et al. |
| 9,020,900 B2 | 4/2015 | Vijayan Retnamma et al. |
| 9,098,495 B2 | 8/2015 | Gokhale |
| 9,239,687 B2 | 1/2016 | Vijayan et al. |
| 9,411,534 B2 | 8/2016 | Lakshman et al. |
| 9,424,151 B2 | 8/2016 | Lakshman et al. |
| 9,483,205 B2 | 11/2016 | Lakshman et al. |
| 9,558,085 B2 | 1/2017 | Lakshman |
| 9,633,033 B2 | 4/2017 | Vijayan et al. |
| 9,639,274 B2 | 5/2017 | Maranna et al. |
| 9,798,489 B2 | 10/2017 | Lakshman et al. |
| 9,864,530 B2 | 1/2018 | Lakshman |
| 9,875,063 B2 | 1/2018 | Lakshman |
| 10,067,722 B2 | 9/2018 | Lakshman |
| 10,248,174 B2 | 4/2019 | Lakshman et al. |
| 10,691,187 B2 | 6/2020 | Lakshman et al. |
| 10,740,300 B1 | 8/2020 | Lakshman et al. |
| 10,795,577 B2 | 10/2020 | Lakshman et al. |
| 10,846,024 B2 | 11/2020 | Lakshman et al. |
| 10,848,468 B1 | 11/2020 | Lakshman et al. |
| 11,314,687 B2 | 4/2022 | Kavaipatti Anantharamakrishnan et al. |
| 11,347,590 B1 * | 5/2022 | Resch ................. G06F 11/0727 |
| 2006/0224846 A1 | 10/2006 | Amarendran et al. |
| 2009/0319534 A1 | 12/2009 | Gokhale |
| 2012/0150818 A1 | 6/2012 | Vijayan Retnamma et al. |
| 2012/0150826 A1 | 6/2012 | Vijayan Retnamma et al. |
| 2014/0201170 A1 | 7/2014 | Vijayan et al. |
| 2016/0188218 A1 | 6/2016 | Gray et al. |
| 2016/0350302 A1 | 12/2016 | Lakshman |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0349043 A1 * | 12/2018 | Eda ....................... G06F 3/0619 |
| 2019/0114094 A1 * | 4/2019 | Ki ......................... G06F 3/0652 |
| 2021/0208782 A1 * | 7/2021 | Zhu ..................... H03M 13/373 |
| 2022/0019355 A1 | 1/2022 | Gupta et al. |
| 2022/0066669 A1 | 3/2022 | Naik et al. |
| 2022/0100618 A1 | 3/2022 | Jain et al. |
| 2022/0103622 A1 | 3/2022 | Camargos et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |

(56) References Cited

FOREIGN PATENT DOCUMENTS

| WO | WO 2006/052872 | 5/2006 |
|---|---|---|
| WO | WO 2016/004120 | 7/2016 |

OTHER PUBLICATIONS

Hedvig distributed storage platform technical and architectural overview white paper—Executive Overview, dated Jul. 6, 2020, in 40 pages (https://www.commvault.com/resources/hedvig-distributed-storage-platform-technical-and-architectural-overview-whitepaper).

Commvault HyperScale™ Appliance 3300—Technical Specifications, dated Jul. 6, 2020, in 12 pages (https://www.commvault.com/resources/commvault-hyperscale-appliance-3300-technical-specifications).

Commvault Launches HyperScale X, Marking First Portfolio Integration of Hedvig Technology, dated Jul. 21, 2020, in 10 pages (https://www.commvault.com/news/commvault-launches-hyperscale-x-marking-first-portfolio-integration-of-hedvig-technology).

Hedvig Erasure Coding Architectural Overview, copyright date listed on document is 2019, in 13 pages.

U.S. Appl. No. 17/465,683, filed Sep. 2, 2021, Camargos et al.

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

Lakshman et al., "Cassandra—A Decentralized Structured Storage System", https://doi.org/10.1145/1773912.1773922, ACM SIGOPS Operating Systems Review, vol. 44, Issue 2, Apr. 2010, pp. 35-40.

Swiftstack, Inc., The OpenStack Object Storage System, Feb. 2012, pp. 1-29.

* cited by examiner

HEALING PHASE: *Reconstruct EC Fragments For Block 2 And Block 3 And Write The Fragments To EC Vdisk*
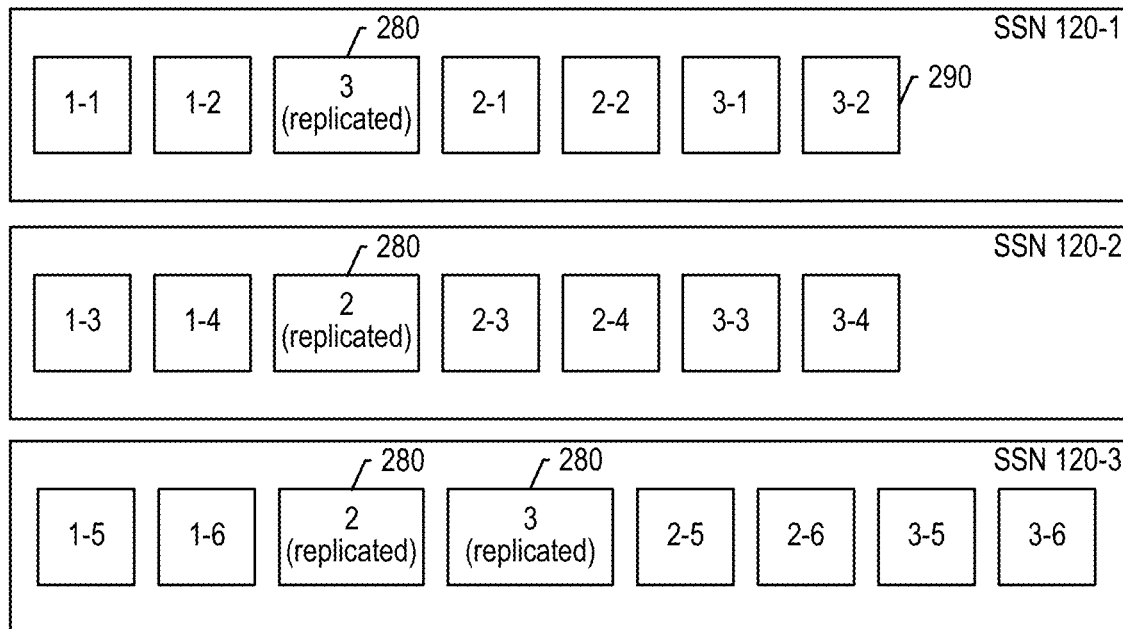
CLEAN-UP PHASE: *Delete Block 2 And Block 3 From RF3 Vdisk*
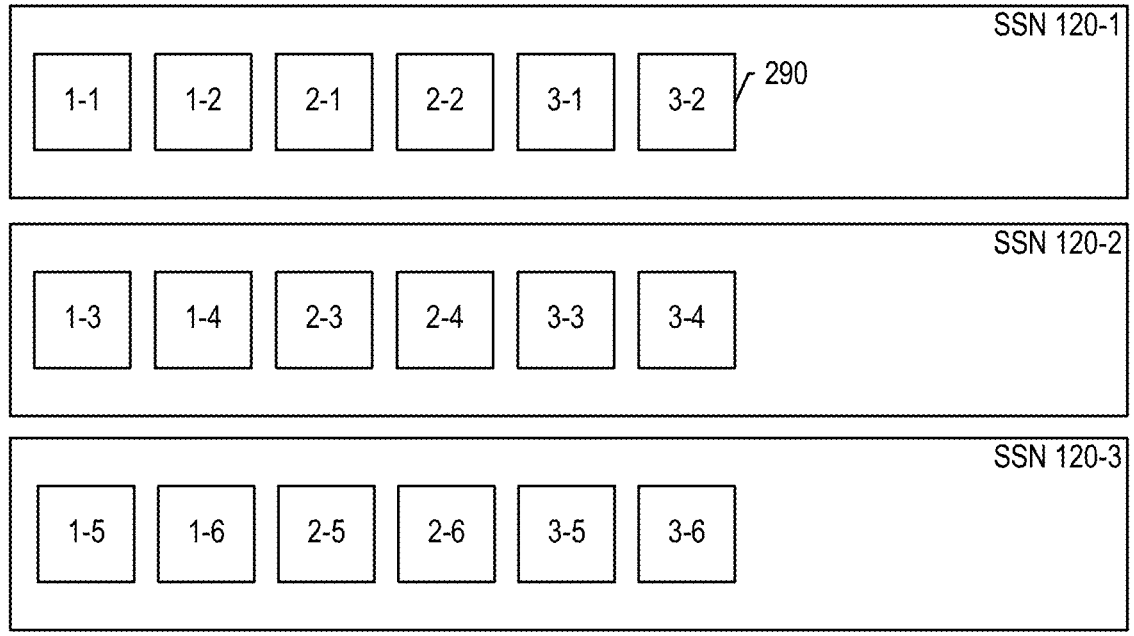
FIG. 5D

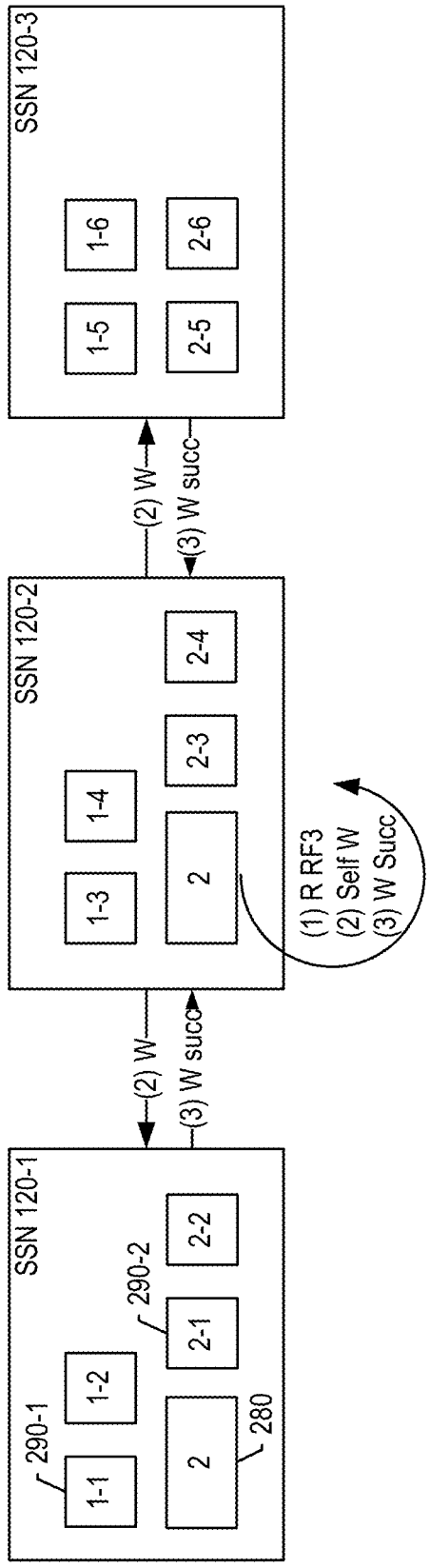
FIG. 7A HEALING PHASE: Reconstruct EC Fragments For Block 2 And Write Fragments To EC Vdisk
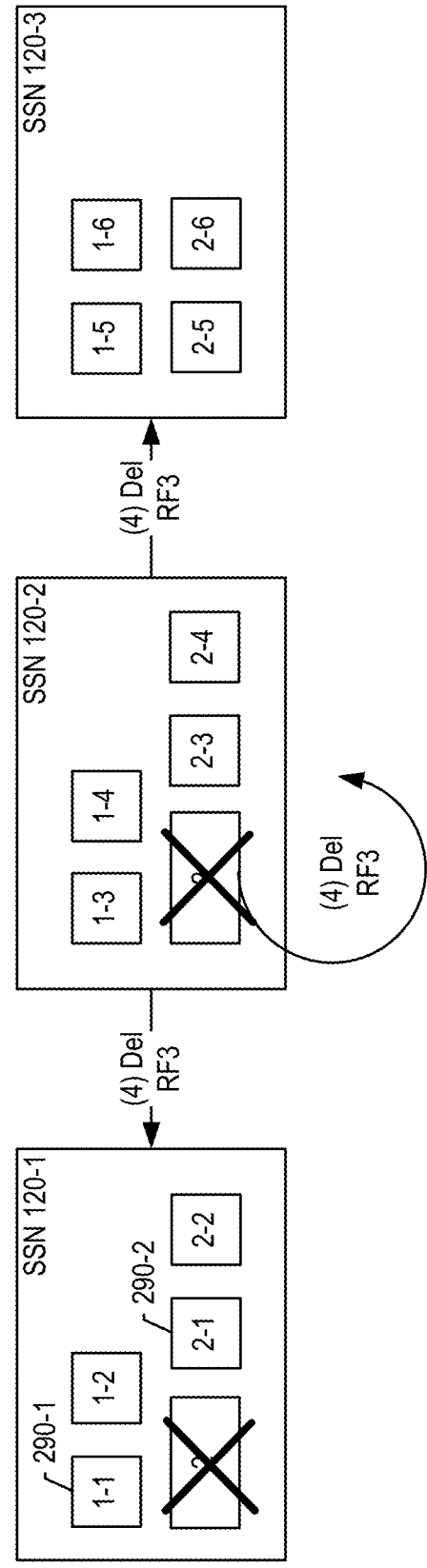
FIG. 7B CLEAN-UP PHASE: Delete Unfragmented Block 2

DISTRIBUTED DATA STORAGE SYSTEM USING ERASURE CODING ON STORAGE NODES FEWER THAN DATA PLUS PARITY FRAGMENTS

INCORPORATION BY REFERENCE TO ANY PRIORITY APPLICATIONS

This application claims the benefit of priority to U.S. Provisional Application No. 63/053,414 filed on Jul. 17, 2020 and U.S. Provisional Application No. 63/065,722 filed on Aug. 14, 2020. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Erasure coding (EC) techniques used for data storage significantly reduce the amount of storage needed as compared to replicated storage. However, EC-configured data storage systems that have a limited number of data storage nodes, for example fewer than the EC-based data-plus-parity count ("EC-count"), can experience loss of service and even data loss when data storage nodes fail. During node failure conditions, there may not be enough EC fragments available to reconstruct the EC data on Reads and not enough storage nodes available to distribute the EC fragments on Writes. These deficiencies diminish the advantages of storage savings that EC provides. Therefore, a solution is needed that enables an EC storage infrastructure with fewer than data-plus-parity storage nodes to successfully withstand node failures, intermittent down time, and/or maintenance outages.

SUMMARY

The present inventors devised a technological solution that provides the many advantages of EC data storage while retaining high resiliency for EC data storage architectures having fewer data storage nodes than the number of EC data-plus-parity fragments, i.e., fewer storage nodes than the EC-count. For example, the illustrative solution as applied to a three-node data storage platform with EC 4+2 can withstand repeated storage failures. Some of the embodiments described here use a three-node storage configuration and EC 4+2 as illustrative examples, but the invention is not so limited. Therefore, after reading the present disclosure, a person having ordinary skill in the art will be able to apply the disclosed techniques and technologies to other configurations.

An illustrative distributed data storage system has three nodes that provide the data storage resources for the platform. The data storage nodes are referred to collectively as a storage cluster. EC 4+2 (four data fragments plus two parity fragments) is configured within the system as a storage preference, making an EC-count of six (6). Thus, the data storage system has fewer storage nodes than the EC-count of six. Illustratively, the storage nodes are configured in a data storage appliance. The system comprises features for failure handling, resiliency, resource migration, data healing, and space reclamation. These features maximize the use of EC throughout the system while also ensuring a high level of resiliency and fault tolerance. In some configurations, EC is configured at the virtual disk level rather than system-wide.

A storage proxy, which is a component of the distributed data storage system, is interposed between client applications and the data storage appliance. Unbeknownst to the client applications, the storage proxy intercepts write and read requests addressed to the storage cluster of the appliance. The storage proxy operates as a controller virtual machine (VM), as a software container (e.g., Docker), or as a software program on bare metal, depending on different configurations at the data source. The storage proxy masquerades to the client applications as an iSCSI target, NFS server, and/or cloud storage resource (e.g., Amazon S3, etc.). The storage proxy handles some of the logic involved in processing reads and writes in the system, including managing reads and writes during EC failure conditions. The storage proxy creates or constructs or defines a so-called "EC virtual disk" or "EC vdisk" within the storage system. The EC vdisk is a virtual disk, not one of the physical disks in the storage cluster, and is an internal construct that is not made visible to the client applications. The client applications lack awareness of EC storage configurations, failure handling, storage pool migration, data healing, and space reclamation, as these features remain within the scope of the illustrative distributed data storage system. Unless there is a catastrophic failure in the storage cluster (e.g., two nodes failed out of three), the illustrative distributed data storage system continues to service reads and writes to/from the client applications.

The storage proxy is configured to make multiple attempts to write a data block intercepted from a client application. This aspect provides substantial resiliency. On receiving a data block in a write request from a client application, the storage proxy generates a write request to one of the storage nodes. The write request indicates that the data block is to be stored with EC properties, since the system or the target user virtual disk is EC-configured. Logic operating at the receiving storage node applies EC to the data block, which for the illustrative 4+2 EC scheme results in six EC fragments. The receiving storage node transmits (or distributes) distinct pairs of EC fragments in write requests to itself and to the other two storage nodes. To maximize storage target diversity and recoverability, the system is configured to store the six EC fragments on six different physical disks configured on the storage nodes. If all the six targeted physical disks are operational and the six EC fragments are successfully written thereto, each node reports success to the receiving node, effectively confirming six successful writes. The receiving node determines that six successful writes meet a pre-set quorum value of six (same as the EC-count) and reports success to the storage proxy. In turn, the storage proxy acknowledges to the client application that the write operation of the data block succeeded.

In an EC 4+2 system, any data block can be reconstructed or reconstituted from any four EC fragments. Thus, so long as four EC fragments can be recovered by a subsequent read, this particular data block can be read successfully from the data storage system. If any one of three nodes is down, the data block can still be read by retrieving four EC fragments from the other two storage nodes, each one hosting two distinct EC fragments.

However, if one of the three storage nodes is down, it cannot receive any writes. This is where the illustrative system initiates a robust fault handling approach that is designed to withstand node failures and still continue to accept write requests from client applications. Thus, when the receiving storage node does not receive confirmations that all six EC fragments were written, it reports a write failure to the storage proxy. The write failure may be caused by a node being down, a disk being down, and/or data communication blips. The receiving storage node may or may not be aware of the cause of the failure. On receiving the EC write failure report from the storage node, the storage proxy invokes its failure handling logic to "switch gears" from EC mode to replication mode. The purpose of switching gears here is to keep trying to write the data block to the storage cluster even after a failed EC write attempt. In some embodiments, the storage proxy is aware of node availability status, and while aware that a storage node is down, it does not attempt an EC write request and instead proceeds directly to "switch gears" from EC mode to replication mode.

In replication mode, the storage proxy creates a so-called "RF3 virtual disk" or "RF3 vdisk" within the storage system. The RF3 vdisk is a virtual disk, not one of the physical disks in the storage cluster. The RF3 vdisk is defined with a replication factor of three (RF3). The data storage system treats RF3 data differently from EC data, by fully replicating RF3 data blocks rather than coding them into EC fragments. The RF3 vdisk remains internal to the illustrative system and is never exposed to client applications, which always read from and write to their pre-configured storage targets (i.e., exposed virtual disks configured for EC a/k/a user vdisks) via the storage proxy. Rather, the RF3 vdisk is an alternative storage repository for the data block that failed to be written in its six-fragment EC format.

After creating the RF3 vdisk, the storage proxy sends a new write request with the unfragmented data block to a storage node, but instead of specifying EC properties, the storage proxy now specifies RF3 properties (i.e., replication) and names the RF3 vdisk as the destination for writing the data block. The receiving storage node now issues a write request that comprises the unfragmented data block and sends it as a replication write request to all three storage nodes (including itself) so that the data block may be replicated in its unfragmented form three times according to the RF3 factor. If one of the nodes is still down, the data block will not be written there. However, if the data block is successfully written to two storage nodes, they will both report success to the receiving node (including itself). The receiving node determines that two successful writes meet a pre-set quorum value of two for replicated writes and reports success to the storage proxy. In turn, the storage proxy responds to the client application with an acknowledgement that the data block was written successfully. In some embodiments, if the receiving storage node is aware that another storage node is down, it does not even attempt to transmit the data block thereto and relies on write acknowledgments from itself and the remaining storage node to determine whether the pre-set quorum value of two has been met. At this point, the unfragmented data block is stored in its entirety at a minimum of two different nodes in the storage system. Later, so long as one of these two nodes is accessible, this particular data block can be read successfully from the data storage system.

If the receiving storage node receives fewer than two confirmations that the unfragmented block was written, it reports write failure to the storage proxy. The write failure may be caused by a second node being down, a targeted storage pool disk being down, and/or data communication blips. The receiving node may or may not be aware of the cause of the failure. On receiving the RF3 write failure report from the storage node, the storage proxy invokes its failure handling logic to try again to write the unfragmented block to the RF3 vdisk. The storage proxy re-tries to allow for transient failures to pass. If all the re-tries fail, the storage proxy will finally report failure to the client application. Such a situation should rarely occur, and only when two storage nodes are unavailable or inaccessible for a substantial period.

The storage system tracks (e.g., in its metadata subsystem) where the data block can be found in the RF3 vdisk; and additionally tracks the failure of the original EC write attempt, i.e., the fact that the data block is not stored in the original targeted EC vdisk. This tracking information is used for serving reads from the RF3 disk and is also used later in EC data healing.

Thus, if one of the write attempts succeeds, the data block is written either as six EC fragments distributed across three nodes or as at least two unfragmented instances distributed across at least two nodes. This is one of the key tenets of the inventors' approach in this illustrative EC 4+2 three-node system: never store only one instance of an unfragmented data block or fewer than six (EC-count) EC fragments. This enables the illustrative system to continue operating with as many as two fatally failed disks (i.e., where data is irrecoverable). The illustrative system can also withstand temporary single-node outages, including rolling single-node outages from time to time. In such distress scenarios, the data block can be reconstructed from as few as four EC fragments or can be read unfragmented from one of two storage nodes.

After the failed storage node or disk is once again operational, EC write requests immediately resume in order to maximize the storage savings that issue from EC techniques. The unfragmented data blocks in the RF3 vdisk(s) remain there until they are managed by a healing process that converts them into EC fragments.

Each storage node runs a periodic data healing process. The healing process determines from the metadata subsystem that there are data blocks that should have been written to EC vdisks, but were written instead to corresponding RF3 vdisks. Each storage node runs the healing process on RF3 vdisks that it "owns" as defined in the metadata. The healing process reads each unfragmented data block from the RF3 vdisk, applies EC to generate EC fragments, and issues EC write requests to itself and to the other two storage nodes as described above. If successful, the EC write requests populate the EC fragments to different physical disks across the three storage nodes, thus healing the data, i.e., storing the data block in EC fragments according to the EC preferences for the system. When all unfragmented data blocks in an RF3 vdisk have been healed, the RF3 vdisk is marked for deletion. The healing process updates the metadata accordingly to indicate which particular data blocks were healed. When a read request is received for a healed data block, the data block is reconstructed from EC fragments and is no longer read from the RF3 vdisk. The healing process limits itself to RF3 vdisks having an epoch greater than two hours ago to ensure that there are no in-flight data blocks waiting to be written. Moreover, the healing process runs only if all storage nodes are operational in the storage system.

After the RF3 vdisk is marked for deletion, its storage space is reclaimed. A reclamation process at the storage node that "owns" the RF3 vdisk issues delete commands to itself and other storage nodes to delete the RF3 vdisk storage space and report to the system that those data storage locations are vacant. This reclamation process returns to the customer the benefits of EC storage savings, since the data blocks are no longer on the system in their unfragmented and replicated form.

When a single physical data storage resource (disk, drive) fails rather than a full storage node, the illustrative system recovers the data from other available disks and stores it to another disk on the system. This operation is referred to as storage pool migration, since storage pools are defined as single physical disks in EC configurations. Because the data is stored in EC fragments distributed on six distinct disks across three different nodes, the failure of one disk can be cured by reconstructing data blocks from four of the other physical disks. Metadata indicates which data blocks were stored on the failed disk and further indicates where to find the other EC fragments associated with each data block. Accordingly, each data block is reconstructed from four EC fragments recovered from other disks. The desired or missing EC fragment is determined from the reconstructed data block and is stored to a replacement physical disk. Data blocks residing in RF3 vdisks are excluded from storage pool migration, as they will be handled by the healing process instead.

The illustrative approach works with any kind of data from client applications. For example, client applications such as email software, database management software, office productivity software such as word processing, etc. may read and write "live" production data from/to the distributed data storage system. Alternatively or additionally, the client application may be a component of a data storage management system that generates backup copies from production data and stores the backup copies in the distributed data storage system. In such a configuration, a media agent component of the data storage management system sends read and write requests to the storage proxy, usually in reference to backup copies. Often, these backup copies are in a proprietary backup format that is distinct from a "primary data" format or native format of the original production or application data. The illustrative distributed data storage system (whether using EC on storage nodes fewer than data plus parity fragments or using replication such as RF3 vdisks) is agnostic of the type and number of client applications and is also agnostic of the kind and format of data written to and read from the system.

In sum, the present application discloses a technological improvement that enables an EC storage infrastructure with fewer than data-plus-parity storage nodes to successfully withstand node failures, intermittent down time, and/or maintenance outages, even when the system has fewer storage nodes than data plus parity fragments (EC-count). More details are given below and in the accompanying figures.

BRIEF DESCRIPTION OF THE DRAWINGS

FIG. 1BA is a block diagram illustrating an illustrative distributed data storage system configured with an appliance that comprises storage service nodes, according to an illustrative embodiment.

FIG. 5D depicts a healing process and a clean-up (space reclamation) process (that follow FIGS. 5A-5C) on the distributed data storage system, according to an illustrative embodiment.

FIGS. 7A-7B depict a healing process and a clean-up (space reclamation) process, respectively, on the distributed data storage system, according to an illustrative embodiment.

DETAILED DESCRIPTION

Figure 1A:
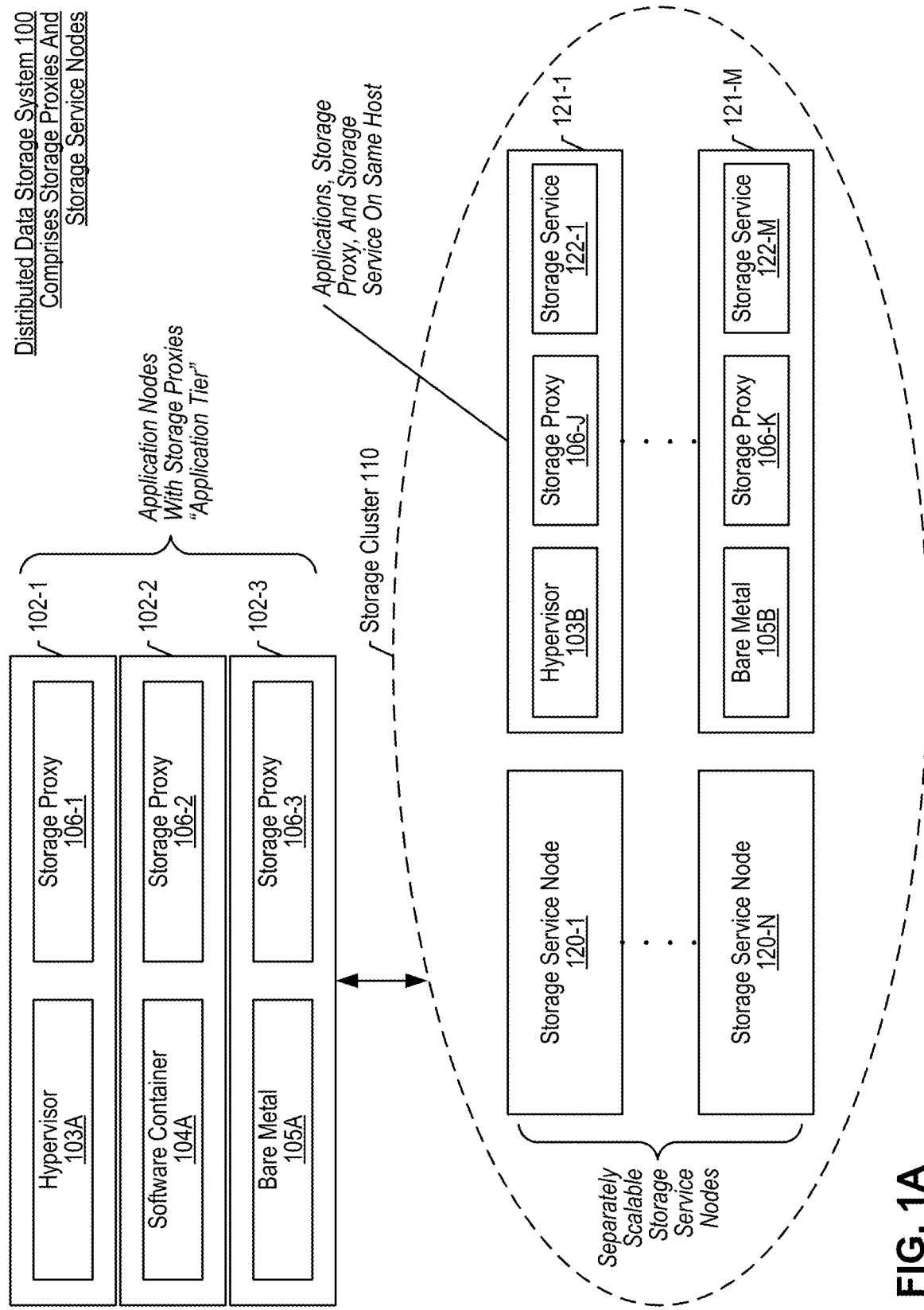
FIG. 1A is a block diagram depicting a distributed data storage system 100 according to an illustrative embodiment.

Detailed descriptions and examples of systems and methods according to one or more illustrative embodiments of the present invention may be found in the section entitled DISTRIBUTED DATA STORAGE SYSTEM USING ERASURE CODING ON STORAGE NODES FEWER THAN DATA PLUS PARITY FRAGMENTS, as well as in the section entitled Example Embodiments, and also in FIGS. 1A-8 herein. Various embodiments described herein are intimately tied to, enabled by, and would not exist except for, computer technology. For example, using erasure coding and replication as described herein in reference to various embodiments cannot reasonably be performed by humans alone, without the computer technology upon which they are implemented.

Generally, the systems and associated components described herein may be compatible with and/or provide at least some of the functionality of the systems and corresponding components described in one or more of the following U.S. patents and patent applications assigned to Commvault Systems, Inc., each of which is hereby incorporated by reference in its entirety herein.

| Title | USPTO Ser. No. | U.S. Pat. No. | Filing Date |
|---|---|---|---|
| Storage System For Provisioning And Storing Data To A Virtual Disk | 14/322,813 | 10,067,722 | Jul. 2, 2014 |
| Method For Writing Data To A Virtual Disk Using A Controller Virtual Machine And Different Storage And Communication Protocols | 14/322,832 | 9,875,063 | Jul. 2, 2014 |
| Disk Failure Recovery For Virtual Disk With Policies | 14/322,850 | 9,424,151 | Jul. 2, 2014 |
| Creating And Reverting To A Snapshot Of A Virtual Disk | 14/322,855 | 9,558,085 | Jul. 2, 2014 |
| Cloning A Virtual Disk In A Storage Platform | 14/322,867 | 9,798,489 | Jul. 2, 2014 |
| Writing To A Storage Platform Including A Plurality Of Storage Clusters | 14/322,868 | 9,483,205 | Jul. 2, 2014 |
| Time Stamp Generation For Virtual Disks | 14/322,871 | 9,411,534 | Jul. 2, 2014 |
| Method For Writing Data To Virtual Disk Using A Controller Virtual Machine And Different Storage And Communication Protocols On A Single Storage Platform | 14/684,086 | 9,864,530 | Apr. 10, 2015 |
| Dynamically Splitting A Range Of A Node In A Distributed Hash Table | 14/723,380 | Abandoned | May 27, 2015 |
| Storage System With Virtual Disks | PCT/US2015/38687 | Expired | Jun. 30, 2015 |
| Global De-Duplication Of Virtual Disks In A Storage Platform | 15/155,838 | 10,846,024 | May 16, 2016 |
| De-Duplication Of Client-Side Data Cache For Virtual Disks | 15/156,015 | 10,795,577 | May 16, 2016 |
| Persistent Reservations For Virtual Disk Using Multiple Targets | 15/163,446 | 10,248,174 | May 24, 2016 |
| Synchronization Of Metadata In A Distributed Storage System | 15/834,921 | 10,740,300 | Dec. 7, 2017 |
| In-Flight Data Encryption/Decryption For A Distributed Storage Platform | 15/912,374 | 10,848,468 | Mar. 5, 2018 |
| Persistent Reservations For Virtual Disk Using Multiple Targets | 16/274,014 | 10,691,187 | Feb. 12, 2019 |
| Distributed Data Storage System Using Erasure Coding On Storage Nodes Fewer Than Data Plus Parity Fragments | 63/053,414 | | Jul. 17, 2020 |
| Distributed Data Storage System Using Erasure Coding On Storage Nodes Fewer Than Data Plus Parity Fragments | 63/065,722 | | Aug. 14, 2020 |
| Optimized Deduplication Based On Backup Frequency In A Distributed Data Storage System | 63/070,162 | | Aug. 25, 2020 |
| Anti-Entropy-Based Metadata Recovery In A Strongly Consistent Distributed Data Storage System | 63/081,503 | | Sep. 22, 2020 |
| Commissioning And Decommissioning Metadata Nodes In A Running Distributed Data Storage System | 63/082,624 | | Sep. 24, 2020 |
| Container Data Mover For Migrating Data Between Distinct Distributed Data Storage Systems Integrated With Application Orchestrators | 63/082,631 | | Sep. 24, 2020 |

-continued

| Title | USPTO Ser. No. | U.S. Pat. No. | Filing Date |
| --- | --- | --- | --- |
| Optimized Deduplication Based On Backup Frequency In A Distributed Data Storage System | 17/153,667 | | Jan. 20, 2021 |
| Cloud-Based Distributed Data Storage System Using Block-Level Deduplication Based On Backup Frequencies Of Incoming Backup Copies | 17/153,674 | | Jan. 20, 2021 |
| Container Data Mover For Migrating Data Between Distributed Data Storage Systems Integrated With Application Orchestrators | 17/179,160 | | Feb. 18, 2021 |

Distributed Data Storage System

An example embodiment of the disclosed distributed data storage system is the Commvault Distributed Storage (f/k/a/ the Hedvig Distributed Storage Platform) now available from Commvault Systems, Inc. of Tinton Falls, N.J., USA, and thus some of the terminology herein originated with the Hedvig product line. An illustrative embodiment of a data storage management system that comprises media agents for storing backup copies at the illustrative distributed data storage system is the Commvault Complete™ Backup and Recovery software from Commvault Systems, Inc. In some embodiments, the media agent comprises or co-resides with the illustrative storage proxy. An illustrative embodiment of a data storage appliance comprising the illustrative multiple data storage nodes is the Commvault HyperScale™ appliance also from Commvault Systems, Inc., e.g., the Commvault HyperScale™ X scale-out appliance, which is integrated with Commvault's intelligent data management platform, e.g., Commvault Complete™ Backup and Recovery software.

The illustrative distributed data storage system comprises a plurality of storage service nodes that form one or more storage clusters. Data reads and writes originating from an application on an application host computing device are intercepted by a storage proxy, which is co-resident with the originating application. The storage proxy performs some pre-processing and analysis functions before making communicative contact with the storage cluster. The system ensures strong consistency of data and metadata written to the storage service nodes.

Terminology for the Distributed Data Storage System

Data and Metadata. To enhance the reader's understanding of the present disclosure, the term "metadata" is distinguished from the term "data" herein, even though both data and metadata comprise information stored on the illustrative distributed data storage system. Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "meta-metadata."

Storage Service, e.g., Hedvig Storage Service. The storage service is a software component that installs on commodity x86 or ARM servers to transform existing server and storage assets into a fully-featured elastic storage cluster. The storage service may deploy to an on-premises infrastructure, to hosted clouds, and/or to public cloud computing environments, in any combination, to create a single system that is implicitly hybrid.

Storage Service Node (or storage node), e.g., Hedvig Storage Server (HSS), comprises both computing and storage resources that collectively provide storage service. The system's storage service nodes collectively form one or more storage clusters. Multiple groups of storage service nodes may be clustered in geographically and/or logically disparate groups, e.g., different cloud computing environments, different data centers, different usage or purpose of a storage cluster, etc., without limitation, and thus the present disclosure may refer to distinct storage clusters in that context. One or more of the following storage service subsystems of the storage service may be instantiated at and may operate on a storage service node: (i) distributed fault-tolerant metadata subsystem providing metadata service, e.g., "Hedvig Pages"; (ii) distributed fault-tolerant data subsystem (or data storage subsystem) providing payload data storage, e.g., "Hedvig HBlock"; and (iii) distributed fault-tolerant pod subsystem for generating and maintaining certain system-level information, e.g., "Hedvig HPod." The system stores payload data on certain dedicated storage resources managed by the data storage subsystem, and stores metadata on other dedicated storage resources managed by the metadata subsystem. Thus, another way to distinguish payload data from metadata in the illustrative system is that payload data is stored in and maintained by the data storage subsystem and metadata is stored in and maintained by the metadata subsystem. The pod subsystem, the metadata subsystem, and the data storage subsystem are all partitioned and replicated across various storage service nodes. These subsystems operate as independent services, they need not be co-located on the same storage service node, and they may communicate with a subsystem on another storage service node as needed.

Replica. The distributed data storage system replicates data and metadata across multiple storage service nodes. A "replica" or "replica node" is a storage service node that hosts a replicated copy of data and/or metadata that is also stored on other replica nodes. Illustratively, metadata uses a replication factor of 3 (RF3), though the invention is not so limited. Thus, with a replication factor of 3, each portion of metadata is replicated on three distinct metadata nodes across the storage cluster. Data replicas and metadata replicas need not be the same nodes and can reside on distinct storage service nodes that do not overlap.

Virtual Disk ("vdisk"), Storage Container, Meta-Container, and inode. The virtual disk is the unit of storage made visible by system 100 to applications and/or application nodes. Because the virtual disk is administered or configured by users or administrators, we refer to such visible virtual disks as "user virtual disks." In contrast, the data storage system maintains other virtual disks as internal resources, but their identities are not visible to users or to the applications that write to the system. Unless otherwise noted, references to virtual disks herein refer to user virtual disks. Every virtual disk provisioned on the system is partitioned into fixed size chunks, each of which is called a storage container or backing container (e.g., 16 GB in size). Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, virtual disks are distributed and fault-tolerant. Any incoming read or write request arriving at the storage proxy is addressed to a virtual disk, block offset, and length. Based on the block offset and length, the storage proxy maps the request to the corresponding storage container. Additionally, reads and writes also identify a target data file to/from which the data block is to be written/read. The distributed data storage system refers to these data file identifiers as "inodes." Finally, a meta-container is an internal construct that maps a plurality of inodes to a single meta-container that is stored on a particular physical disk. Multiple inodes from different user virtual disks may be mapped to a given meta-container.

Storage Pools. Storage pools are logical groupings of physical disks/drives in a storage service node and are configured as the protection unit for disk/drive failures and rebuilds. Within a replica node, one or more storage containers are assigned to a storage pool. A typical storage service node will host two to four storage pools, without limitation. When a physical disk fails, the storage pool comprising the physical disk is deemed failed, and the contents of the one or more meta-containers in that storage pool must be moved elsewhere, but data and metadata on other working physical disks may remain in place.

Metadata Node. An instance of the metadata subsystem executing on a storage service node is referred to as a metadata node that provides "metadata service." The metadata subsystem executing on a storage service node stores metadata at the storage service node. The metadata node communicates with one or more other metadata nodes to provide a system-wide metadata service. The metadata subsystem also communicates with pod and/or data storage subsystems at the same or other storage service nodes. A finite set of unique identifiers referred to as keys form a metadata "ring" that forms the basis for consistent hashing in the distributed data storage system, which is designed for strong consistency. Each metadata node "owns" one or more contiguous regions of the metadata ring, i.e., owns one or more ranges of keys within the ring. The ring is subdivided among the metadata nodes so that any given key is associated with a defined metadata owner and its replica nodes, i.e., each key is associated with a defined set of metadata node replicas. The range(s) of keys associated with each metadata node governs which metadata is stored, maintained, distributed, replicated, and managed by the owner metadata node. Tokens delineate range boundaries. Each token is a key in the metadata ring that acts as the end of a range. Thus a range begins where a preceding token leaves off and ends with the present token. Some metadata nodes are designated owners of certain virtual disks whereas others are replicas but not owners. Owner nodes are invested with certain functionality for managing the owned virtual disk.

Metadata Node Identifier or Storage Identifier (SID) is a unique identifier of the metadata service instance on a storage service node, i.e., the unique system-wide identifier of a metadata node.

Storage Proxy. Each storage proxy is a lightweight software component that deploys at the application tier, i.e., on application servers or hosts. A storage proxy may be implemented as a virtual machine (VM) or as a software container (e.g., Docker), or may run on bare metal to provide storage access to any physical host or VM in the application tier. As noted, the storage proxy intercepts reads and writes issued by applications and directs input/output (I/O) requests to the relevant storage service nodes.

Erasure Coding (EC). In some embodiments, the illustrative distributed data storage system employs erasure coding rather than or in addition to replication. EC is one of the administrable attributes for a user virtual disk. The default EC policy is (4,2), but (8,2) and (8,4) are also supported if a sufficient number of storage service nodes are available. The invention is not limited to a particular EC policy unless otherwise noted herein.

EC is a data protection technique that transforms a message of d symbols into a longer message of d+p symbols such that the original message can be recovered from a subset of the d+p symbols. (See, e.g., http://en.wikipedia.org/wiki/Erasure_code, accessed May 20, 2021). For example, a data block is encoded into a count of d+p (data plus parity) fragments. If you lose any of the fragments—at most the quantity of p (parity)—the original data block may be reconstructed from any d (data) recovered fragments. For example, in a 4+2 EC scheme, an unfragmented data block is encoded into six fragments: 4 data fragments [D0, D1, D2, D3] and 2 parity fragments [P0, P1]. If at most two fragments—for example, D1 and P0—are lost or corrupted, the remaining four fragments [D0, D2, D3, P1] are used to reconstruct the original data block in its unfragmented form. Storage savings is the key benefit of using EC data protection, significantly reducing the storage overhead as compared to multi-factor replication, and hence reducing the cost of data storage.

Write and Read Quorums For Erasure Coded Storage. Reed-Solomon Erasure Codes are used to encode and reconstruct data according to the illustrative embodiments, though the invention is not so limited. 64 KB is the illustrative default block size for all EC-enabled virtual disks. A write is deemed a success if the data write quorum is met and the metadata subsystem is successfully updated to track the write. A read is deemed a success if the data read quorum is met. Different quorum values apply depending on the system configuration and EC scheme. When a quorum is not met and a write fails, the distributed data storage system maintains failed fragment write locations for every user block successfully written at the user virtual disk level, in the metadata subsystem.

FIG. 1A is a block diagram depicting a distributed data storage system 100 according to an illustrative embodiment. The figure depicts: a plurality of application nodes 102 that form an "application tier," each application node comprising a storage proxy 106 and one of components 103A, 104A, and 105A; and a storage cluster 110 comprising a plurality of separately scalable storage service nodes 120 and a plurality of specially-equipped compute hosts 121.

Distributed data storage system 100 (or system 100) comprises storage proxies 106 and storage cluster 110. System 100 flexibly leverages both hyperscale and hyperconverged deployment options, sometimes implemented in the same storage cluster 110 as depicted here. Hyperscale deployments scale storage resources independently from the application tier, as shown by storage service nodes 120 (e.g., 120-1 . . . 120-N). In such hyperscale deployments, storage capacity and performance scale out horizontally by adding commodity servers running the illustrative storage service; application nodes (or hosts) 102 scale separately along with storage proxy 106. On the other hand, hyperconverged deployments scale compute and storage in lockstep, with workloads and applications residing on the same physical nodes as payload data, as shown by compute hosts 121. In such hyperconverged deployments, storage proxy 106 and storage service software 122 are packaged and deployed as VMs on a compute host 121 with a hypervisor 103 installed. In some embodiments, system 100 provides plug-ins for hypervisor and virtualization tools, such as VMware vCenter, to provide a single management interface for a hyperconverged solution.

System 100 provides enterprise-grade storage services, including deduplication, compression, snapshots, clones, replication, auto-tiering, multitenancy, and self-healing of both silent corruption and/or disk/node failures to support production storage operations, enterprise service level agreements (SLAs), and/or robust storage for backed up data (secondary copies). Thus, system 100 eliminates the need for enterprises to deploy bolted-on or disparate solutions to deliver a complete set of data services. This simplifies infrastructure and further reduces overall Information Technology (IT) capital expenditures and operating expenses. Enterprise storage capabilities can be configured at the granularity of a virtual disk, providing each data originator, e.g., application, VM, and/or software container, with its own unique storage policy. Every storage feature can be switched on or off to fit the specific needs of any given workload. Thus, the granular provisioning of features empowers administrators to avoid the challenges and compromises of "one size fits all" storage and helps effectively support business SLAs, while decreasing operational costs.

System 100 inherently supports multi-site availability, which removes the need for additional costly disaster recovery solutions. The system provides native high availability storage for applications across geographically dispersed data centers by setting a unique replication policy and replication factor at the virtual disk level.

System 100 comprises a "shared-nothing" distributed computing architecture in which each storage service node is independent and self-sufficient. Thus, system 100 eliminates any single point of failure, allows for self-healing, provides non-disruptive upgrades, and scales indefinitely by adding more storage service nodes. Each storage service node stores and processes metadata and/or payload data, then communicates with other storage service nodes for data/metadata distribution according to the replication factor.

Storage efficiency in the storage cluster is characterized by a number of features, including: thin provisioning, deduplication, compression, compaction, and auto-tiering. Each virtual disk is thinly provisioned by default and does not consume capacity until data is written therein. This space-efficient dynamic storage allocation capability is especially useful in DevOps environments that use Docker, OpenStack, and other cloud platforms where volumes do not support thin provisioning inherently, but can support it using the virtual disks of system 100. System 100 provides inline global deduplication that delivers space savings across the entire storage cluster. Deduplication is administrable at the virtual disk level to optimize I/O and lower the cost of storing data. As writes occur, the system 100 calculates the unique fingerprint of data blocks and replaces redundant data with a small pointer. The deduplication process can be configured to begin at storage proxy 106, improving write performance and eliminating redundant data transfers over the network. System 100 provides inline compression administrable at the virtual disk level to optimize capacity usage. The system stores only compressed data on the storage service nodes. Illustratively, the Snappy compression library is used, but the invention is not limited to this implementation. To improve read performance and optimize storage space, the illustrative system periodically performs garbage collection to compact redundant blocks and generate large sequential chunks of data. The illustrative system balances performance and cost by supporting tiering of data among high-speed SSDs and lower-tier persistent storage technologies.

Application node (or host) 102 (e.g., 102-1, 102-2, 102-3) is any computing device, comprising one or more hardware processors and computer memory for executing computer programs, that generates and/or accesses data stored in storage cluster 110. Application(s) (not shown here but see, e.g., applications 132 in FIG. 1B) executing on an application node 102 use storage cluster 110 as a data storage resource. Application node 102 can take the form of: a bare metal host 105A for applications with storage proxy 106-3; a virtual machine server with hypervisor 103A and storage proxy 106-1; a container host hosting software container 104A and storage proxy 106-2; and/or another computing device configuration equipped with a storage proxy 106.

Hypervisor 103 (e.g., 103A, 103B) is any hypervisor, virtual machine monitor, or virtualizer that creates and runs virtual machines on a virtual machine server or host. Software container 104A is any operating system virtualization software that shares the kernel of the host computing device (e.g., 102, 121) that it runs on and allows multiple isolated user space instances to co-exist. Docker is an example of software container 104A. Bare metal 105A refers to application node 102-3 running as a traditional computing device without virtualization features. Components 103, 104A, and 105A/B are well known in the art.

Storage proxy 106 (e.g., 106-1, 106-2, 106-3, 106-J . . . 106-K) is a lightweight software component that deploys at the application tier, i.e., on application nodes 102 and/or compute hosts 121. A storage proxy may be implemented as a virtual machine 106-1, as a software container (e.g., Docker) 106-2, and/or running on bare metal (e.g., 106-3) to provide storage access to any physical host or VM in the application tier. The storage proxy acts as a gatekeeper for all I/O requests to virtual disks configured at storage cluster 110. It acts as a storage protocol converter, load balances I/O requests to storage service nodes, caches data fingerprints, and performs certain deduplication functions. Storage protocols supported by storage proxy 106 include Internet Small Computer Systems Interface (iSCSI), Network File System (NFS), Server Message Block (SMB2) or Common Internet File System (CIFS), Amazon Simple Storage Service (S3), OpenStack Object Store (Swift), without limitation. The storage proxy runs in user space and can be managed by any virtualization management or orchestration tool. With storage proxies 106 that run in user space, the disclosed solution is compatible with any hypervisor, software container, operating system, or bare metal computing environment at the application node. In some virtualized embodiments where storage proxy 106 is deployed on a virtual machine, the storage proxy may be referred to as a "controller virtual machine" (CVM) in contrast to application-hosting virtual machines that generate data for and access data at the storage cluster.

Storage cluster 110 comprises the actual storage resources of system 100, such as storage service nodes 120 and storage services 122 running on compute hosts 121. In some embodiments, storage cluster 110 is said to comprise compute hosts 121 and/or storage service nodes 120.

Figure 1B:
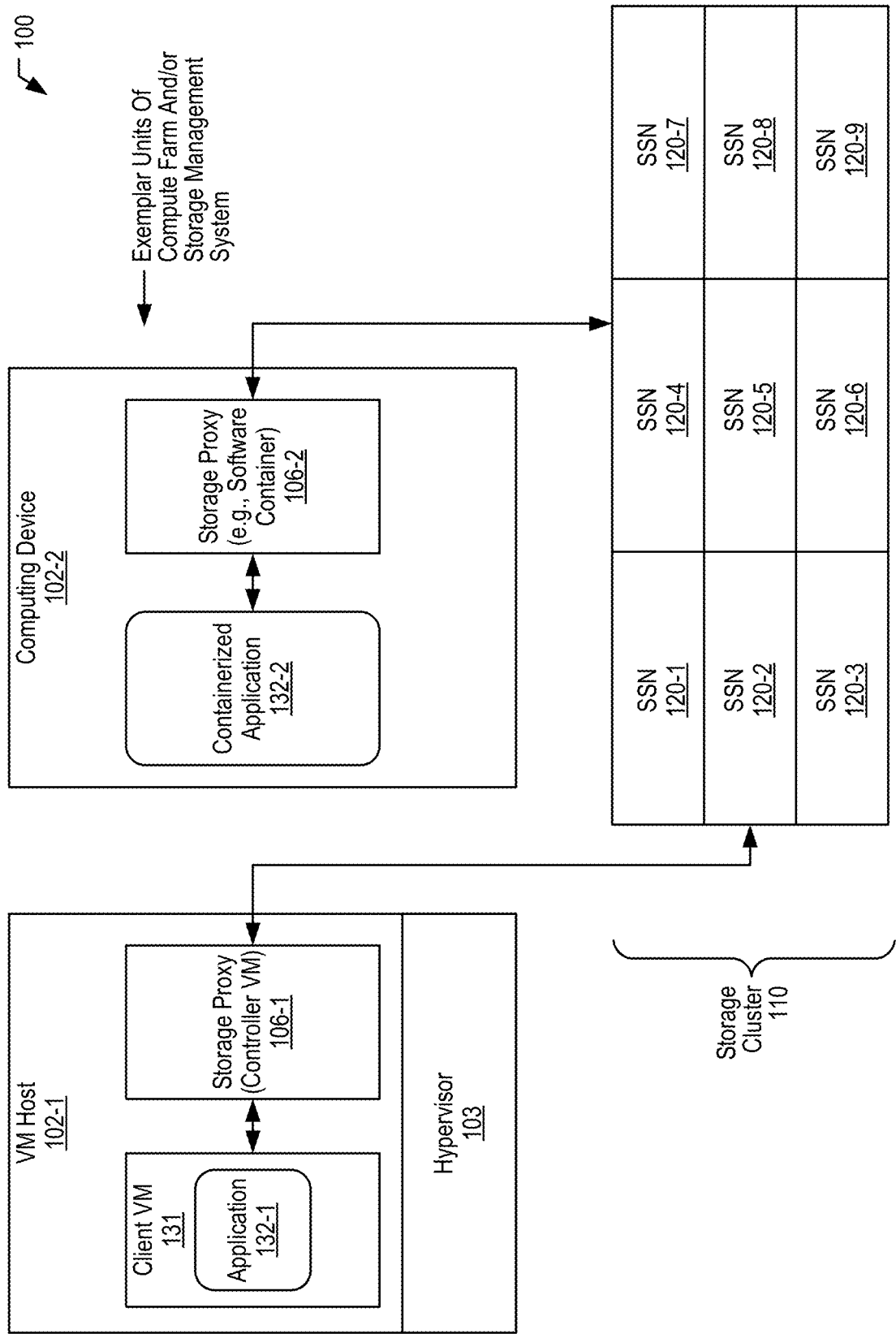
FIG. 1B is a block diagram illustrating some details of the distributed data storage system 100 comprising separately scalable storage service nodes according to an illustrative embodiment.
Figure 1B:
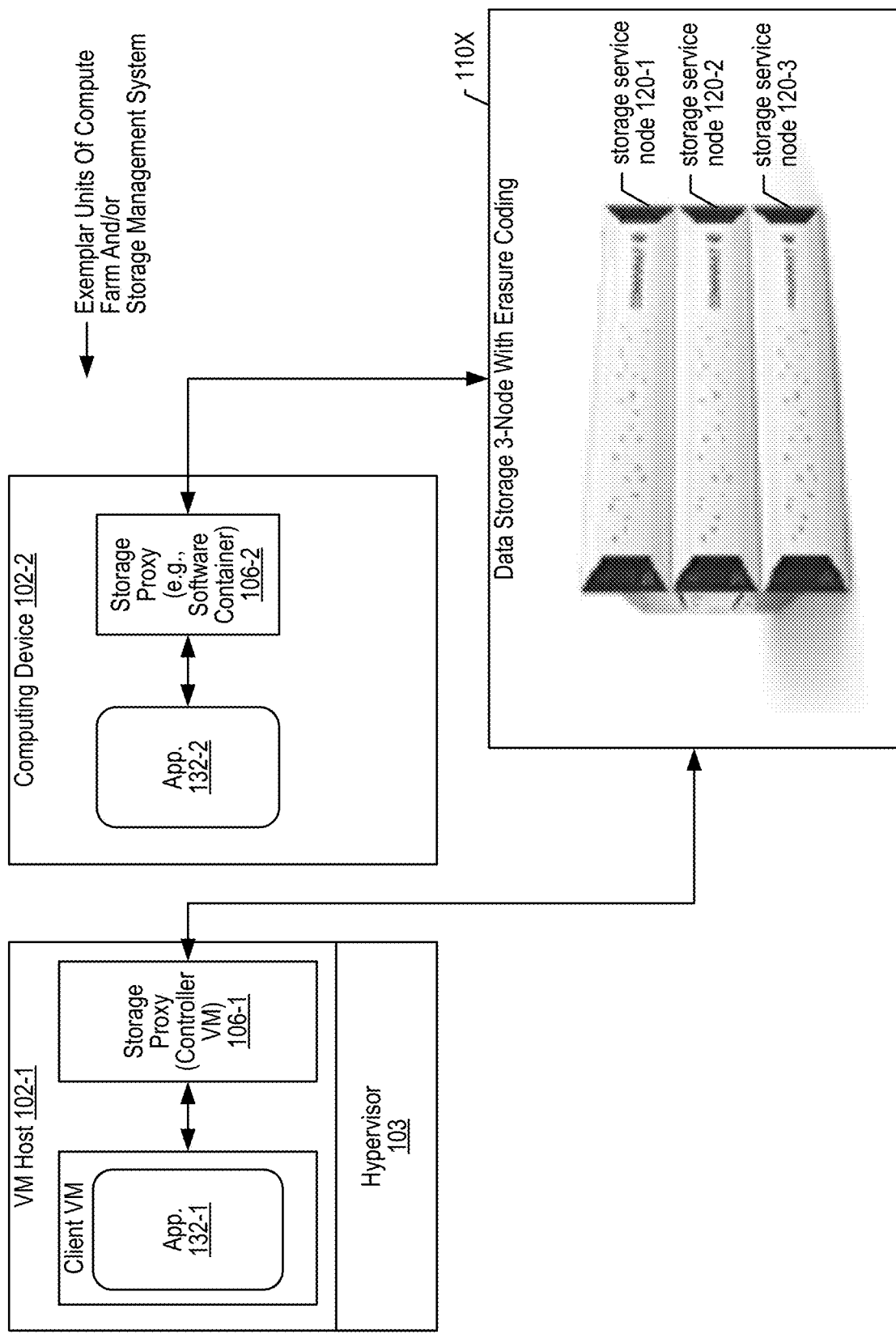
Figure 1C:
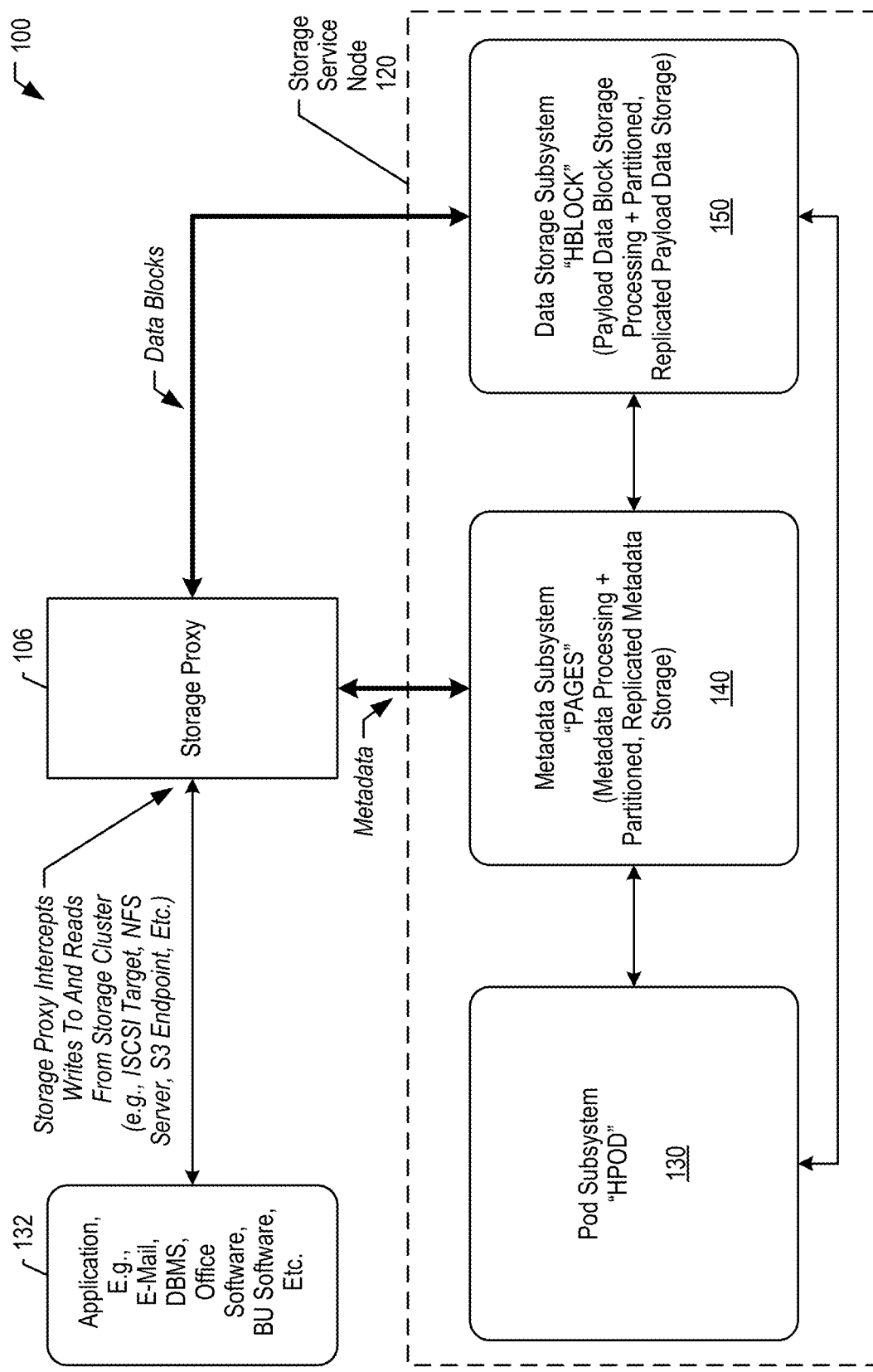
FIG. 1C is a block diagram depicting certain subsystems of the storage service of distributed data storage system 100, according to an illustrative embodiment.

Storage service node 120 (e.g., 120-1 . . . 120-N) is any commodity server configured with one or more x86 or ARM hardware processors and with computer memory for executing the illustrative storage service, which is described in more detail in FIG. 1C. Storage service node 120 also comprises storage resources as described in more detail in FIG. 1D. By running the storage service, the commodity server is transformed into a full-featured component of storage cluster 110. System 100 may comprise any number of storage service nodes 120.

Compute host 121 (e.g., 121-1 . . . 121-M) is any computing device, comprising one or more hardware processors and computer memory for executing computer programs, that comprises the functional components of an application node 102 and of a storage service node 120 in a "hyperconverged" configuration. In some embodiments, compute hosts 121 are configured, sometimes in a group, within an appliance such as the Commvault Hyperscale X backup appliance from Commvault Systems Inc., of Tinton Falls, N.J., USA. For simplicity, and to ease the reader's understanding of the present disclosure, references herein to storage service nodes 120 also apply to computer hosts 121 and their configured components therein (e.g., hypervisor 103B, storage proxy 106-J, storage service 122-1, bare metal 105B, storage proxy 106-K, storage service 122-M, etc.), unless otherwise stated.

FIG. 1B is a block diagram illustrating some details of the distributed data storage system 100 comprising separately scalable storage service nodes 120 according to an illustrative embodiment. The figure depicts: application node 102-1 embodied as a VM host and hosting hypervisor 103, storage proxy 106-1 embodied as a controller virtual machine, and client VM 131 hosting application 132-1; application node 102-2 hosting containerized storage proxy 106-2 and containerized application 132-2; and storage cluster 110 comprising nine (9) distinct physical storage service nodes 120 (e.g., 120-1 . . . 120-9). Virtual machine hosts, virtual machines, and hypervisors are well known in the art. Although not expressly depicted in the present figure, in some embodiments, an application orchestrator node (e.g., Kubernetes node and/or Kubernetes kubelet and/or another Kubernetes-based technology, etc.) may be implemented as an application node 102 instead of, or in addition to, components 102-1, 102-2, and 102-3. In such a configuration, the application orchestrator node comprises or hosts one or more containerized applications (e.g., 132-2) and a containerized storage proxy 106 (e.g., 106-2), as well as a container storage interface (CSI) driver that is preferably implemented as an enhanced and proprietary CSI driver, such the one disclosed in one or more patent applications deriving priority from U.S. Provisional Patent Application 63/082631 filed on Sep. 24, 2020.

Application 132 (e.g., 132-1, 132-2) is any software that executes on its underlying host (e.g., 102-1, 102-2) and performs a function as a result. The application 132 may generate data and/or need to access data which is stored in system 100. Examples of application 132 include email applications, database management applications, office productivity software, backup software, etc., without limitation.

The bi-directional arrows between each storage proxy 106 and a storage service node 120 depict the fact that communications between applications 132 and storage cluster 110 pass through storage proxies 106, each of which identifies a proper storage service node 120 to communicate with for the present transaction, e.g., storage service node 120-2 for storage proxy 106-1, storage service node 120-4 for storage proxy 106-2, without limitation.

FIG. 1BA is a block diagram illustrating an illustrative distributed data storage system 100 configured with an appliance 110X that comprises storage service nodes 120, according to an illustrative embodiment. The present figure is similar to FIG. 1B, but here there is a limited number of storage service nodes, for example three storage service nodes 120-1, 120-2, and 120-3. The appliance 110X acts as a storage cluster 110 for one or more storage proxies 106. In some embodiments, appliance 110X is the Commvault Hyperscale X scale-out appliance. In some embodiments, element 110X is a reference architecture that comprises three storage service nodes 120 as shown here. In all these embodiments, element 110X represents a storage cluster 110 that is limited to a number of storage service nodes 120 fewer than the EC-count of erasure-coded fragments generated by the governing erasure coding scheme.

To enhance the reader's understanding, the present disclosure uses an example erasure coding scheme of 4+2 with an EC-count of six and uses an example storage cluster 110 (or 110X) comprising three storage service nodes 120. The invention is not limited to these numerical limits, but the techniques disclosed herein are particularly well suited to implementing erasure-coded data storage when the number of distinct physical storage nodes (such as storage service nodes 120) are fewer than the number of data fragments plus parity fragments (the EC-count) generated by the governing erasure coding scheme. In some embodiments, the erasure coding scheme is administered as a global configuration of the illustrative distributed data storage system, whereas in some embodiments, each user virtual disk 170 is individually administered with or without EC enabled according to administrative choice. User virtual disks 170 that are not EC enabled are governed by a replication scheme, such as 3-way replication (RF3) for example and without limitation. In the examples herein, the RF3 replication scheme is used as the secondary or less-preferred alternative to erasure coding when EC cannot be used due to hardware failures or unavailability.

FIG. 1C is a block diagram depicting certain subsystems of the storage service of distributed data storage system 100, according to an illustrative embodiment. Depicted here are: storage proxy 106; application 132; and a storage service node 120 comprising a pod subsystem 130 (e.g., Hedvig "HPOD"), a metadata subsystem 140 (e.g., Hedvig "PAGES"), and a data storage subsystem 150 (e.g., Hedvig "HBLOCK"). Although storage service node 120 as depicted here comprises an instance of all three storage service subsystems, any given storage service node 120 need not comprise all three subsystems. Thus, a subsystem running on a given storage service node may communicate with one or more subsystems on another storage service node as needed to complete a task or workload.

Storage proxy 106 intercepts reads and writes issued by applications 132 that are targeted to particular virtual disks configured in storage cluster 110. Storage proxy 106 provides native block, file, and object storage protocol support, as follows:

Block storage—system 100 presents a block-based virtual disk through a storage proxy 106 as a logical unit number (LUN). Access to the LUN, with the properties applied during virtual disk provisioning, such as compression, deduplication and replication, is given to a host as an iSCSI target. After the virtual disk is in use, the storage proxy translates and relays all LUN operations to the underlying storage cluster.

File storage—system 100 presents a file-based virtual disk to one or more storage proxies 106 as an NFS export, which is then consumed by the hypervisor as an NFS datastore. Administrators can then provision VMs on that NFS datastore. The storage proxy acts as an NFS server that traps NFS requests and translates them into the appropriate remote procedure call (RPC) calls to the backend storage service node.

Object storage—buckets created via the Amazon S3 API, or storage containers created via the OpenStack Swift API, are translated via the storage proxies 106 and internally mapped to virtual disks 170. The storage cluster 110 acts as the object (e.g., S3/Swift) target, which client applications 132 can utilize to store and access objects.

Storage proxy 106 comprises one or more caches that enable distributed operations and the performing of storage system operations locally at the application node 102 to accelerate read/write performance and efficiency. An illustrative metacache stores metadata locally at the storage proxy, preferably on SSDs. This cache eliminates the need to traverse the network for metadata lookups, leading to substantial read acceleration. For virtual disks provisioned with client-side caching, an illustrative block cache stores data blocks to local SSD drives to accelerate reads. By returning blocks directly from the storage proxy, read operations avoid network hops when accessing recently used data. For virtual disks provisioned with deduplication, an illustrative dedupe cache resides on local SSD media and stores fingerprint information of certain data blocks written to storage cluster 110. Based on this cache, the storage proxy determines whether data blocks have been previously written and if so, avoids re-writing these data blocks again. Storage proxy 106 first queries the dedupe cache and if the data block is a duplicate, storage proxy 106 updates the metadata subsystem 140 to map the new data block(s) and acknowledges the write to originating application 132. Otherwise, storage proxy 106 queries the metadata subsystem 140 and if the data block was previously written to storage cluster 110, the dedupe cache and the metadata subsystem 140 are updated accordingly, with an acknowledgement to originating application 132. Unique new data blocks are written to the storage cluster as new payload data. More details on reads and writes are given in FIGS. 1E and 1F.

A simplified workflow comprises: 1. A virtual disk 170 is administered with storage policies via a web-based user interface, a command line interface, and/or a RESTful API (representational state transfer application programming interface). 2. Block and file virtual disks are attached to a storage proxy 106, which presents the storage resource to application hosts, e.g., 102. For object storage, applications 132 directly interact with the virtual disk via Amazon S3 or OpenStack Swift protocols. 3. Storage proxy 106 intercepts application 132 I/O through the native storage protocol and communicates it to the underlying storage cluster 110 via remote procedure calls (RPCs). 4. The storage service distributes and replicates data throughout the storage cluster based on virtual disk policies. 5. The storage service conducts background processes to auto-tier and balance across racks, data centers, and/or public clouds based on virtual disk policies.

Pod subsystem 130 maintains certain system-wide information for synchronization purposes and comprises processing and tracking resources and locally stored information. A network of pods 130 throughout storage cluster 110, where each pod comprises three nodes, is used for managing transactions for metadata updates, distributed-atomic-counters as a service, tracking system-wide timeframes such as generations and epochs, etc. More details on the pod subsystem may be found in U.S. Pat. No. 9,483,205 B2, which is incorporated by reference in its entirety herein.

Metadata subsystem 140 comprises metadata processing resources and partitioned replicated metadata stored locally at the storage service node. Metadata subsystem 140 receives, processes, and generates metadata. Metadata in system 100 is partitioned and replicated across a plurality of metadata nodes. Typically, metadata subsystem 140 is configured with a replication factor of 3 (RF3), and therefore many of the examples herein will include 3-way replication scenarios, but the invention is not so limited. Each metadata subsystem 140 tracks the state of data storage subsystems 150 and of other metadata subsystems 140 in storage cluster 110 to form a global view of the cluster. Metadata subsystem 140 is responsible for optimal replica assignment and tracks writes in storage cluster 110.

Metadata synchronization logic (or "anti-entropy engine" (AE) not shown here) runs in the metadata subsystem 140. The metadata synchronization logic compares replicas of metadata across metadata nodes and ensures that the replicas agree on a superset of the metadata therein to avoid losing metadata. During storage and compaction of metadata-carrying string-sorted tables (SSTs), a consistent file identification scheme is used across all metadata nodes. When an application node writes to and reads from a virtual disk on the distributed data storage system, metadata is generated and stored in replicas on different metadata nodes. A modified log-structured merge tree is used to store and compact the metadata SST files. A fingerprint file is created for each metadata SST file that includes a start-length-hash value triple for each region of the metadata SST file. To synchronize, fingerprint files of two metadata SST files are compared, and if any hash values are missing from a fingerprint file then key-value-timestamp triples corresponding to these missing hash values are sent to the metadata SST file that is missing them. An example of metadata synchronization logic is described in U.S. Pat. No. 10,740,300, which is incorporated by reference in its entirety herein.

Data storage subsystem 150 receives, processes, and stores payload data written to storage cluster 110. Thus, data storage subsystem 150 is responsible for replicating data to other data storage subsystems 150 on other storage service nodes and striping data within and across storage pools. Data storage subsystem 150 comprises storage processing for payload data blocks (e.g., I/O, compaction, garbage collection, etc.) and stores partitioned replicated payload data at the storage service node.

The bold bi-directional arrows in the present figure show that metadata is communicated between storage proxy 106 and metadata subsystem 140, whereas data blocks are transmitted to/from data storage subsystem 150. Depending on the configuration, metadata subsystem 140 may operate on a first storage service node 120 or storage service 122 and data storage subsystem 150 may operate on another distinct storage service node 120 or storage service 122. See also FIGS. 1E and 1F.

Figure 1D:
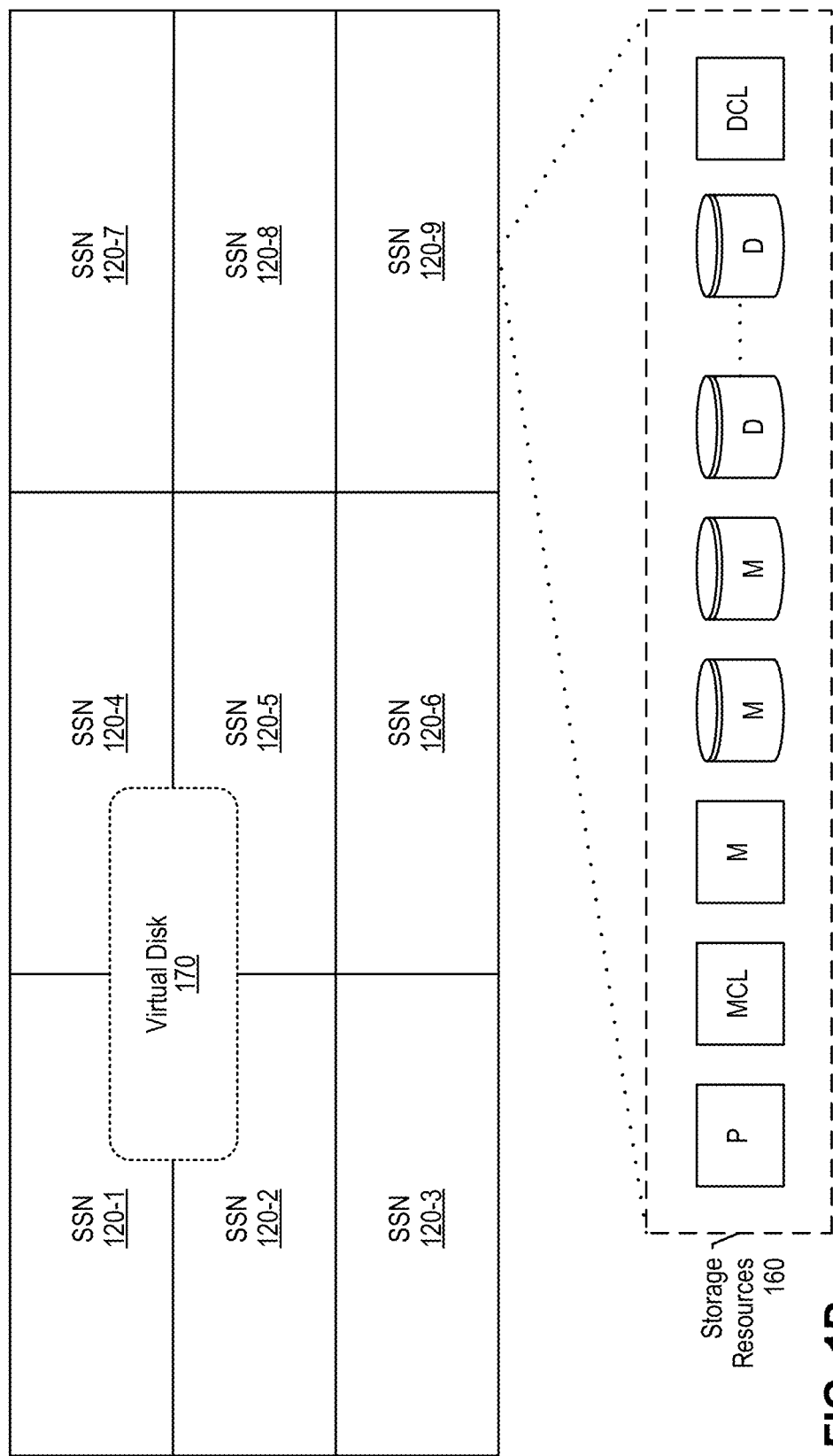
FIG. 1D is a block diagram depicting a virtual disk distributed across a plurality of storage service nodes and also depicting a plurality of storage resources available at each storage service node according to an illustrative embodiment.

FIG. 1D is a block diagram depicting a virtual disk distributed across a plurality of storage service nodes and also depicting a plurality of storage resources available at each storage service node according to an illustrative embodiment. The present figure depicts: nine storage service nodes 120 (120-1 . . . 120-09); a virtual disk 170 that comprises data distributed over four of the storage service nodes—120-1, 120-2, 120-4, and 120-5; and storage resources 160 configured within storage service node 120-9.

Each storage service node 120 (or compute host 121) is typically configured with computing resources (e.g., hardware processors and computer memory) for providing storage services and with a number of storage resources 160, e.g., hard disk drives (HDD) shown here as storage disk shapes, solid state storage drives (SSD) (e.g., flash memory technology) shown here as square shapes, etc., without limitation. The illustrative system uses commit logs, which are preferably stored on SSD before they are flushed to another disk/drive for persistent storage. Metadata commit logs are stored on dedicated metadata-commit-log drives "MCL", whereas payload-data commit logs are stored on distinct dedicated data-commit-log drives "DCL." As an example depicted in the present figure, pod system information is stored in storage resource "P" which is preferably SSD technology for faster read/write performance; the metadata commit log is stored in storage resource "MCL" which is preferably SSD technology; metadata is then flushed from the commit log to persistent storage "M" (SSD and/or HDD); the data commit log is stored in storage resource "DCL" which is preferably SSD technology; payload data is then flushed from the data commit log to persistent storage "D" (typically HDD). The storage resources 160 depicted in the present figures are shown here as non-limiting examples to ease the reader's understanding; the numbers and types of storage technologies among storage resources 160 will vary according to different implementations.

To accelerate read operations, client-side caching of data is used on SSDs accessible by the storage proxy 106. Data is also cached on SSDs at storage service nodes. For caching, the system supports the use of Peripheral Component Interconnect Express (PCIe) and Non-Volatile Memory Express (NVMe) SSDs. All writes are executed in memory and flash (SSD/NVMe) and flushed sequentially to persistent storage. Persistent storage uses flash technology (e.g., multi-level cell (MLC) and/or 3D NAND SSD) and/or spinning disk technology (e.g., HDD)). Options are administrable at the virtual disk level.

Virtual disk ("vdisk") 170 is the data storage representation of system 100 that is visible to and accessible by applications 132 as data storage resources. Thus, vdisk 170 is a "user virtual disk." Each application 132 will use one or more virtual disks 170 for data storage without having knowledge of how system 100 as a whole is organized and configured. Every virtual disk 170 provisioned on the system is partitioned into fixed size storage containers (or backing containers). Different replicas are assigned for each storage container. Notably, the replication factor alone (e.g., RF3) does not limit how many storage service nodes 120 may comprise payload data of a given virtual disk 170. Thus, different containers of the virtual disk may be stored and replicated on different storage service nodes, adding up to more total storage service nodes associated with the virtual disk than the replication factor of the virtual disk.

Any number of virtual disks 170 may be spun up, each one thinly provisioned and instantly available. Illustrative user-configurable attributes for virtual disk 170 include without limitation: Name—a unique name to identify the virtual disk. Size—to set the desired virtual disk size. System 100 supports single block and NFS virtual disks of unlimited size. Disk Type—to specify the type of storage protocol to use for the virtual disk: block or file (NFS). Object containers/buckets are provisioned directly from OpenStack via Swift, via the Amazon S3 API, etc. Workload Type—for NFS disk type, options include default, proprietary, or object storage target (OST) workload types. For proprietary and OST, if Enable Deduplication is selected, a Retention Policy can be added as well. For block disk type, the only option is default. Retention Policy—specifies a duration for proprietary and OST workloads, e.g., two weeks, one month, etc. Encryption—to encrypt both data at rest and data in flight for the virtual disk. Enable Deduplication—to enable inline global deduplication. Clustered File System—to indicate that the virtual disk will be used with a clustered file system. When selected, system 100 enables concurrent read/write operations from multiple VMs or hosts. Description—to provide an optional brief description of the virtual disk. Compressed—to enable virtual disk compression to reduce data size. Client-Side Caching—to cache data to local SSD or PCIe devices at the application tier to accelerate read performance. CSV—to enable Cluster Shared Volumes for failover (or high availability) clustering. A CSV is a shared disk containing a Windows NT File System (NTFS) or Resilient File System (ReFS) volume that is made accessible for read and write operations by all nodes within a Windows Server failover cluster. Replication Policy—to set the policy for how data will replicate across the cluster: Agnostic, Rack Aware, or Data Center Aware. Replication Factor (RF)—to designate the number of replicas for each virtual disk. Replication factor is tunable, typically ranging from one to six, without limitation. Block Size—to set a block virtual disk size to 512 bytes, 4 k or 64 k. File (NFS)-based virtual disks have a standard 512 size, and object-based virtual disks have a standard 64K size. Residence—to select the type of media on which the data is to reside: HDD, SSD. The present figure depicts only one virtual disk 170 for illustrative purposes, but system 100 has no limits on how many virtual disks it may support.

Figure 1E:
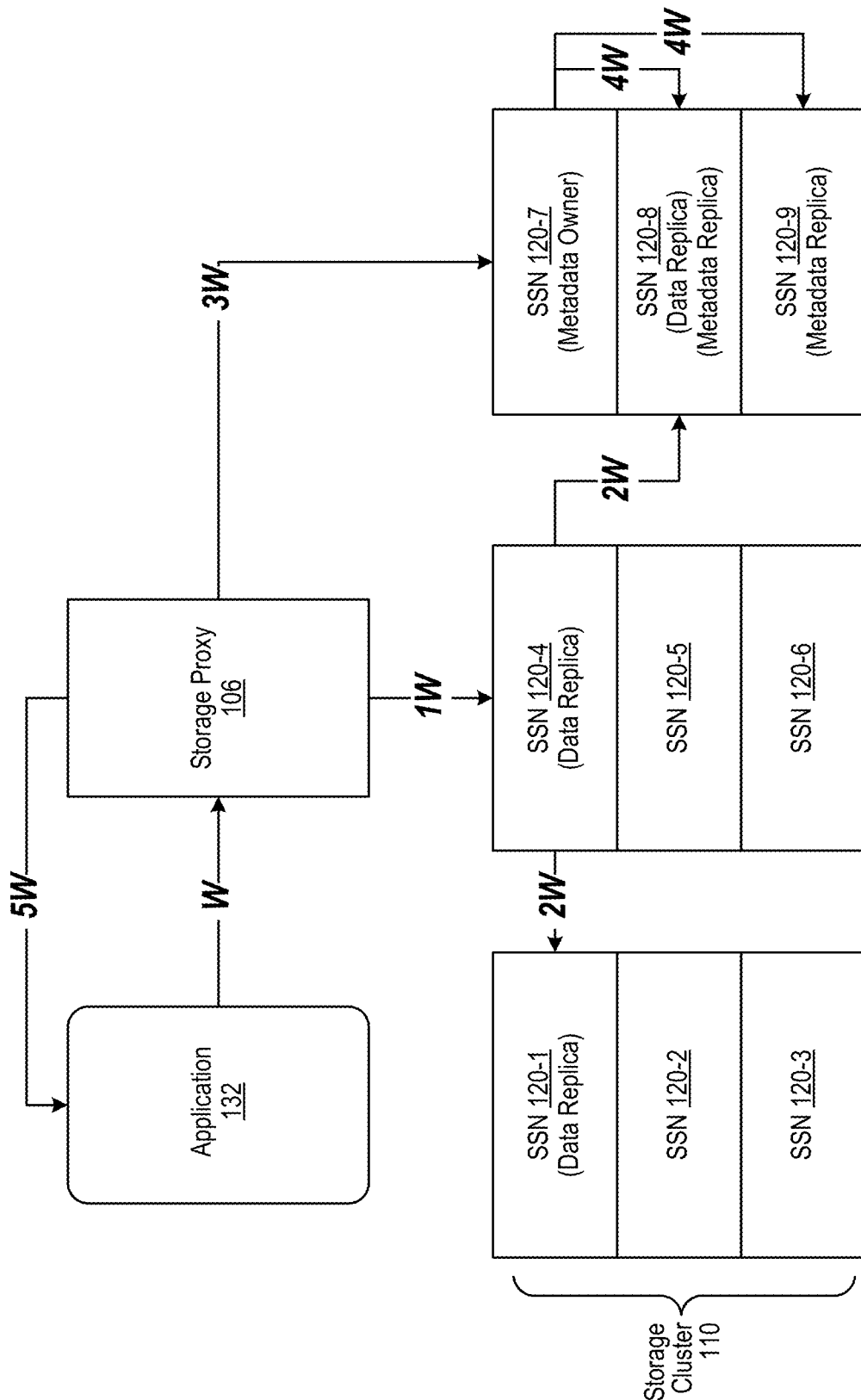
FIG. 1E is a block diagram depicting a typical I/O workflow for write operations originating with an application, according to an illustrative embodiment.

FIG. 1E is a block diagram depicting a typical I/O workflow for write operations originating with an application. This figure depicts an application 132 writing to storage cluster 110, illustratively writing to a virtual disk 170 configured with Replication Factor=3 (RF3). This configuration shows nine storage service (120-1 . . . 120-9) nodes for illustrative purposes.

At step W, storage proxy 106 intercepts a write command issued by application 132, comprising one or more payload data blocks to be written to a virtual disk 170 in storage cluster 110. At step 1W, storage proxy 106 determines replica nodes 120 for the data blocks to be written to and transmits the data blocks to one such replica node, e.g., 120-4. The write command issued by storage proxy 106 typically identifies the targeted virtual disk 170 and also identifies a targeted inode (internal data file identifier) that is to receive the payload data, as well as identifying a metacontainer. If the virtual disk is enabled for deduplication, the storage proxy 106 calculates a data block fingerprint, queries the dedupe cache and, if necessary, further queries metadata subsystem 140 (at the virtual disk's metadata owner node, e.g., 120-7), and either makes a metadata update or proceeds with a new payload write. At step 2W, the data storage subsystem 150 on replica node 120-4 receives and writes the data blocks locally and additionally distributes them to other designated replica nodes, e.g., 120-1 and 120-8. For RF3, two acknowledged successful writes are needed from the three (RF3) replicas to satisfy the quorum (RF/2+1=3/2+1=2). Two of the three replicas are written synchronously, and one may be written asynchronously. For EC, a different quorum value applies, but the same principle is used: the data block write is deemed successful after the quorum is met and acknowledged back to the node that distributed the data fragments. At step 3W, storage proxy 106 causes an atomic write to be made into metadata subsystem 140 at metadata owner node 120-7, which tracks the successful write of the payload data into the data storage subsystem 150. At step 4W, metadata subsystem 140 replicates the metadata from node 120-7 to designated metadata replica nodes, e.g., 120-8 and 120-9. At step 5W, storage proxy 106 sends a write acknowledgment back to the originating application 132 after payload data and metadata have been successfully written to the storage service nodes.

Figure 1F:
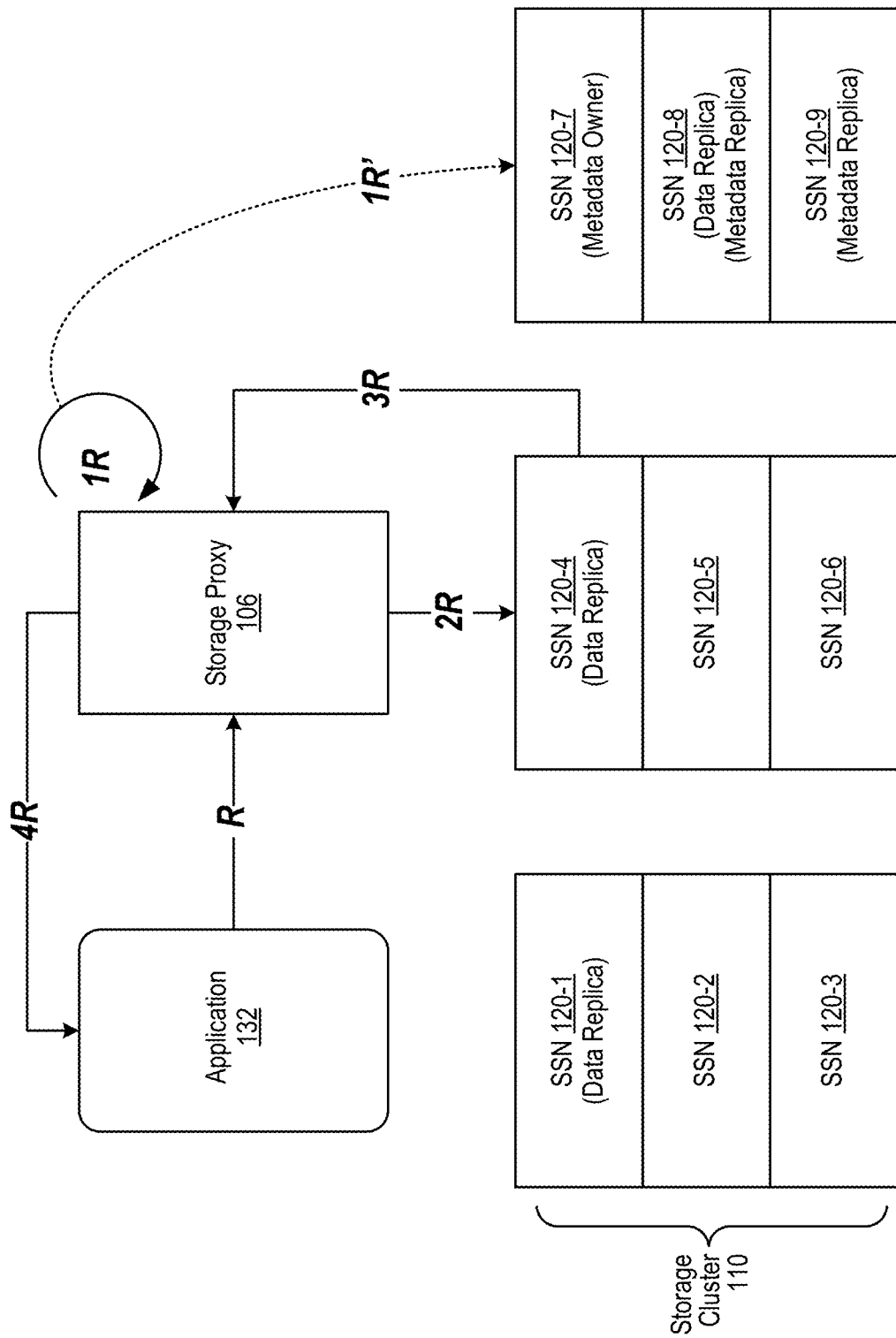
FIG. 1F is a block diagram depicting a typical I/O workflow for read operations originating with an application, according to an illustrative embodiment.

FIG. 1F is a block diagram depicting a typical I/O workflow for read operations originating with an application. This figure depicts an application 132 reading from storage cluster 110, illustratively reading from a virtual disk 170 configured with RF3. This configuration shows nine storage service (120-1 . . . 120-9) nodes for illustrative purposes.

At step R, storage proxy 106 intercepts a read request issued by application 132 for one or more data blocks from a virtual disk 170 in storage cluster 110. At step 1R, storage proxy 106 queries the local metacache for a particular data block to be read and if the information is not found in the local metacache, at step 1R' storage proxy 106 consults metadata subsystem 140 (e.g., at the vdisk's designated metadata owner node 120-7). At step 2R, storage proxy 106 sends the data block details to one of the closest data storage subsystems 150, based on observed latency, e.g., storage service node 120-4. At step 3R, the data storage subsystem 150 reads the data block(s) and transmits the block(s) back, if found, to storage proxy 106. If the read operation fails due to any error, the read is attempted from another replica. At step 4R, storage proxy 106 serves the requested data block(s) to application 132. If client-side caching is enabled for the targeted virtual disk 170 during provisioning, the storage proxy 106 queries the local block cache at step 1R to fetch the data block(s), and if found therein serves the data block(s) to application 132 at step 4R, thereby bypassing the data storage subsystem 150 at the storage service nodes(s) and eliminating the need to traverse the network to reach storage cluster 110.

System Resiliency. System 100 is designed to survive disk, node, rack, and data center outages without application downtime and with minimal performance impact. These resiliency features include: high availability, non-disruptive upgrades (NDU), disk failures, replication, and snapshots and clones.

High Availability. A preferable minimum of three storage service node should be provisioned for an implementation of the illustrative system. Redundancy can be set as agnostic, at the rack level, or at data center level. The system initiates transparent failover in case of failure. During node, rack, or site failures, reads and writes continue as usual from/to remaining operational replicas. To protect against a single point of failure, storage proxies 106 install as a high availability active/passive pair ("HA pair," not shown). A virtual IP address (VIP) assigned to the HA pair redirects traffic automatically to the active storage proxy 106 at any given time. If one storage proxy 106 instance is lost or interrupted, operations fail over seamlessly to the passive instance to maintain availability. This happens without requiring intervention by applications, administrators, or users. During provisioning, administrators can indicate that an application host 102/121 will use a clustered file system. This automatically sets internal configuration parameters to ensure seamless failover when using VM migration to a secondary physical host running its own storage proxy 106. During live VM migration, such as VMware vMotion or Microsoft Hyper-V, any necessary block and file storage "follows" guest VMs to another host.

Non-Disruptive Upgrades (NDUs). The illustrative system supports non-disruptive software upgrades by staging and rolling the upgrade across individual components using the highly available nature of the platform to eliminate any downtime or data unavailability. Storage service nodes 120 and storage services 122 undergo upgrades first one node at a time. Meanwhile, any I/O continues to be serviced from alternate available nodes, e.g., replicas. Storage proxies 106 are upgraded next, starting with the passive storage proxy in HA pairs. After the passive storage proxy upgrade is complete, it is made active, and the formerly active storage proxy 106 is upgraded and resumes service as the passive of the HA pair. This process eliminates any interruption to reads or writes during the upgrade procedure.

Disk Failures. The illustrative system supports efficient data and metadata rebuilds that are initiated automatically when there is a fatal disk failure. Payload data is rebuilt from other data replicas and using information in the metadata subsystem. The metadata rebuild self-heals within the metadata service.

Replication. The illustrative system uses a combination of synchronous and asynchronous replication processes to distribute and protect data across the cluster and provide near-zero recovery point objectives (RPO) and recovery time objectives (RTO). For example, two of three replicas are written synchronously, and one is written asynchronously. The system supports any number of active data centers in a single storage cluster 110, using a tunable replication factor and replication policy options. The replication factor designates the number of replicas to create for each virtual disk, and the replication policy defines the destination for the replicas across the cluster. Replicas occur at the storage container level of a virtual disk 170. For example, if a 100 GB virtual disk with RF3 is created, the entire 100 GBs are not stored as contiguous chunks on three storage service nodes. Instead, the 100 GBs are divided among several storage containers, and replicas of each storage container are spread across different storage pools on different storage service nodes within the storage cluster. For additional disaster recovery protection against rack and data center failures, the illustrative system supports replication policies that span multiple racks or data centers using structured IP addressing, DNS naming/suffix, and/or customer-defined snitch endpoints. For "agnostic" replication policies, data is spread across the storage cluster using a best-effort to improve availability. For "rack aware" replication policies, data is spread across as many physically distinct racks as possible within in a single data center. For "data center aware" replication policies, data replicates to additional physical sites, which can include private and/or hosted data centers and public clouds. In a disaster recovery example, where the Replication Policy=Data Center Aware and the Replication Factor=3, the illustrative system divides the data into storage containers and ensures that three copies (RF3) of each storage container are spread to geographically dispersed physical sites, e.g., Data Centers A, B, and C. At any time, if a data copy fails, re-replication is automatically initiated from replicas across the data centers.

Snapshots and Clones. In addition to replication policies, data management tasks include taking snapshots and making "zero-copy" clones of virtual disks. There is no limit to the number of snapshots or clones that can be created. Snapshots and clones are space-efficient, requiring capacity only for changed blocks.

Encryption. The illustrative system provides software-based encryption with the Encrypt360 feature. This enables encryption of data at the point of ingestion (at the storage proxy 106). Data encrypted in this way remains protected in flight between storage proxy 106 and storage service nodes 120/storage service 122, in flight among storage service nodes as part of replication, in-use at storage proxy 106, and at rest while in storage. Any encryption scheme may be implemented, preferably 256-bit AES. Additionally, any third-party key management system can be attached.

Ecosystem Integration. The illustrative system works with and provides a secure data storage platform for a variety of data-generating platforms, including systems that generate primary (production) data and systems that generate backup data from primary sources. VMware. The illustrative system features a vCenter plug-in that enables provisioning, management, snapshotting, and cloning of virtual disks 170 directly from the vSphere Web Client. Additionally, the system incorporates support for the VMware vSphere Storage APIs Array Integration (VAAI). Docker. The illustrative system provides persistent storage for Docker software containers through a volume plugin. The volume plugin enables a user to create a persistent Docker volume backed by a virtual disk 170. Different options, such as deduplication, compression, replication factor, and/or block size, may be set for each Docker volume, using "volume options" in the Docker Universal Control Plane (UCP) or using the "docker volume" command line. The virtual disk can then be attached to any host. The volume plugin also creates a file system on this virtual disk and mounts it using the path provided by the user. The file system type can also be configured by the user. All I/O to the Docker volume goes to virtual disk 170. As the software container moves in the environment, virtual disk 170 will automatically be made available to any host, and data will be persisted using the policies chosen during volume creation. For container orchestration platforms, such as Kubernetes and OpenShift, the illustrative system 100 provides persistent storage for software containers through a proprietary dynamic provisioner and via other technologies that interoperate with the orchestration platform(s). OpenStack. The illustrative system delivers block, file, and object storage for OpenStack all from a single platform via native Cinder and Swift integration. The system supports granular administration, per-volume (Cinder) or per-container (Swift), for capabilities such as compression, deduplication, snapshots, and/or clones. OpenStack administrators can provision the full set of storage capabilities of system 100 in OpenStack Horizon via OpenStack's QoS functionality. As with VMware, administrators need not use system 100's native web user interfaces and/or RESTful API, and storage can be managed from within the OpenStack interface.

Multitenancy. The illustrative system supports the use of rack-aware and data center-aware replication policies for customers who must satisfy regulatory compliance and restrict certain data by region or site. These capabilities provide the backbone of a multitenant architecture, which is supported with three forms of architectural isolation: LUN masking, dedicated storage proxies, and complete physical isolation. Using the LUN masking option, different tenants are hosted on a shared infrastructure with logical separation. Logical separation is achieved by presenting virtual disks only to a certain VM and/or physical application host (IP range). Quality of Service (QoS) is delivered at the VM level. Using the dedicated storage proxies option, storage access is provided with a dedicated storage proxy 106 per tenant. Storage proxies can be deployed on a dedicated physical host or a shared host. This provides storage as a shared infrastructure, while compute is dedicated to each tenant. Quality of Service (QoS) is at the VM level. Using the complete physical isolation option, different tenants are hosted on dedicated storage clusters (each running their own storage service and storage proxies) to provide complete logical and physical separation between tenants. For all of these multitenant architectures, each tenant can have unique virtual disks with tenant-specific storage policies, because the illustrative system configures policies at the virtual disk level. Policies can be grouped to create different classes of service. Thus, the illustrative distributed data storage system scales seamlessly and linearly from a few nodes to thousands of nodes using virtual disks as the user-visible storage resource provided by the system. Enterprise storage capabilities are configurable at the virtual disk level. The storage service nodes can be configured in a plurality of physical computing environments, e.g., data centers, private clouds, public clouds, and/or in any combination, without limitation.

Figure 2A:
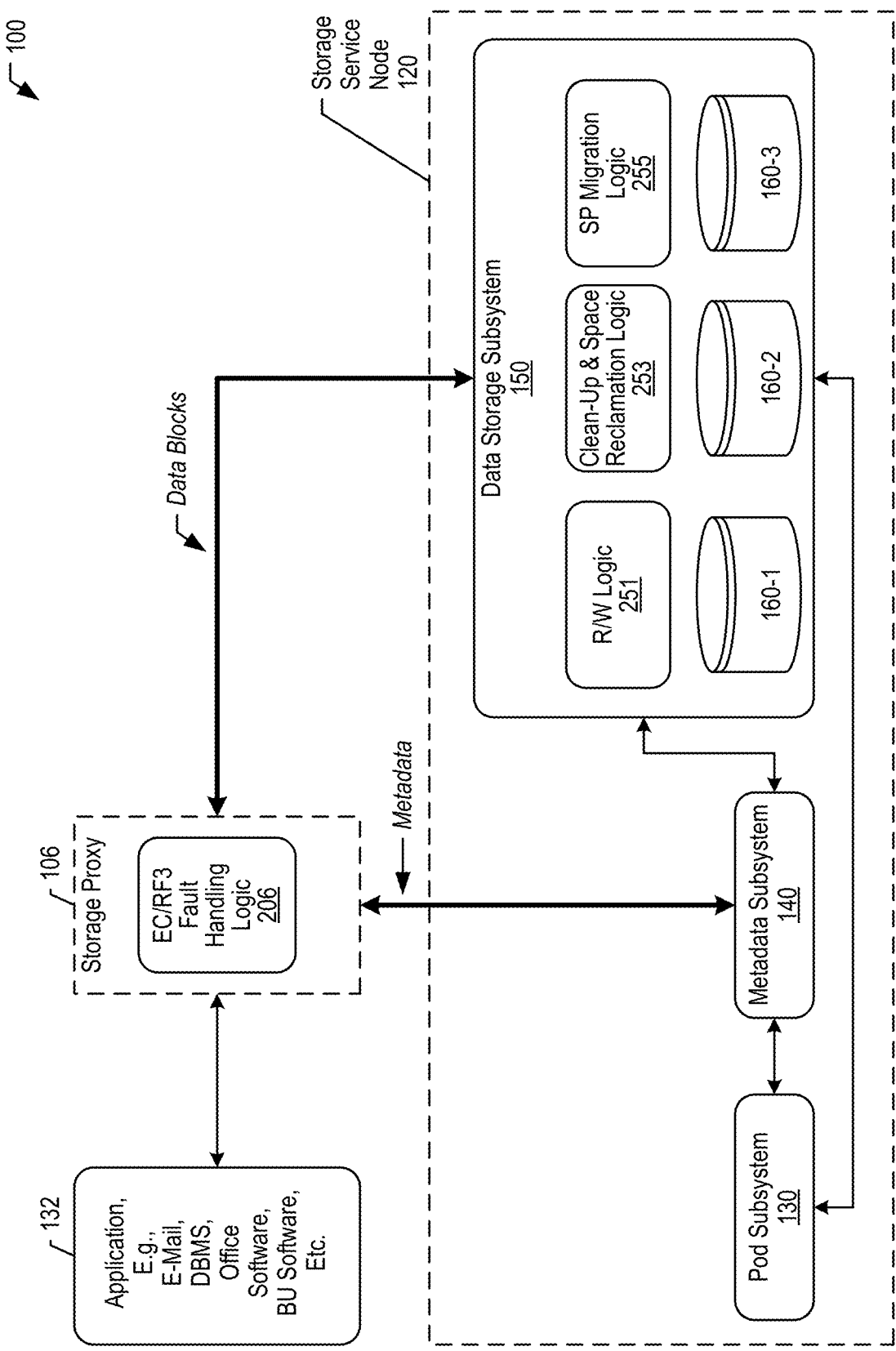
FIG. 2A is a block diagram depicting certain details of the distributed data storage system, including EC/RF3 fault handling logic at storage proxy 106 and various logic components at data storage subsystem 150, according to an illustrative embodiment.

Distributed Data Storage System Using Erasure Coding on Storage Nodes Fewer than Data Plus Parity Fragments FIG. 2A is a block diagram depicting certain details of a distributed data storage system, including EC/RF3 fault handling logic at storage proxy 106 and various logic components at data storage subsystem 150, according to an illustrative embodiment. The metadata subsystem 140 and the pod subsystem 130 both include logic and storage resources that are not shown in the present figure for simplicity. The present figure depicts: application 132; storage proxy 106 comprising EC/RF3 fault handling logic 206; pod subsystem 130; metadata subsystem 140; and data storage subsystem 150 comprising physical data storage resources 160 (e.g., 160-1, 160-2, 160-3), read/write (R/W) handling logic 251, healing, clean-up, and space reclamation logic 253, and storage pool migration logic 255. Because the illustrative data storage appliance 110X comprises only three storage service nodes 120 according to some embodiments, each storage service node in the illustrative appliance 110X comprises all three subsystems shown here—130, 140, and 150.

Metadata subsystem 140 tracks when EC data write operations succeed and fail and tracks where data blocks are stored in EC and/or RF3 vdisks; this tracking helps when reads are to be served and further during the healing and space reclamation processes. See also FIGS. 3A-3D.

EC/RF3 fault handling logic 206 is a functional component of storage proxy 106. Illustratively, logic 206 is responsible for confirming that EC write requests were successfully completed, reacting to failed EC write requests by switching to RF3 write requests, and retrying RF3 write requests, as described in more detail above and in FIGS. 2C, 2D, 3B-3D, and 6B.

Read/write (R/W) handling logic 251 is a functional component of data storage subsystem 150, which executes on storage service nodes 120. Illustratively, logic 251 is generally responsible for receiving data blocks from storage proxy 106, generating EC fragments from the received data blocks, attempting to write EC fragments locally within the data storage subsystem 150, distributing other EC fragments to other data storage subsystems 150 on other storage service nodes 120 to be written therein, writing and distributing unfragmented data blocks to RF3 vdisks, collecting write confirmations on the write attempts, determining write success or failure against governing quorum values (e.g., 6 for EC, 2 for RF3), and reporting write success or failure to storage proxy 106. See also FIGS. 2C, 2D, 3B-3D, 5A-6B. Furthermore, logic 251 is also responsible for receiving read requests from storage proxy 106, querying metadata subsystem 140 to determine which storage containers comprise the EC fragments and/or unfragmented data block, retrieving the EC fragments and/or data block therefrom, reconstructing the data block from the retrieved EC fragments, and transmitting the data block to storage proxy 106 in response to the read request. See also FIG. 4.

Healing, clean-up, and space reclamation logic 253 is a functional component of data storage subsystem 150, which executes on storage service nodes 120. Illustratively, logic 253 runs periodically, when all storage service nodes are operational, to convert replicated data blocks in the RF3 vdisk(s) into EC fragments, cause the EC fragments to be stored in appropriate locations and storage pools on storage service nodes 120, and when the EC fragments have been successfully populated, remove the replicated data blocks from the RF3 vdisk(s) to free up storage space. See also FIGS. 5D and 7A-7B. Preferably, logic 253 limits itself to RF3 vdisks having an epoch greater than two hours ago to ensure that no in-flight data blocks are waiting to be written. Preferably, logic 253 runs only if all storage service nodes 120 are operational in the storage cluster, in order to enable the EC fragments to be properly distributed and to avoid wasting processing cycles when the RF3 cannot be healed. Logic 253 may be implemented as one unified process or as distinct processes, without limitation.

Storage pool migration logic 255 is a functional component of data storage subsystem 150, which executes on storage service nodes 120. Illustratively, logic 255 executes when a storage pool is in a failed state (e.g., one or more physical data storage resources that form the storage pool have failed). Logic 255 attempts to heal the failure by migrating the data on the failed storage pool (e.g., metacontainers) to another working storage pool. See also FIG. 8.

Figure 2B:
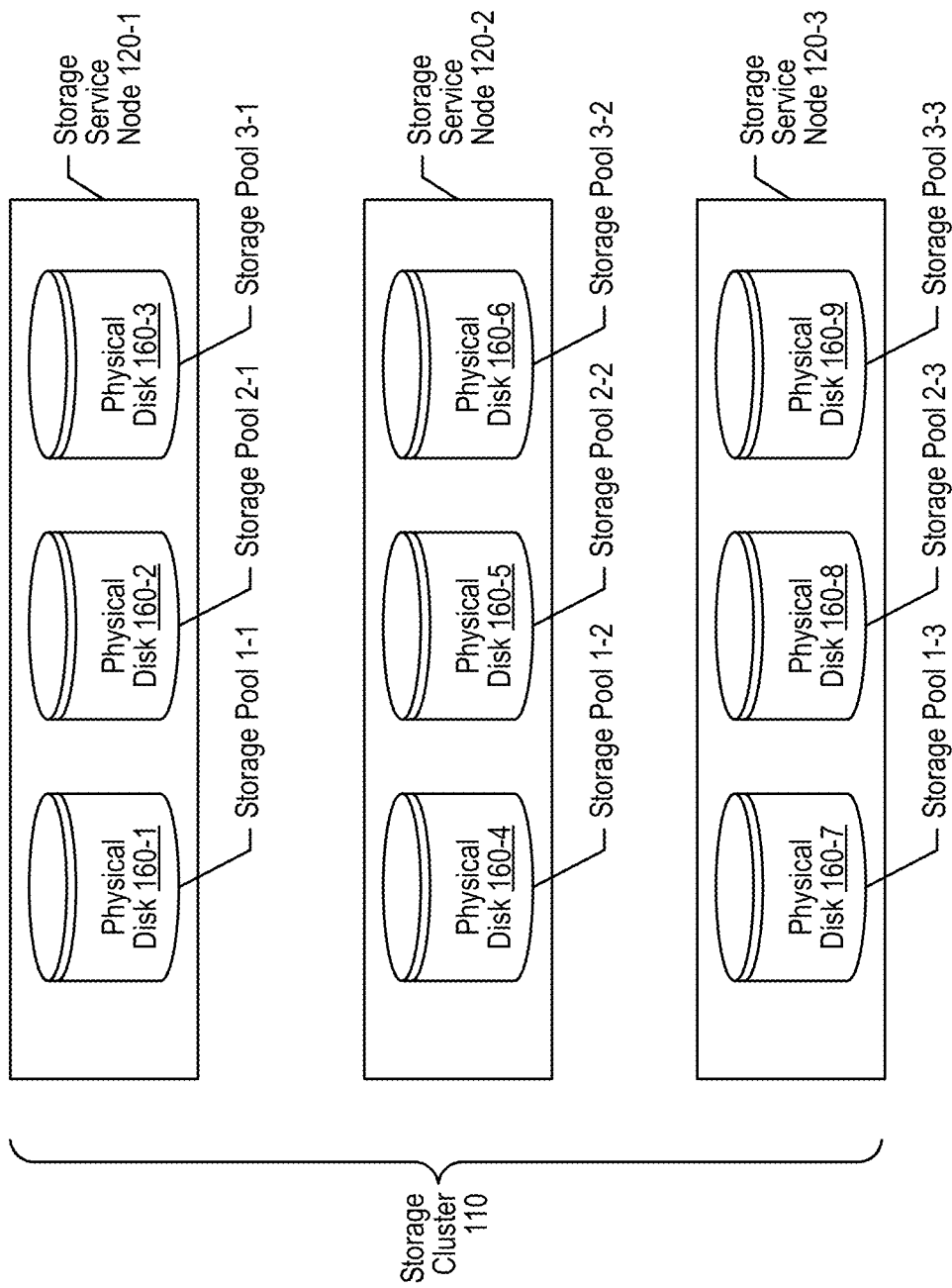
FIG. 2B is a block diagram depicting three storage service nodes configured in the distributed data storage system, each storage service node comprising three data storage disks (or other storage technology), and each disk defined as a storage pool within the platform, according to an illustrative embodiment.

FIG. 2B is a block diagram depicting three storage service nodes 120 (e.g., storage cluster 110 comprising storage service nodes 120-1, 120-2, and 120-3) configured in the distributed data storage system 100. In exclusive EC-configured data storage systems, each physical data storage resource (e.g., disk, drive) is defined as a distinct storage pool to maximize storage target diversity & recoverability. Each storage service node 120 illustratively comprises three data storage disks (or other storage technology) 160, and each disk 160 is defined as a distinct storage pool within the cluster, according to an illustrative embodiment. The reason for the one-to-one correspondence between data storage resource 160 (e.g., disk) and storage pool is to maximize the diversity of storage targets for the EC fragments, i.e., each fragment is stored in a different storage pool, and thus it resides in a distinct physical data storage resource 160. This reduces the chances of catastrophic failure, because when one disk 160 fails, it takes down only one of six EC fragments. With EC 4+2, so long as four or more EC fragments are available on working disks, the data block can be reconstructed and used. Thus, the illustrative system is preferentially configured to store each fragment of a data block to a separate storage pool having its own distinct physical storage resource(s) 160, separate from storage resources 160 of other storage pools. See also FIG. 2C.

Figure 2C:
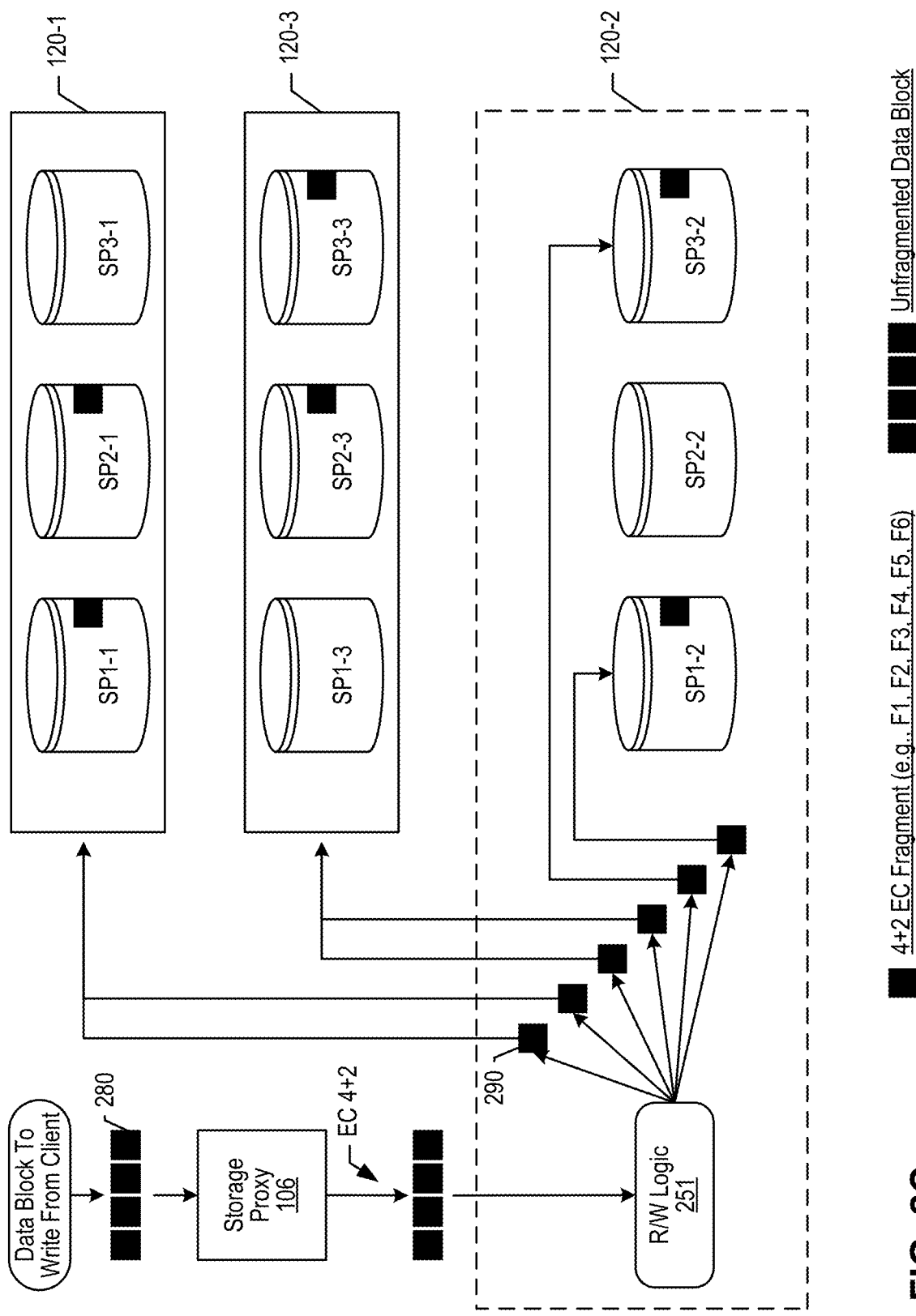
FIG. 2C is a block diagram depicting how 4+2 EC fragments are distributed across storage service nodes and storage pools in the distributed data storage system, according to an illustrative embodiment.

FIG. 2C is a block diagram depicting how 4+2 EC fragments are distributed across storage service nodes and storage pools in system 100, according to an illustrative embodiment. According to an erasure coding scheme of 4+2, erasure-coded fragments are distributed across storage service nodes and storage pools to maximize resiliency and the write quorum used is 6. Preferably, the six erasure-coded fragments 290 of the data block are distributed among a maximum number of storage service nodes in the distributed data storage system, in this example to a maximum of three storage service nodes. Preferably, again in order to maximize space efficiency, only one instance of each of the erasure-coded fragments of the data block is stored in the distributed data storage system. To maximize resiliency, each one of the erasure-coded fragments is hosted by a data storage resource (e.g., physical disk) that is separate from other data storage resources hosting other of the erasure-coded fragments of the first data block. These preferences are depicted in the present figure.

The present figure depicts an unfragmented data block 280 arriving in a write request at storage proxy 106. Storage proxy 106 transmits data block 280, with EC properties and/or EC instructions to a data storage subsystem 150 at a storage service node 120, e.g., received by logic 251 at storage service node 120-2. Logic 251 fragments data block 280 into six fragments 290 according to an EC 4+2 algorithm (EC scheme). Logic 251 causes two fragments 290 to be written locally at the storage service node, e.g., to storage pool 1-2 and storage pool 3-2; transmits two other fragments 290 to storage service node 120-3, to be written to storage pool 2-3 and storage pool 3-3; and transmits the remaining two fragments 290 to storage service node 120-1, to be written to storage pool 1-1 and storage pool 2-1, without limitation. Logic 251 awaits and collects confirmation from the storage service nodes that the six fragments 290 were successfully written. If logic 251 determines that a write failure occurred when fewer than six fragments were successfully written, FIG. 2D depicts the next steps.

Figure 2D:
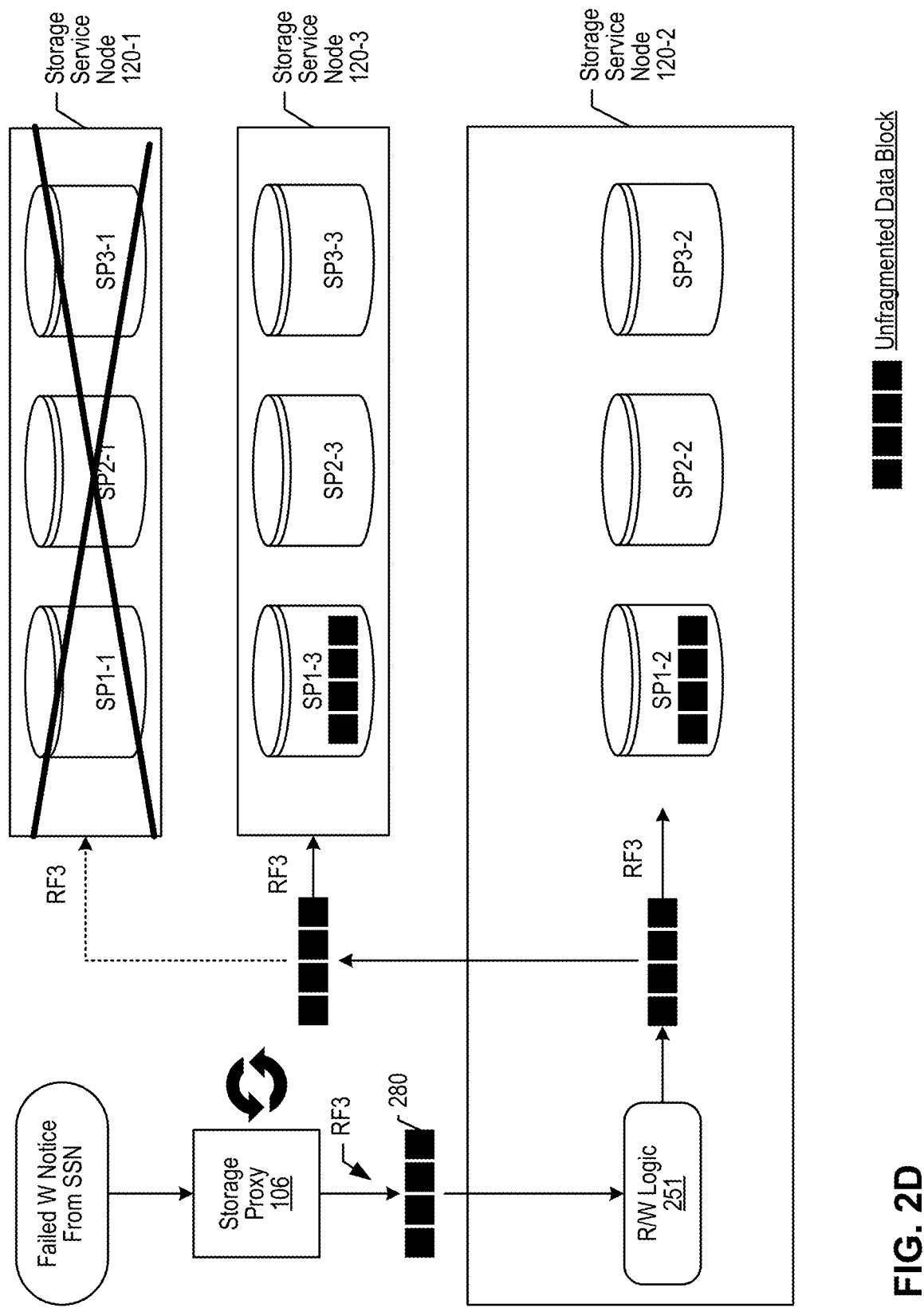
FIG. 2D is a block diagram depicting how, on failure to write every EC fragment to the distributed data storage system, the storage proxy constructs an RF3 vdisk and transmits an unfragmented data block to be written in replicated form to the RF3 vdisk, according to an illustrative embodiment.

FIG. 2D is a block diagram depicting how, on failure to write every EC fragment to storage cluster 110, storage proxy 106 constructs an RF3 vdisk and transmits an unfragmented data block to be written in replicated form to the RF3 vdisk, according to an illustrative embodiment. The write quorum for unfragmented writes to RF3 vdisk=2 according to the illustrative embodiments.

The present figure depicts a failed write notice or indication arriving at storage proxy 106 from a storage service node, e.g., 120-2. The failure may be due to storage service node 120-1 being out of service (unavailable, down, not operational, non-working, etc.) as shown by the X in the figure. In response to the failure notice, storage proxy 106 causes an RF3 vdisk to be created at storage cluster 110, such that the RF3 vdisk is associated with the user virtual disk that was the original destination of the data block and is also associated with the EC vdisk that failed to write the fragmented data block. Storage proxy 106 transmits data block 280, with RF3 properties and/or RF3 instructions to a data storage subsystem 150 at a storage service node 120, e.g., received by logic 251 at storage service node 120-2. Logic 251 causes unfragmented block 280 to be written in unfragmented form to one of the storage pools at the local storage service node, e.g., SP 1-2. Logic 251 transmits unfragmented block 280 to storage service node 120-3 to be written at a storage pool thereon, e.g., SP 1-3. Logic 251 may further transmit unfragmented block 280 to storage service node 120-1 to be written at a storage pool thereon, or, if aware that node 120-1 is down, logic 251 may refrain from transmitting block 280 thereto to save on processing cycles and bandwidth.

Logic 251 awaits and collects confirmation from the storage service nodes that at least two instances of unfragmented block 280 were successfully written. If storage service node 120-1 has recovered after a prior write attempt (not shown here), unfragmented block 280 will be written there as well to a storage container of the RF3 vdisk. Logic 251 may receive actual failure messages and/or may determine that a write failure occurred when fewer than two instances of block 280 were successfully written to the RF3 vdisk; logic 251 reports a write failure to storage proxy 106, which then tries again a number of times (e.g., a total of five tries) to write unfragmented block 280 to the RF3 vdisk. Success is defined by meeting a quorum value of two or more successful writes of block 280 to RF3 vdisk, and logic 251 reports success to storage proxy 106. Other error conditions are described in FIG. 3D.

Figure 3A:
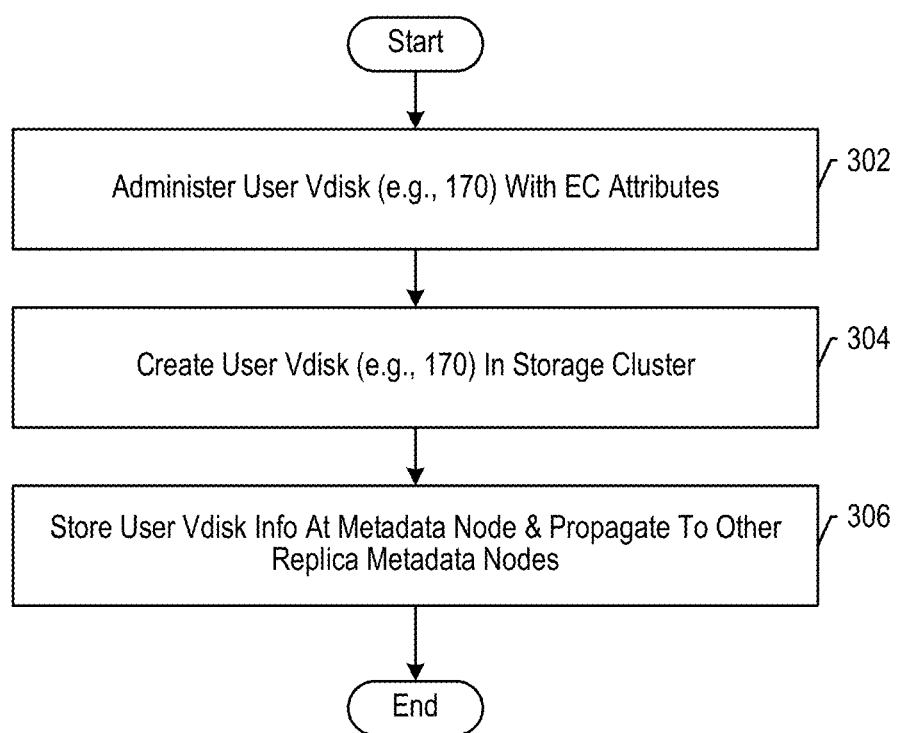
FIG. 3A is a fence diagram depicting certain operations of a method 300A.

FIG. 3A is a flow chart depicting certain operations of a method 300A. Method 300A is generally directed at configuring and generating a virtual disk 170 in system 100, which is EC configured or EC enabled. In particular regard to EC-configured systems, virtual disk 170 is also referred to herein as a "user vdisk" 170, because it is "visible" or exposed as a storage target to applications 132 using system 100 for data storage. In contrast, the EC vdisk(s) and RF3 vdisk(s) generated within system 100 are internally operated by system 100 without exposing them to the applications 132. Thus, an application 132 reads and writes from/to an exposed user vdisk 170 having a certain vdisk identifier (e.g., an alphanumeric ID) and the application 132 has no awareness of the dynamically configured EC and RF3 virtual disks that actually comprise the stored data in the storage cluster.

At operation 302, a user vdisk 170 is administered and configured within storage cluster 110, and at operation 304 the user vdisk and other associated data structures are created within system 100. In the illustrative embodiments, the user vdisk 170 is created with protection policy ERASURE (EC). When the data cluster has fewer than data+parity (EC-count) storage service nodes, the system follows the disclosed EC-RF3 architecture. In EC-RF3, if a user creates a user vdisk 170 and names it "targetvdisk001," for example, system 100 creates an associated EC vdisk and also dynamically (as needed) creates an associated RF3 vdisk. The EC vdisk and the RF3 vdisk are not visible to users/administrators or to applications using the system. The illustrative naming convention creates an association between the EC vdisk and the corresponding RF3 vdisk by including a prefix to the RF3 vdisk name of "RF3SecondaryForEC" concatenated with the EC vdisk name, e.g., "RF3SecondaryForECtargetvdisk001."

The system also establishes write quorum and read quorum values for the EC vdisk and the RF3 vdisk. The write quorum of the EC vdisk is data+parity (EC-count), e.g., six (6) for EC 4+2. The write quorum of the RF3 vdisk is two (2). The read quorum of the EC vdisk is Data fragments, e.g., four (4) for EC 4+2. The read quorum for the RF3 Vdisk is one (1), because data blocks are stored in unfragmented form in the RF3 vdisk.

All client applications talk to storage proxy 106, which acts as a protocol consolidator for object-storage, NFS, block protocols, etc. Storage proxy 106 uses an Application Programming Interface (API) exposed by system 100 to read/write data from/to system 100. Some of the examples given herein use Network File System (NFS) as an example to ease the reader's understanding of the present disclosure, but the invention is not limited to NFS. In NFS configurations, every file on the user vdisk export is treated as a separate vdisk in system 100. System 100 assigns an inode identifier to each user's data file.

Consider an example export (user vdisk) with the name of "targetvdisk001." The data file being written has been assigned inode identifier "124." Storage proxy 106 constructs an EC vdisk with the internal name of "NFSFILE_targetvdisk001_<MetaContainerId>_124," which reflects an association with: the user vdisk named targetvdisk001, with the internal file-specific inode identifier, and with a meta-container that the inode maps to. Thus, the illustrative internal name format of the EC vdisk is NFSFILE_<export name>_<MetaContainerId>_<Inode>. This invention is not limited to this naming convention or to this method of providing associations, and other embodiments may use other naming conventions and other means of associating the various elements disclosed herein.

For NFS backup filer-type workloads, data storage subsystem 150 uses meta-containers to collate data of multiple inodes, which may be associated with multiple distinct vdisks. The meta-container is illustratively stored in a memory "memtable" and then flushed to file with their respective files named after their user vdisk name. For each export (user vdisk) created, system 100 creates and assigns a fixed number of meta-containers. All files written to this export (user vdisk) are hashed to one of these meta-containers, each one having a unique meta-container identifier, which is used in the naming convention of the EC vdisk name. For illustration purposes, assume that inode 124 hashes to meta-container ID 4. The resulting internal EC vdisk name is "NFSFILE_targetvdisk001_4_124." Accordingly, storage proxy 106 writes data for a user file with corresponding inode 124 that is associated with user vdisk targetvdisk001 to EC vdisk "NFSFILE_targetvdisk001_4_124." If it turns out that the writes fail on the EC vdisk, because the write quorum was not met, storage proxy 106 constructs on the fly the RF3 vdisk name as, for example, "NFSFILE_RF3SecondaryForECtargetvdisk001_4_124-badbeef442057." This naming convention creates an association between the EC vdisk and the RF3 vdisk, indicates that the RF3 vdisk is used here as an error condition for failure to write to the EC vdisk, and further adds a timing epoch, e.g., 442057. The illustrative 442057 is the current epoch in hours. If a large file is being continuously written for more than an hour to the RF3 vdisk, then system 100 ensures that data is spread across multiple RF3 vdisks over the duration, by embedding the epoch in the RF3 vdisk name, and starting up a new RF3 vdisk in the next epoch. This scheme allows system 100 to limit the amount of data on each RF3 vdisk and to more speedily and granularly transfer data from any given RF3 vdisk back to its associated EC vdisk in the healing process, and to more quickly and granularly clean up each RF3 vdisk and reclaim space. In the illustrative examples, the general format for the RF3 file vdisk name is: NFSFILE_<RF3ExportVDiskName>_<MetaContainerId>_<inode>badbeef<EpochInHour>, but the invention is not limited to this naming convention.

At operation 306, system 100 generates metadata and propagates it to replica metadata nodes. For every block in a file written to system 100, the system maintains the following states {block ID, version, timestamp, secondaryVDiskName} in metadata subsystem 140 for the EC vdisk under the VirtualDiskBlockInfo column family. The secondaryVDiskName is the RF3VDiskName if the data was written on RF3 vdisk. The metadata subsystem 140 also records that data was not written to the EC vdisk with the following additional metadata: {failedLocations, version, timestamp} for every block under the VirtualDiskFailedBlockInfo column family. For example, failedLocations indicate all the nodes where the data was not written to as bit-masked long. If the client application tries to read the file with inode 124, for every block of inode 124 storage proxy 106 fetches VirtualDiskBlockInfo from metadata subsystem 140 and checks whether the secondaryVDiskName is present. If the secondaryVDiskName is present, then storage proxy 106 knows that the data is sitting on the RF3 vdisk, not on the EC vdisk. Accordingly, storage proxy 106 reads the data from the RF3 vdisk using the secondaryVDiskName and returns the results to the client application.

After method 300A completes in regard to a first user vdisk 170, method 300A may repeat for setting up another user vdisk 170. Method 300A may execute any number of times to set up any number of user vdisks 170 within system 100.

Figure 3B:
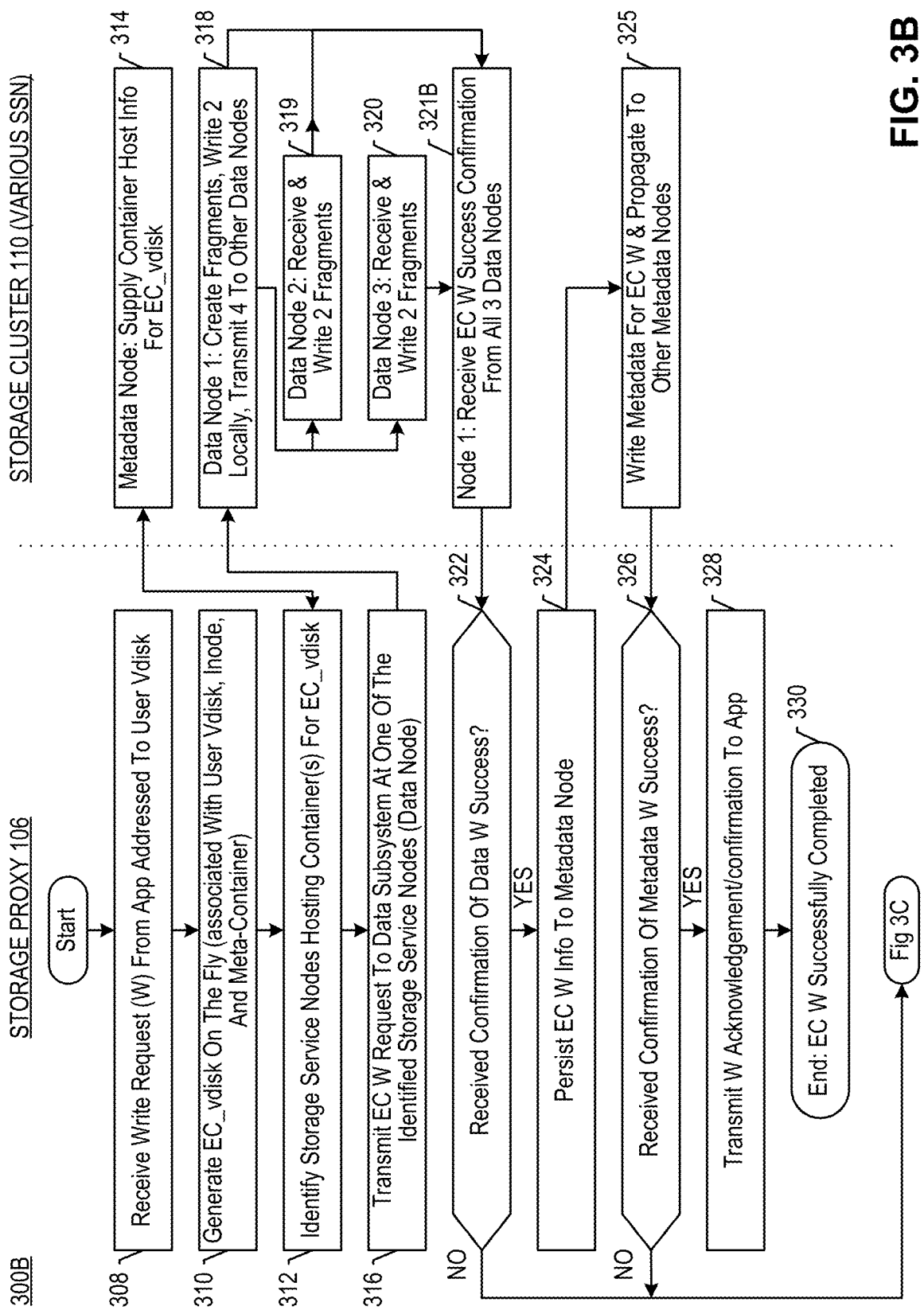
FIGS. 3B-3D depict a fence diagram for describing certain operations of a method 300B for writing data blocks, according to an illustrative embodiment
Figure 3C:
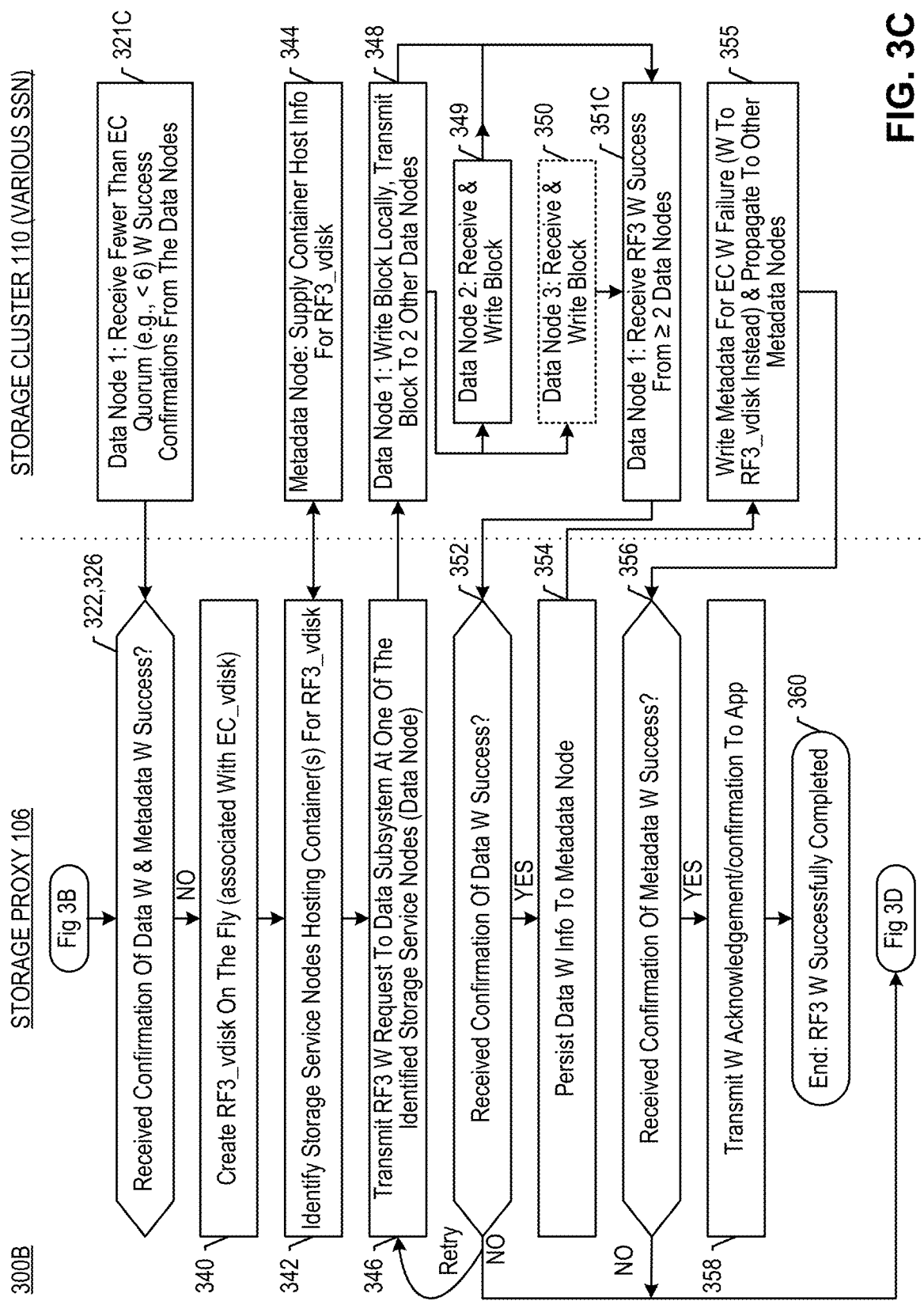
Figure 3D:
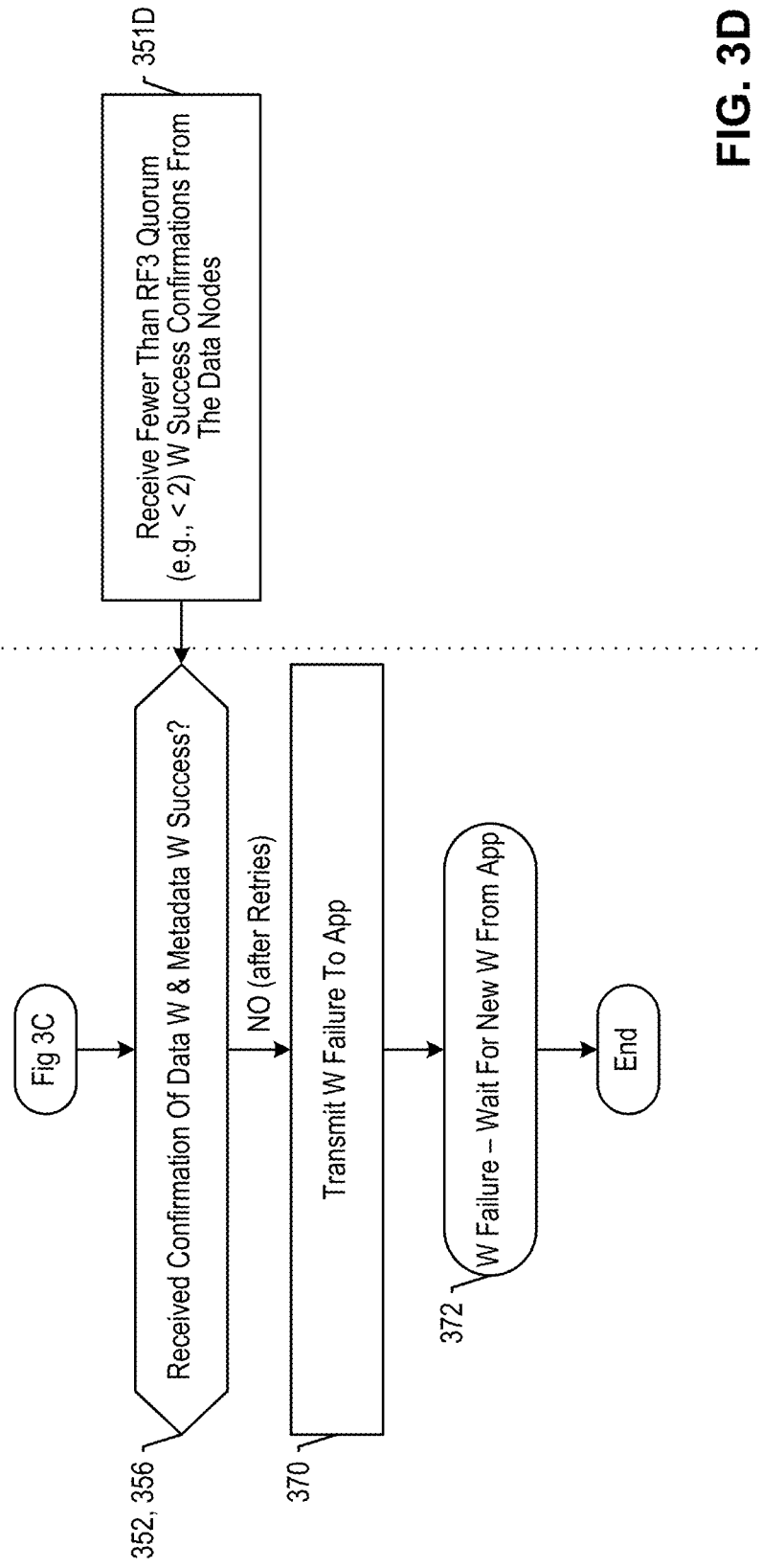

FIGS. 3B-3D depict a fence diagram for describing certain operations of a method 300B for writing data blocks, according to an illustrative embodiment. The operations on the left side of the figures are performed by storage proxy 106, and the operations depicted on the right side of the figures are performed at the storage cluster 110, by one or more metadata nodes (i.e., metadata subsystem 140 at a storage service node) or data nodes (i.e., data storage subsystem 150 at a storage service node). Method 300B follows the successful completion of method 300A depicted in the preceding figure.

FIG. 3B depicts a portion of method 300B that handles a successful EC write operation. At operation 308, storage proxy 106 receives a write request (W) from application 132 addressed to a target user vdisk 170 and to a user filename identified internally by an inode (e.g., inode 124). The write request comprises an unfragmented data block 280. At operation 310, storage proxy 106, recognizing that the system and/or the target user vdisk is configured for EC, generates on the fly an EC vdisk that is associated with the target user vdisk. Illustratively, the association is reflected in the name of the EC vdisk, e.g., NFSFILE_targetvdisk001_4_124. At operation 312, storage proxy 106 identifies the storage service nodes 120 that host storage containers of the EC vdisk. This is accomplished by querying a metadata node that hosts the metadata of the EC vdisk, e.g., VirtualDiskBlockInfo, and at operation 314 metadata subsystem 140 at the metadata node responds to the query. In an illustrative three-node EC configuration (see, e.g., FIG. 2C), the metadata node indicates storage service nodes 120-1, 120-2, and 120-3 as the host nodes. There are fewer nodes in the system than the EC-count value of 6, and thus nodes do double duty, hosting multiple containers in multiple storage pools as shown in the example of FIG. 2C.

At operation 316, storage proxy 106 transmits the unfragmented data block 280 in a write request with EC attributes to a data storage subsystem 150 at one of the storage service nodes (e.g., data node 1 at storage service node 120-2 as depicted in FIG. 2C). At operation 318, the receiving data node (e.g., logic 251) creates six EC fragments 290 from the unfragmented data block 280, causes two of the fragments to be written locally at data node 1 (e.g., storage service node 120-2), transmits two other fragments to data node 2 (e.g., storage service node 120-3), and transmits the remaining two fragments to data node 3 (e.g., storage service node 120-1). At operation 319, data node 2 successfully writes two fragments 290 locally in its data storage subsystem 150. At operation 320, data node 3 successfully writes two fragments 290 locally in its data storage subsystem 150. At operation 321B, data node 1 (the receiving node) receives confirmations that all three data nodes have successfully written their respective EC fragments. Since the write quorum value for EC 4+2 is 6, all six writes must be successful for data node 1 to declare the EC data write operation successful. Accordingly, data node 1 reports success to storage proxy 106 at operation 321B. A write failure is reflected at operation 321C in the next figure.

At operation 322, which is a decision point, storage proxy 106 determines whether it received confirmation of a successful write of the EC fragments. On write failure, control passes to FIG. 3C. On write success, control passes to operation 324. At operation 324, storage proxy 106 persists the EC write information to metadata subsystem 140, by transmitting EC write information to a metadata node. At operation 325, the receiving metadata node (e.g., subsystem 140 at a storage service node 120) writes metadata for the EC write, e.g., VirtualDiskBlockInfo column family, and propagates the resulting metadata to replica metadata nodes. Metadata write success is then reported to storage proxy 106. At operation 326, which is a decision point, storage proxy 106 determines whether it received confirmation of a successful metadata write. On write failure, control passes to FIG. 3C.

At operation 328, which follows successful EC data writes and associated metadata writes, storage proxy 106 transmits to application 132 an acknowledgement of success in response to the write request received therefrom at operation 308. When method 300B reaches point 330, the EC write operation is considered successfully completed, this branch of method 300B ends, and storage proxy 106 is ready to receive another write request or a read request, e.g., operation 308, FIG. 4, respectively.

FIG. 3C depicts a portion of method 300B that handles a failed EC write attempt and successfully completes an RF3 write instead. At operation 321C, which is an alternative to operation 321B in the preceding figure, data node 1 does not receive confirmations that all three data nodes have successfully written their respective EC fragments. Since the write quorum value for EC 4+2 is 6, fewer than six writes are considered a failed EC write. Accordingly, data node 1 reports failure to storage proxy 106 at operation 321C.

If either decision point 322 or 326 are in the negative, i.e., the EC data writes and/or the corresponding metadata writes failed, control passes to operation 340. Successful EC writes are described in the preceding figure.

At operation 340, storage proxy 106 creates on the fly an RF3 vdisk associated with the EC vdisk that had the EC write failure. Illustratively, the association is reflected in the name of the RF3 vdisk as described above. At operation 342, storage proxy 106 identifies the storage service nodes 120 that host storage containers of the RF3 vdisk. This is accomplished by checking a local cache at the storage proxy or by querying a metadata node that hosts metadata of the RF3 vdisk, and at operation 344 metadata subsystem 140 at the metadata node responds to the query. In an illustrative three-node EC configuration, the metadata node indicates storage service nodes 120-1, 120-2, and 120-3 as the host nodes. There are three nodes here, the same as the RF3 replication factor, and thus each storage service node is assigned to host a container for the RF3 vdisk as shown in the example of FIG. 2D.

At operation 346, storage proxy 106 transmits the unfragmented data block 280 in a write request with RF3 attributes to a data storage subsystem 150 at one of the storage service nodes (e.g., data node 1 at storage service node 120-2 as depicted in FIG. 2D). At operation 348, the receiving data node 1 causes the unfragmented block 280 to be written locally at data node 1, transmits a replica of block 280 to data node 2, and transmits another replica of block 280 to data node 3. At operation 349, data node 2 receives and successfully writes unfragmented block 280 locally in its data storage subsystem 150. At operation 350, data node 3 receives and successfully writes unfragmented block 280 locally in its data storage subsystem 150. Operation 350 is shown in dotted outline to indicate that this operation may fail in some scenarios. At operation 344, data node 1 receives confirmations from at least two data nodes (including itself) reporting that they have successfully written their respective replica of block 280. Since the write quorum value for RF3 is 2, only two writes of unfragmented block 280 must be successful for data node 1 to declare the RF3 data write operation successful. Accordingly, at operation 351C, data node 1 reports success to storage proxy 106. A write failure is shown at operation 351D in the next figure.

At operation 352, which is a decision point, storage proxy 106 determines whether it received confirmation of a successful RF3 data write. On RF3 write failure, storage proxy 106 may retry (e.g., four more times, without limitation) after which control passes to FIG. 3D. On write success, control passes to operation 354. At operation 354, storage proxy 106 persists the RF3 write information to metadata, by transmitting RF3 write information to a metadata node. At operation 355, the receiving metadata node (e.g., subsystem 140 at storage service node 120-3) writes the metadata, e.g., VirtualDiskFailedBlockInfo column family, and propagates the resulting metadata to other metadata nodes. Metadata write success is then reported to storage proxy 106 at operation 355. At operation 356, which is a decision point, storage proxy 106 determines whether it received confirmation of a successful write of the metadata. On write failure, storage proxy 106 will retry operation 346 and after all retries fail, control passes to FIG. 3D.

At operation 358, storage proxy 106 transmits to application 132 an acknowledgement of success in response to the write request received therefrom at operation 308. When method 300B reaches point 360, the RF3 write operation is considered successfully completed, this branch of method 300B ends here, and storage proxy 106 is ready to receive another write request or a read request, e.g., operation 308, FIG. 4, respectively.

FIG. 3D depicts a portion of method 300B that handles a failed RF3 write attempt. At operation 351D, which is an alternative to operation 351C in the preceding figure, data node 1 does not receive confirmations that two or more data nodes have successfully written their respective unfragmented data block replicas, i.e., the RF3 write quorum of 2 is not met. Therefore, at operation 351D, data node 1 reports RF3 write failure to storage proxy 106. If either decision point 352 or 356 are in the negative, i.e., the RF3 data writes and/or the corresponding metadata writes failed after retries, control passes to operation 370. Write successes are described in the preceding figure.

At operation 370, having failed to write the data block in EC fragments and further failed to write it in RF3 form, even after retries, storage proxy 106 transmits a write failure response to the originating application 132. Notably, any data writes that do not meet the applicable quorum (6 for EC and 2 for RF3) are considered failed writes, because they lack the minimum required resiliency of storage cluster 110. Accordingly, when method 300B reaches point 372, the write request received at operation 308 is considered failed and storage proxy 106 awaits a new write request from application 132. Method 300B ends here.

Block-By-Block Granularity. The illustrative method 300B operates at a block-by-block granularity. Accordingly, as soon as a failed storage pool or storage service node is back in operation, incoming data blocks will be again diverted to the EC vdisk(s) even after a relatively long period of RF3 writes. See, e.g., operation 310.

Figure 4:
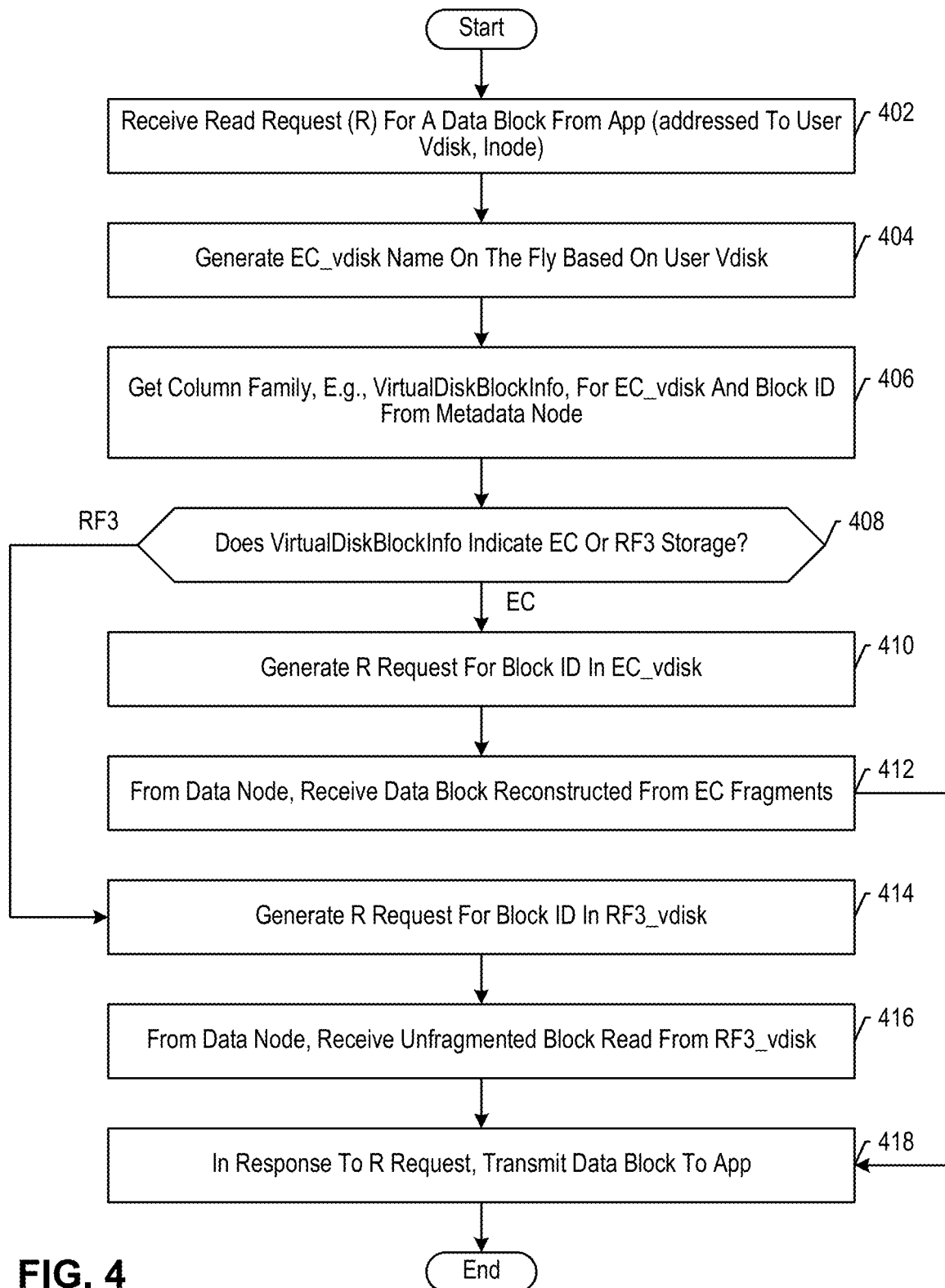
FIG. 4 is a flow chart depicting certain operations of a method 400 for reading data blocks, according to an illustrative embodiment.

FIG. 4 is a flow chart depicting certain operations of a method 400 for reading data blocks from storage cluster 110, according to an illustrative embodiment. Method 400 is performed by one or more components of system 100.

At operation 402, storage proxy 106 receives a read request (R) from application 132, which is addressed to a user vdisk associated with the application and is also addressed to a user filename identified internally by an inode ID. Storage proxy 106 intercepts the read request. The read request indicates one or more data blocks stored in the user vdisk. For the sake of using a simplifying example herein, the read request specifies one data block ("the specified data block").

At operation 404, based on configuration parameters indicating that system 100 is configured for EC 4+2, and/or the user vdisk is configured for EC 4+2, and/or based on other configuration parameters requiring EC 4+2, storage proxy 106 generates (resolves, determines) on the fly the name of the EC vdisk associated with the target user vdisk and inode (e.g., NFSFILE_targetvdisk001_4_124). At operation 406, storage proxy 106 retrieves or obtains from a metadata node a metadata information for the EC vdisk (e.g., VirtualDiskBlockInfo column family) and a block ID for the specified data block in the read request. This information will enable storage proxy 106 to request the specified data block (whether in EC or RF3 form) from storage cluster 110. Before generating such a request to storage cluster 110, storage proxy 106 determines, at operation 408, whether the specified data block is stored in EC fragments or in RF3 form. This information is available from the metadata subsystem 140 associated with the EC vdisk, e.g., from the VirtualDiskBlockInfo column family and/or the VirtualDiskFailedBlockInfo column family, without limitation. If the specified data block is stored in RF3 form (i.e., in the RF3 vdisk), control passes to operation 414. If the specified data block is stored in EC form (i.e., in fragments in the EC vdisk), control passes to operation 410.

At operation 410, storage proxy 106 generates a read request (directed to a data storage subsystem 150) for the block ID within storage cluster 110 that corresponds to the specified data block. In this operation, the data block identified by the block ID resides in the EC vdisk. The data storage subsystem 150 retrieves four or more of the six EC fragments 290 associated with the block ID, reconstructs the specified data block, and returns the reconstructed (unfragmented) data block 280 to storage proxy 106 at operation 412. Control passes to operation 418.

At operation 414, which follows a determination that the specified data block is stored in RF3 (replicated) form, i.e. unfragmented, at storage cluster 110, storage proxy 106 generates a read request (directed to a data storage subsystem 150) for the block ID within storage cluster 110 that corresponds to the specified data block. In this operation, the data block identified by the block ID resides in the RF3 vdisk. The data storage subsystem 150 retrieves one of the replicas 280 of the data block having the block ID, and returns the unfragmented data block 280 to storage proxy 106 at operation 416. Control passes to operation 418.

At operation 418, storage proxy 106 is in possession of the unfragmented specified data block 280, and transmits the specified data block to application 132 in response to the read request received at operation 402. Method 400 ends here.

Figure 5A:
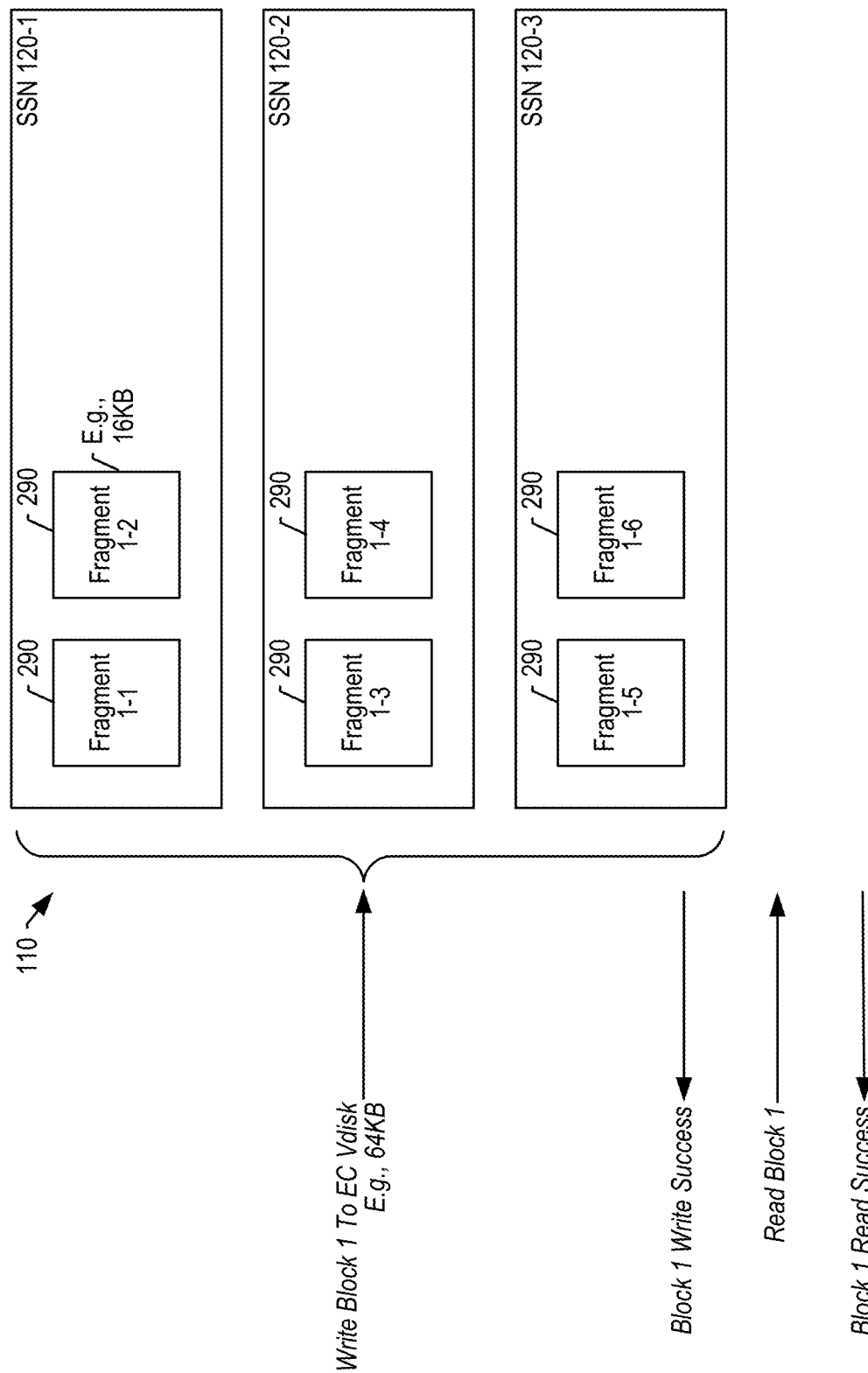
FIGS. 5A-5C depict various stages of writing data blocks to the distributed data storage system, rolling outages, and reading from the distributed data storage system.
Figure 5B:
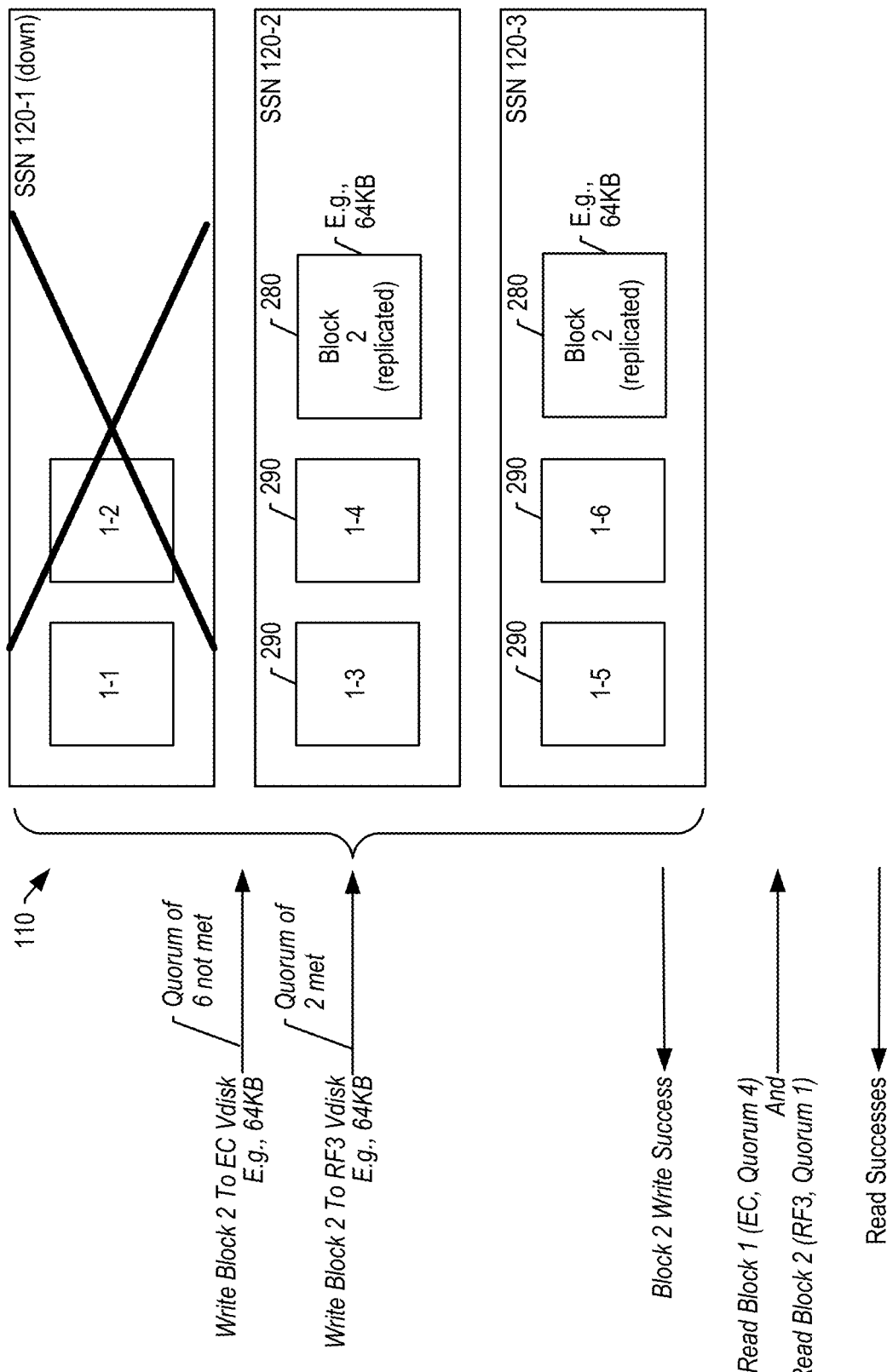
Figure 5C:
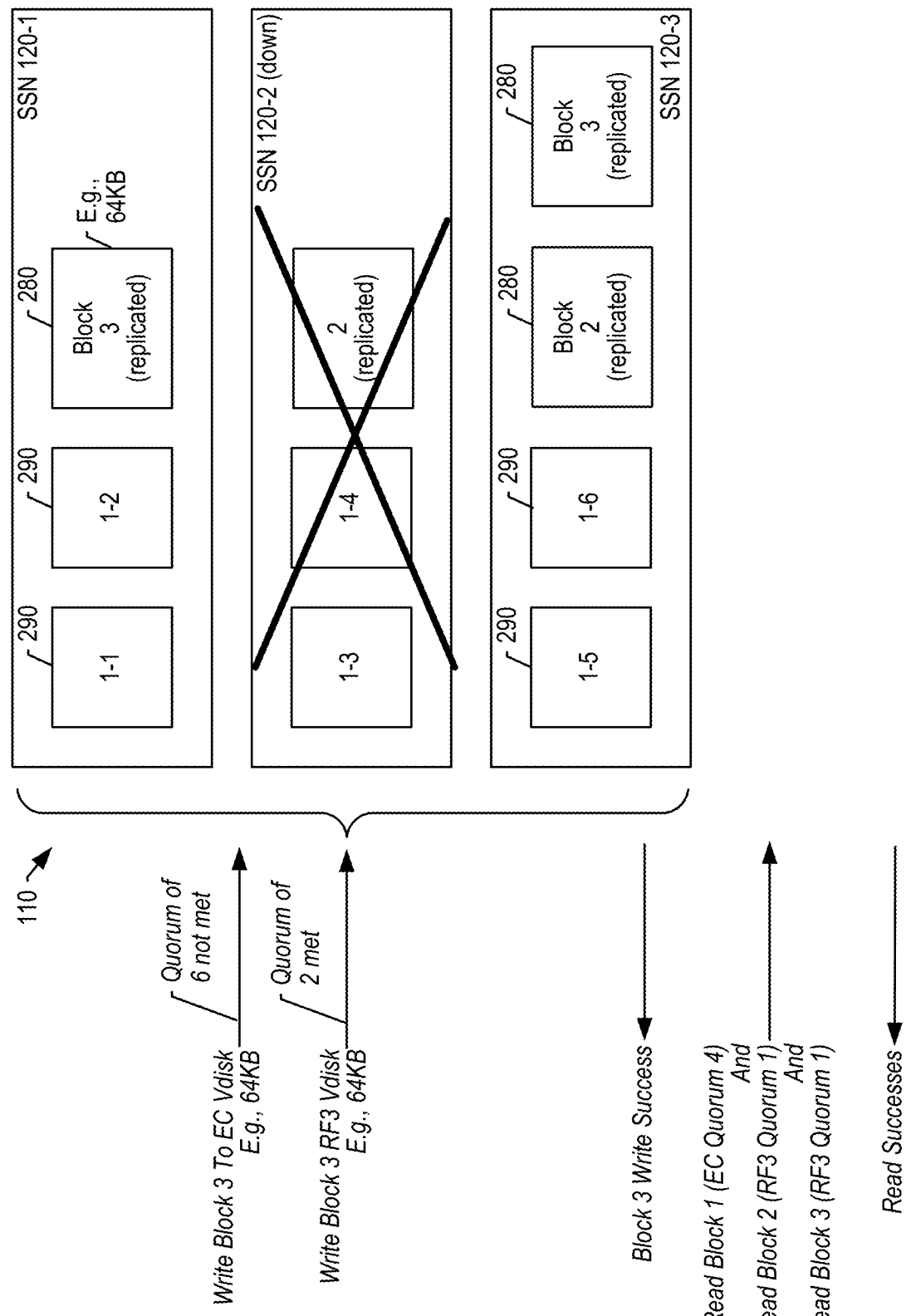

FIGS. 5A-5C depict various stages of writing data blocks to the illustrative distributed data storage system, experiencing rolling outages of storage service nodes or storage pools, and reading from the distributed data storage system. FIG. 5A depicts data block 1 (e.g., 64 KB in size) being successfully written in six EC fragments 290 (e.g., each fragment being 16 KB in size) at storage cluster 110. See also FIG. 2C. In this figure, three storage service nodes are operating in storage cluster 110. Accordingly, fragments 1-1 and 1-2 are written to distinct storage pools (storage pools are not shown in the present figure, but see FIGS. 2B and 2C) in storage service node 120-1; fragments 1-3 and 1-4 are written to distinct storage pools at storage service node 120-2; and fragments 1-5 and 1-6 are written to distinct storage pools at to storage service node 120-3. The write success is reported to storage proxy 106 (not shown here). Block 1 can be read successfully from any four of the six EC fragments.

FIG. 5B depicts a point in time after FIG. 5A, in which data block 2 is written successfully in unfragmented form at storage cluster 110. See also FIG. 2D. In this figure, storage service node 120-1 is out of service. Accordingly, a quorum of 6 cannot be met for writing data block 2 in EC fragments and instead data block 2 is written successfully as two unfragmented replicas 280 with RF3 properties to the working storage service nodes 120-2 and 120-3. Because the quorum of 2 is met for the RF3 write, a write success is reported to storage proxy 106 (not shown here). From the two working storage service nodes 120-2 and 120-3, both data block 1 and data block 2 can be read successfully. FIG. 5C depicts a point in time after FIG. 5B, in which data block 3 is written successfully in unfragmented form at storage cluster 110. See also FIG. 2D. In this figure, storage service node 120-1 is back in service and storage service node 120-2 is out of service. Accordingly, a quorum of 6 cannot be met for writing data block 3 in EC fragments and instead data block 3 is written successfully as two unfragmented replicas 280 with RF3 properties to the working storage service nodes 120-1 and 120-3. Because the quorum of 2 is met for the RF3 write, the write success is reported to storage proxy 106 (not shown here). From the two working storage service nodes 120-1 and 120-3, all three data blocks written so far (block 1, block 2, and block 3) can be read successfully. Thus, system 100 is resilient to rolling outages of storage service nodes. The examples of FIGS. 5A-5C depict outages at the storage service node level, but the operations would be the same if a storage pool targeted for an EC write is down instead of the whole service node.

FIG. 5D depicts a healing process and a clean-up (space reclamation) process that follow FIGS. 5A-5C on the distributed data storage system, according to an illustrative embodiment. Illustratively, logic 253 in data storage subsystem 150 performs the healing and clean-up processes. In the present figure, storage service nodes 120-1, 120-2, and 120-3 are all operational, so that the healing and clean-up processes may proceed. The healing process shown in the top half of the present figure depicts EC fragments 290 for unfragmented data blocks 2 and 3 being generated and stored, two each, to each storage service node 120. Following the successful writing of the EC fragments 290, space reclamation may proceed as shown in the bottom half of the present figure. Here, the replicated and unfragmented data blocks 2 and 3 (280) are deleted from the storage service nodes 120 so that the storage space they occupied may be reclaimed. At this point, all the data blocks in the storage cluster are written in EC 4+2 form (i.e., six fragments 290 each), which occupies less total storage space than storing data blocks 280 in RF3 form. See also FIGS. 7A-7B.

Figure 6A:
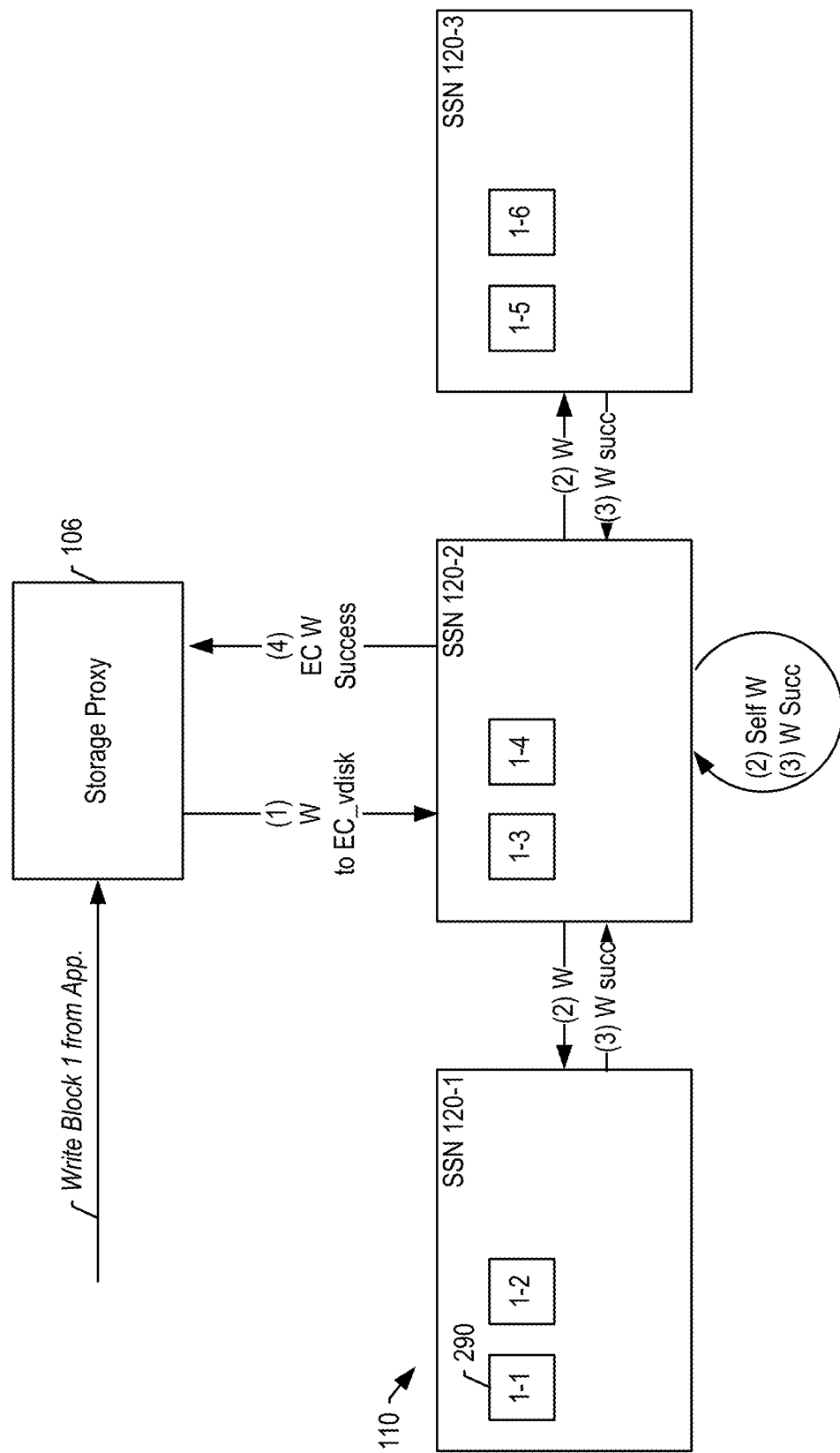
FIGS. 6A-6B depict a block diagram describing how a data block is written to the distributed data storage system, according to an illustrative embodiment.
Figure 6B:
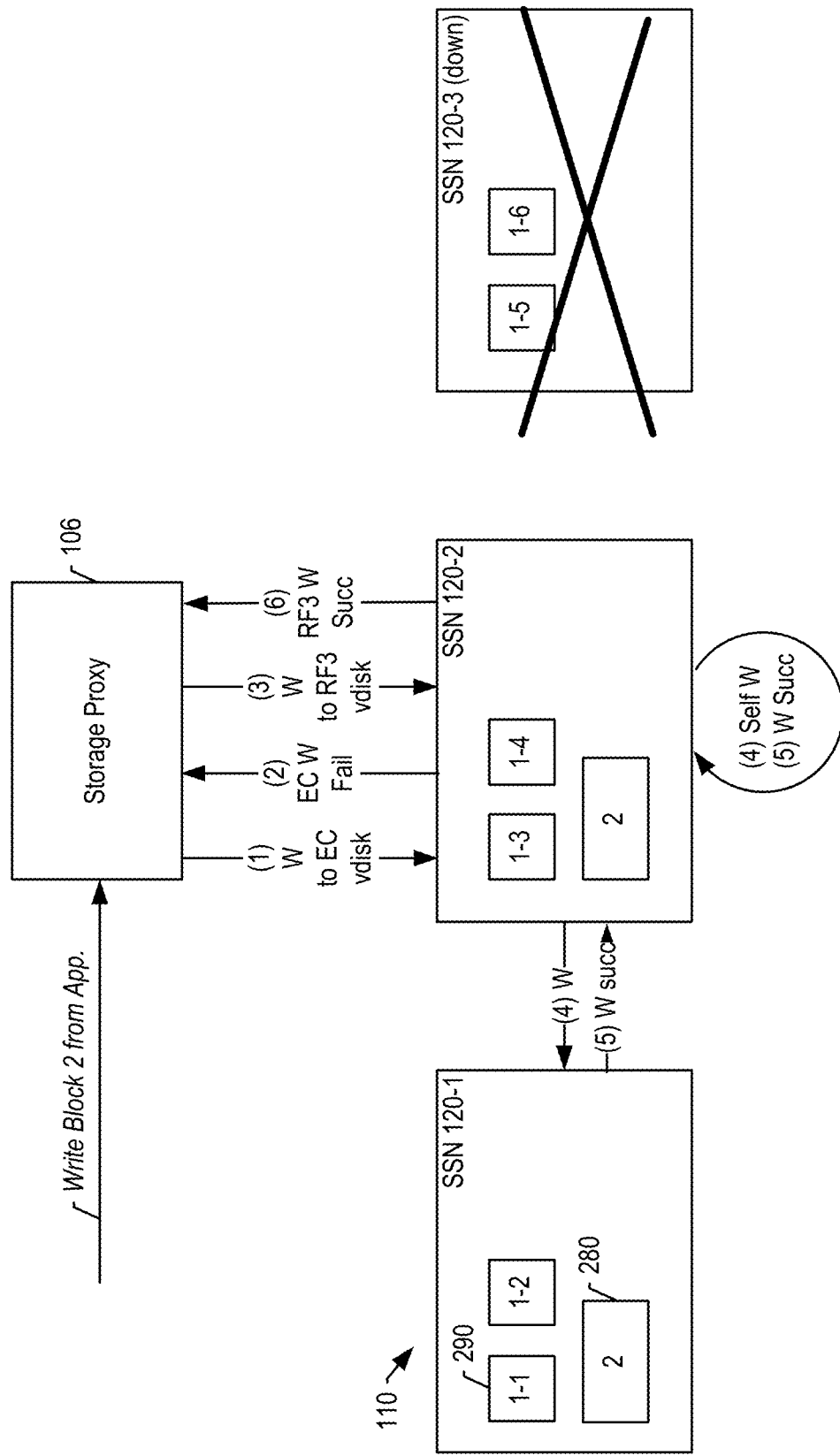

FIGS. 6A-6B depict a block diagram describing how a data block is written to the distributed data storage system, according to an illustrative embodiment. FIG. 6A depicts storage proxy 106 and storage cluster 110, and data block 1 being successfully written in six EC fragments 290 at storage cluster 110. See also FIG. 5A. Storage proxy 106 mounts the EC vdisk associated with the target user vdisk specified by the application. At operation (1) storage proxy 106 transmits data block 1 to data storage subsystem 150 at storage service node 120-2. The receiving storage service node 120-2 generates six EC fragments for data block 1 (e.g., using read/write logic 251) and at operation (2) causes the EC fragments to be written to itself as well as to the other two storage service nodes. Accordingly, fragments 1-1 and 1-2 are written to distinct storage pools (storage pools are not shown in the present figure, but see FIGS. 2B and 2C) in storage service node 120-1; fragments 1-3 and 1-4 are written to distinct storage pools at storage service node 120-2; and fragments 1-5 and 1-6 are written to storage service node 120-3. At operation (3), each storage service node 120 reports the successful write to storage service node 120-2, which originated the fragment write requests. After receiving successful write reports from all storage service nodes, satisfying a quorum of 6, storage service node 120-2 transmits a write success indication to storage proxy 106 at operation (4). Thus, the storage proxy 106 receives a confirmation that data block 1 was successfully written, after storage service node 120-2 receives confirmations that each of the six erasure-coded fragments of data block 1 was successfully stored at a distinct physical data storage resource in the distributed data storage system.

FIG. 6B depicts a point in time after FIG. 6A, in which data block 2 is written successfully in RF3 unfragmented form at storage cluster 110. See also FIG. 2D. In this figure, storage service node 120-3 is out of service. Accordingly, a quorum of 6 cannot be met for writing data block 2 in EC fragments and instead data block 2 is written successfully as two unfragmented replicas 280 with RF3 properties to the working storage service nodes 120-1 and 120-2. At operation (1) storage proxy 106 transmits data block 2 to data storage subsystem 150 at storage service node 120-2. The receiving storage service node 120-2 replies with an EC fail message at operation (2). In some embodiments, storage service node, e.g., 120-2, will attempt the EC writes, which will fail, whereas in other embodiments, storage service node 120 has awareness of the failed storage service node 120-3 and does not even attempt the EC writes. On receiving the EC write failure message (2), storage proxy 106 mounts the RF3 vdisk associated with the EC vdisk and transmits data block 2 to storage service node 120-2 with RF3 properties, i.e., requesting an unfragmented RF3 write at operation (3). Storage service node 120-2 (e.g., using read/write logic 251) at operation (4) causes the unfragmented data block 2 to be written to itself as well as to at least one of the other two storage service nodes. Accordingly, at operation (4) unfragmented data block 2 is successfully written (280) at storage service node 120-1 and also at storage service node 120-2. At operation (5), storage service nodes 120-1 and 120-2 report the successful write to storage service node 120-2, which originated the RF3 write requests. After receiving successful write reports satisfying a quorum of 2, storage service node 120-2 indicates write success to storage proxy 106 at operation (6). Thus, the storage proxy receives a confirmation that data block 2 was successfully written, after the storage service node 120-2 receives confirmations that at least two instances of data block 2, in unfragmented form, were successfully stored at data storage resources in the distributed data storage system.

FIGS. 7A-7B depict a healing process and a clean-up (space reclamation) process, respectively, on the distributed data storage system, according to an illustrative embodiment. See also FIG. 5D. Illustratively, logic 253 in data storage subsystem 150 performs the healing and clean-up processes. In the present figure, storage service nodes 120-1, 120-2, and 120-3 are all operational, which enables the healing and clean-up processes to proceed. The healing process shown in FIG. 7A depicts unfragmented data block 2 (280) being read at operation (1), and EC fragments for data block 2 (290-2) being generated and stored, two each, to each storage service node 120 at operation (2). Following the successful writing of the EC fragments 290-2, write successes are reported by the storage service nodes at operation (3). Metadata subsystem 140 is updated accordingly (not shown here) to track the newly created EC fragments for the block ID associated with data block 2. At this point, unfragmented block 2 (280) still resides in the RF3 vdisk.

After the healing process, space reclamation may proceed as shown in FIG. 7B. Here, the replicated and unfragmented data block 2 is deleted from the storage service nodes 120 at operation (4) so that the storage space may be reclaimed. At this point, all the data blocks in the storage cluster are written in EC 4+2 form (i.e., six fragments 290-2 each), which occupies less total storage space than storing data blocks in RF3 form. Logic 253 at data storage subsystem 150 of each storage service node reclaims the storage space. Metadata subsystem 140 is updated accordingly (not shown here) to reflect the deletions of unfragmented instances of data block 2.

Thus, in a distributed data storage system comprising a plurality of storage service nodes, such as system 100, wherein at least two instances of data block 2 (280), in unfragmented form, were successfully stored, a storage service node 120 applies an erasure coding scheme (e.g., EC 4+2) to data block 2 to generate a count of six EC fragments of data block 2. As noted, the plurality of storage service nodes is fewer than N, e.g., six EC fragments. The storage service node causes the six EC fragments of data block 2 to be written to a maximum number of storage service nodes (here for example three nodes) in the distributed data storage system, wherein only one instance of each of the six EC fragments of data block 2 is stored in the distributed data storage system, and wherein each one of the six EC fragments is hosted by a data storage resource (e.g., physical disk and/or storage pool) that is separate from other data storage resources hosting others of the six EC fragments of data block 2, as shown illustratively in FIG. 2C. After the six EC fragments of data block 2 (290-2) are successfully written to the storage service nodes, the distributed data storage system reclaims data storage space occupied by instances of data block 2, stored in unfragmented form, by deleting all such unfragmented instances, whereas the N (e.g., six) EC fragments of the first data block are retained.

An illustrative VirtualDiskRepair task runs periodically on every node, where it scans metadata subsystem 140 to figure out failed blocks (failed EC writes written as RF3) per user vdisk, and to process vdisks for which the metadata node is the owner. Once these data blocks are retrieved, and if they belong to EC 4+2 vdisk with configuration to run on a 3-node setup (which is a policy tagged at time of vdisk creation), the corresponding data blocks are read from RF3 vdisks, fragmented into EC fragments, and written to the appropriate EC vdisk. Once healing is complete, i.e., all data which was written during the EC failure window to RF3 vdisks has been reconstructed and written to EC vdisk, the RF3 data blocks are deleted from system 100.

Marking the RF3 vdisk for Delete. In order to mark an RF3 vdisk for deletion, the system ensures that all the blocks associated for that vdisk have been repaired for the corresponding EC vdisk. Operations to achieve this include, for example and without limitation: (a) read VirtualDiskFailedBlockInfo column family in metadata subsystem 140 to get all values present (in-memory and on-disk), and (b) process only RF3 vdisk(s) with epoch<(current time–2), i.e., older than two hours ago, to ensure that there is no in-flight data pending to be written. After an RF3 vdisk has been marked for deletion, the associated metadata is likewise marked, e.g., the VirtualDiskFailedBlockInfo column family is no longer needed.

Figure 8:
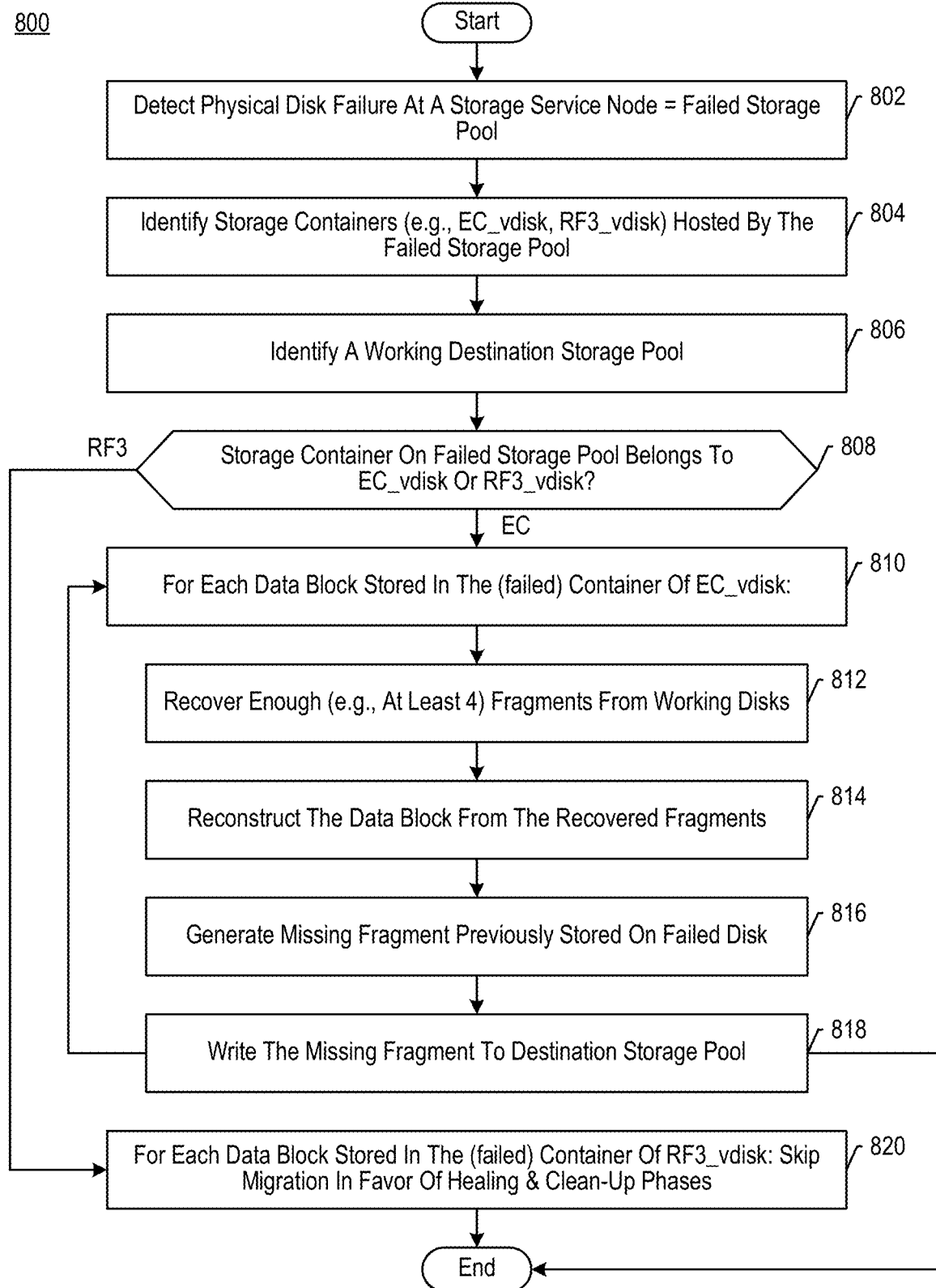
FIG. 8 is a flow chart depicting certain operations of a method 800 for storage pool migration in the distributed data storage system, according to an illustrative embodiment.

FIG. 8 is a flow chart depicting certain operations of a method 800 for storage pool migration in the distributed data storage system, according to an illustrative embodiment. Method 800 is performed by one or more components of data storage system 100, preferably by logic 255 in data storage subsystem 150. Storage pools are logical groupings of physical disks/drives in a storage service node and are configured as the protection unit for disk/drive failures and rebuilds. As shown in FIG. 2B, EC configurations assign a different storage pool to each data storage resource (e.g., physical disk) at each of the storage service nodes in order to improve target diversity and resiliency when EC fragments are written. When a single data storage resource (e.g., physical disk) fails rather than a full storage service node, the illustrative system is able to recover the lost data from other available disks and to store it to another disk on the system. Because a failed disk in a storage pool causes the entire storage pool to be failed, this recovery operation is referred to as storage pool migration. Because the data is stored in EC fragments distributed on six distinct physical disks across three different storage service nodes, the failure of one disk can be cured by reconstructing data blocks from four of the other disks. The metadata subsystem 140 indicates which data blocks were stored on the failed disk and further indicates where to find the other EC fragments associated with each data block. Accordingly, each data block is reconstructed from four EC fragments recovered from operational disks. The desired or missing EC fragment is determined from the reconstructed data block and is stored to the replacement disk/storage pool. Data blocks residing in RF3 vdisks (i.e., unfragmented) are excluded from storage pool migration, as they will be handled instead by the healing/reclamation process as shown in FIGS. 5D and 7A-7B. Storage pool migration of an EC vdisk happens at the granularity of a storage (or backing) container of the EC vdisk. For all the backing containers present in the storage pool of a failed disk, a new destination pool is chosen. Migration of an EC meta-container involves migrating each backing container of an EC vdisk present in that meta-container. In sum, for every data block with an EC fragment in the failed storage pool, every data fragment associated with that data block is read, the data block is reconstructed, and the missing fragment is stored to the new/destination storage pool to conclude the EC migration.

At operation 802, a data storage resource (e.g., physical disk) failure is detected, e.g., by data storage subsystem 150 at a storage service node. At operation 804, metadata subsystem 140 identifies one or more storage containers hosted by the failed disk (the failed storage containers). At operation 806, data storage subsystem 150 identifies another data storage resource (e.g., working physical disk, working storage pool) that can act as a destination/replacement storage pool for the failed disk. At operation 808, which is a decision point, data storage subsystem 150 determines, for each failed storage container that is part of an RF3 vdisk to pass control to operation 820; and for each failed storage container that is part of an EC vdisk to pass control to operation 810.

At operation 810, for each data block having an EC fragment in the failed storage container, data storage subsystem 150 is responsible for an operational loop that includes operations 812-818. At operation 812, metadata subsystem 140 selects the data storage subsystem 150 at the storage service node 120 hosting the replacement disk, and instructs the selected data storage subsystem 150 to recover at least four EC fragments of the data block from other working disks. At operation 814, the selected data storage subsystem 150 (e.g., using logic 251), having retrieved at least four EC fragments as instructed, reconstructs the data block at issue from four EC fragments, e.g., reconstructing data block 1. At operation 816, the selected data storage subsystem 150 (e.g., using logic 251) generates the EC fragment that was stored in the failed storage container (e.g., EC fragment 1-1). At operation 818, the selected data storage subsystem 150 (e.g., using logic 251) writes the EC fragment (e.g., 1-1) to the destination disk/storage pool identified at operation 806. Control passes back to operation 810 for migrating other EC fragments hosted by the failed storage container. After all missing EC fragments have been migrated from the failed data storage resource (e.g., physical disk) to the destination storage pool, method 800 ends.

At operation 818, method 800 skips migration of unfragmented RF3 data blocks from storage containers belonging to an RF3 vdisk. As noted above, such data blocks are excluded from storage pool migration, as they will be handled by the healing process as shown in FIGS. 5D and 7A-7B. Method 800 ends here.

Thus, according to method 800 and other embodiments, EC data fragments are migrated from a failed data storage resource (e.g., disk 160-1) to a destination data storage resource (e.g., disk 160-2) that is operational. Illustratively, a storage service node (e.g., 120-1) detects that a first data storage resource at the storage service node is out of operation (e.g., disk 160-1), wherein the first data storage resource hosts a first storage container that comprises a first EC fragment (e.g., 290) of a first data block. As shown for example in FIG. 2C, the first data block is stored in the distributed data storage system 100 according to an erasure coding scheme (e.g., EC 4+2), wherein when applied to the first data block the erasure coding scheme generates six EC fragments 290, including the first EC fragment at the failed data storage resource. As noted, distributed data storage system 100 comprises a plurality of storage service nodes (e.g., three) that are fewer than the six EC fragments. The storage service node 120-1, reconstructs the first data block according to the erasure coding scheme from a plurality, which is less than six, of EC fragments of the first data block (illustratively four EC fragments in the EC 4+2 scheme suffice for reconstruction of the data block), which are recovered by the storage service node 120-1 from storage service nodes of the distributed data storage system, e.g., 120-1, 120-2, and/or 120-3. The storage service node applies the erasure coding scheme to the reconstructed first data block to obtain the first EC fragment that was in the failed data storage resource, and causes the first EC fragment to be written to a destination data storage resource that is operational (e.g., disk 160-2). After the first EC fragment is successfully written to the destination data storage resource (e.g., disk 160-2), the distributed data storage system once again comprises the six EC segments of the first data block. Preferably, the six EC fragments of the first data block are distributed among a maximum number of storage service nodes (here three), fewer than the six EC fragments, in the distributed data storage system 100, and wherein only one instance of each of the six EC fragments of the first data block is stored in the distributed data storage system. Preferably, each one of the six EC fragments is hosted by a data storage resource (e.g., physical disk) that is separate from other data storage resources hosting others of the six EC fragments of the first data block, as depicted illustratively in FIG. 2C.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an example embodiment, a method for storing data in a distributed data storage system comprises: by a computing device comprising one or more hardware processors, wherein the computing device executes a storage proxy that intercepts read and write requests from an application: receiving from the application a write request comprising a first data block targeted to a first virtual disk in the distributed data storage system; determining that the first data block is to be stored according to an erasure coding scheme that defines a count of N data fragments and parity fragments for the first data block, wherein the distributed data storage system comprises a plurality of storage service nodes fewer than the count of N erasure-coded fragments, and wherein each storage service node comprises a plurality of physical data storage resources; transmitting a first write request to a first one of the plurality of storage service nodes, wherein the first write request comprises the first data block and indicates that the first data block is to be stored to an erasure-coded virtual disk that is associated with the first virtual disk; receiving a confirmation that the first data block was successfully written, based on the first one of the plurality of storage service nodes having received confirmations that each of the N erasure-coded fragments of the first data block was successfully stored at a physical data storage resource among the plurality of physical data storage resources; wherein only one instance of each of the N erasure-coded fragments of the first data block is stored in the distributed data storage system; wherein the N erasure-coded fragments of the first data block are distributed among all of the plurality of storage service nodes in the distributed data storage system; and wherein each one of the N erasure-coded fragments of the first data block is stored in a physical data storage resource that is separate from other physical data storage resources hosting others of the N erasure-coded fragments of the first data block. The above-recited embodiment wherein the N erasure-coded fragments of the first data block include D data fragments and P parity fragments; and further comprising: by the computing device, receiving from the application a read request for the first data block; determining that the first data block is stored in the erasure-coded virtual disk; causing the first one of the plurality of storage service nodes to obtain the first data block, wherein the first one of the plurality of storage service nodes reconstructs the first data block from a count of D of the N erasure-coded fragments of the first data block; receiving the reconstructed first data block from the first one of the plurality of storage service nodes; and transmitting the reconstructed first data block to the application in response to the read request.

The above-recited embodiment wherein based on the first virtual disk being configured for erasure coding, the computing device that executes the storage proxy: creates the erasure-coded virtual disk, and associates the erasure-coded virtual disk with the first virtual disk. The above-recited embodiment wherein based on the confirmation that the first data block was successfully written, the computing device that executes the storage proxy: confirms to the application that the first data block was successfully written to the distributed data storage system. The above-recited embodiment further comprising: by the computing device that executes the storage proxy: receiving from an application a write request comprising a second data block targeted to the first virtual disk in the distributed data storage system; transmitting a second write request to the first one of the plurality of storage service nodes, wherein the second write request comprises the second data block and indicates that the second data block is to be stored to the erasure-coded virtual disk that is associated with the first virtual disk; based on an indication that an attempt to write the second data block to the erasure-coded virtual disk failed, transmitting a third write request to the first one of the plurality of storage service nodes, wherein the third write request comprises the second data block and indicates that the second data block is to be stored to a replication-factor virtual disk that is associated with the erasure-coded virtual disk; receiving a confirmation that the second data block was successfully written, based on the first one of the plurality of storage service nodes having received confirmations that each of at least two instances of the second data block, in unfragmented form, was successfully stored at a physical data storage resource among the plurality of physical data storage resources, which is separate from other physical data storage resources that host others of the at least two instances of the second data block in unfragmented form; and wherein each of the at least two instances of the second data block in unfragmented form is stored in separate storage service nodes among the plurality of storage service nodes; and wherein, based on the confirmation that the second data block was successfully written, the computing device that executes the storage proxy confirms to the application that the second data block was successfully written to the distributed data storage system.

The above-recited embodiment further comprising: based on a failure to successfully store each of N erasure-coded fragments of a second data block within the distributed data storage system, causing at least two instances of the second data block, in unfragmented form, to be stored successfully within the distributed data storage system, wherein each of the at least two instances of the second data block is stored at a physical data storage resource, which is separate from other physical data storage resources that host others of the at least two instances of the second data block in unfragmented form; based on detecting that all of the plurality of storage service nodes are in service after the second data block was successfully written in unfragmented form: reading an instance of the second data block in unfragmented form, applying the erasure coding scheme to the second data block to generate N erasure-coded fragments of the second data block, causing each of the N erasure-coded fragments of the second data block to be stored at a physical data storage resource that is separate from other physical data storage resources hosting others of the N erasure-coded fragments of the second data block, receiving confirmations that each of the N erasure-coded fragments of the second data block was successfully stored, wherein only one instance of each of the N erasure-coded fragments of the second data block is stored in the distributed data storage system, wherein the N erasure-coded fragments of the second data block are distributed among the plurality of storage service nodes in the distributed data storage system; and after the N erasure-coded fragments of the second data block are successfully stored within the distributed data storage system, causing all instances of the second data block, in unfragmented form, to be deleted from the plurality of storage service nodes. The above-recited embodiment wherein the distributed data storage system comprises three storage service nodes, each storage service node comprising at least three physical data storage resources; and wherein the erasure coding scheme comprises four data fragments and two parity fragments, and wherein the count of N erasure-coded fragments is six. The above-recited embodiment wherein each physical data storage resource is configured in the distributed data storage system as a distinct storage pool.

The above-recited embodiment further comprising: by the computing device that executes the storage proxy: based on detecting that one of the plurality of storage service nodes is unavailable, skipping the first write request to the first one of the plurality of storage service nodes; transmitting a second write request to the first one of the plurality of storage service nodes, wherein the second write request comprises the first data block and indicates that the first data block is to be stored to a replication-factor virtual disk that is associated with the erasure-coded virtual disk; receiving a confirmation that the first data block was successfully written, based on the first one of the plurality of storage service nodes having received confirmations that each of at least two instances of the first data block, in unfragmented form, was successfully stored at a physical data storage resource among the plurality of physical data storage resources, which is separate from other physical data storage resources that host others of the at least two instances of the first data block in unfragmented form; and wherein each of the at least two instances of the first data block in unfragmented form is stored in separate storage service nodes among the plurality of storage service nodes. The above-recited embodiment further comprising: by the computing device that executes the storage proxy: based on detecting that all of the plurality of storage service nodes are available, reverting to transmitting subsequent write requests to one of the plurality of storage service nodes, indicating that data blocks in the subsequent write requests are to be stored according to the erasure coding scheme. The above-recited embodiment wherein the first one of the plurality of storage service nodes applies the erasure coding scheme to the first data block to generate the N erasure-coded fragments of the first data block.

According to another example embodiment, a distributed data storage system, which uses an erasure coding scheme, wherein a count of N erasure-coded fragments includes data fragments and parity fragments of a data block, comprises: a plurality of storage service nodes fewer than the count of N erasure-coded fragments, wherein each storage service node comprises a plurality of physical data storage resources; wherein a first one of the plurality of storage service nodes is configured to: receive from a computing device comprising one or more hardware processors, wherein the computing device executes a storage proxy that intercepts read and write requests from an application: a first write request that comprises a first data block that originated with the application and was addressed to a first virtual disk configured in the distributed data storage system, and wherein the first write request indicates that the first data block is to be stored to an erasure-coded virtual disk that is associated with the first virtual disk; apply the erasure coding scheme to the first data block, resulting in N erasure-coded fragments of the first data block; based on having received confirmation that each of the N erasure-coded fragments of the first data block was successfully stored at a physical data storage resource, transmit to the computing device that executes the storage proxy an indication that writing the first data block succeeded; wherein only one instance of each of the N erasure-coded fragments of the first data block is stored in the distributed data storage system; wherein the N erasure-coded fragments of the first data block are distributed among all of the plurality of storage service nodes in the distributed data storage system; and wherein each one of the N erasure-coded fragments of the first data block is stored in a physical data storage resource that is separate from other physical data storage resources hosting others of the N erasure-coded fragments of the first data block.

The above-recited embodiment wherein the first one of the plurality of storage service nodes is further configured to: receive from the computing device, a second write request that comprises a second data block, wherein the second write request indicates that the second data block is to be stored to a replication-factor virtual disk associated with the erasure-coded virtual disk; distribute at least two instances of the second data block, in unfragmented form, to at least two of the plurality of storage service nodes; based on receiving confirmations that each of the at least two instances of the first data block has been stored at a physical data storage resource, which is separate from other physical data storage resources that host others of the at least two instances of the first data block in unfragmented form, and wherein each of the at least two instances of the first data block in unfragmented form is stored in separate storage service nodes among the plurality of storage service nodes: transmit to the computing device a confirmation that the second data block was successfully written to the distributed data storage system. The above-recited embodiment wherein the first one of the plurality of storage service nodes is further configured to: based on detecting that one of the plurality of storage service nodes is unavailable, refrain from distributing an instance of the second data block, in unfragmented form, to the unavailable storage service node, and distribute the at least two instances of the second data block, in unfragmented form, to storage service nodes that are available. The above-recited embodiment wherein the first one of the plurality of storage service nodes is further configured to: report to the computing device a failed write of a given data block if only one of the plurality of storage service nodes is available for storing the given data block in unfragmented form. The above-recited embodiment wherein the first one of the plurality of storage service nodes is further configured to: report to the computing device a failed write of a given data block if: (i) fewer than N of the N erasure-coded fragments of the given data block were successfully stored and (ii) only one instance of the given data block in unfragmented form was successfully stored.

According to yet another example embodiment, a data storage appliance, which uses an erasure coding scheme, wherein a count of N erasure-coded fragments includes data fragments and parity fragments of a data block comprises: a plurality of storage service nodes fewer than the count of N erasure-coded fragments, wherein each storage service node comprises a plurality of physical data storage resources; wherein a first one of the plurality of storage service nodes is configured to: receive from a computing device comprising one or more hardware processors, wherein the computing device executes a storage proxy that intercepts read and write requests from an application: a first write request that comprises a first data block that originated with the application and was addressed to a first virtual disk configured in the data storage appliance, and wherein the first write request indicates that the first data block is to be stored to an erasure-coded virtual disk that is associated with the first virtual disk; apply the erasure coding scheme to the first data block, resulting in N erasure-coded fragments of the first data block; based on having failed to receive confirmations that each of the N erasure-coded fragments of the first data block was successfully stored at a physical data storage resource, transmit to the computing device that executes the storage proxy an indication that writing the first data block failed; receive from the computing device, a second write request that comprises the first data block, wherein the second write request indicates that the first data block is to be stored to a replication-factor virtual disk associated with the erasure-coded virtual disk; distribute at least two instances of the first data block, in unfragmented form, to at least two of the plurality of storage service nodes; based on receiving confirmations that each of the at least two instances of the first data block has been stored at a physical data storage resource, which is separate from other physical data storage resources that host others of the at least two instances of the first data block in unfragmented form, and wherein each of the at least two instances of the first data block in unfragmented form is stored in separate storage service nodes among the plurality of storage service nodes: transmit to the computing device a confirmation that the first data block was successfully written to the data storage appliance.

The above-recited embodiment wherein the plurality of storage service nodes is three, each storage service node comprising at least three physical data storage resources; and wherein the erasure coding scheme comprises four data fragments and two parity fragments, and wherein the count of N erasure-coded fragments is six. The above-recited embodiment wherein each physical data storage resource is configured as a distinct storage pool. 20. The above-recited embodiment wherein the first one of the plurality of storage service nodes is further configured to: report to the computing device a failed write of a given data block if one or more of: (a) only one of the plurality of storage service nodes is available among the plurality of storage service nodes, and (b) (i) fewer than N of the N erasure-coded fragments of the given data block were successfully stored and (ii) only one instance of the given data block in unfragmented form was successfully stored.

According to an illustrative embodiment, a data storage appliance, which uses an erasure coding scheme, wherein a count of N erasure-coded fragments includes data fragments and parity fragments of a data block, comprises: a plurality of storage service nodes fewer than the count of N, wherein each storage service node comprises a plurality of physical data storage resources, wherein a first one of the plurality of storage service nodes is configured to: based on a failure to successfully store each of N erasure-coded fragments of a first data block within the data storage appliance, cause at least two instances of the first data block, in unfragmented form, to be stored successfully within the data storage appliance, wherein each of the at least two instances of the first data block has been stored at a physical data storage resource, which is separate from other physical data storage resources that host others of the at least two instances of the first data block in unfragmented form; based on detecting that all of the plurality of storage service nodes are in service after the first data block was successfully written in unfragmented form: read an instance the first data block in unfragmented form, generate N erasure-coded fragments of the first data block by applying the erasure coding scheme, receive confirmations that each of the N erasure-coded fragments of the first data block was successfully stored at a physical data storage resource among the plurality of physical data storage resources, wherein only one instance of each of the N erasure-coded fragments of the first data block is stored in the data storage appliance, wherein the N erasure-coded fragments of the first data block are distributed among the plurality of storage service nodes in the data storage appliance, and wherein each one of the N erasure-coded fragments of the first data block is stored in a physical data storage resource that is separate from other physical data storage resources hosting others of the N erasure-coded fragments of the first data block. The above-recited embodiment wherein the first one of the plurality of storage service nodes is further configured to: after generating the N erasure-coded fragments of the first data block, cause each of the N erasure-coded fragments to be stored at a physical data storage resource that is separate from other physical data storage resources hosting others of the N erasure-coded fragments of the first data block. The above-recited embodiment wherein the first one of the plurality of storage service nodes is further configured to: after the N erasure-coded fragments of the first data block are successfully stored within the data storage appliance, cause all instances of the first data block, in unfragmented form, to be deleted from the plurality of storage service nodes. The above-recited embodiment wherein the first one of the plurality of storage service nodes is further configured to: wait a pre-determined interval of time before causing all instances of the first data block, in unfragmented form, to be deleted from the plurality of storage service nodes.

The above-recited embodiment wherein the first one of the plurality of storage service nodes is further configured to: cause a replication-factor virtual disk to be removed from the data storage appliance after all unfragmented data blocks in the replication-factor virtual disk, including the first data block in unfragmented form, have been deleted. The above-recited embodiment wherein the first one of the plurality of storage service nodes is further configured to: execute a healing process that identifies one or more data blocks stored in unfragmented form in a replication-factor virtual disk, including the first data block; wherein the first one of the plurality of storage service nodes uses the healing process to perform the read, the generate, and the receive operations, and to: after the N erasure-coded fragments of the first data block are generated, cause each of the N erasure-coded fragments to be stored within the data storage appliance, and after the N erasure-coded fragments of the first data block are successfully stored within the data storage appliance, cause all instances of the first data block, in unfragmented form, to be deleted from the data storage appliance. The above-recited embodiment wherein the healing process further performs: cause a replication-factor virtual disk to be removed from the data storage appliance after all unfragmented data blocks in the replication-factor virtual disk, including the first data block in unfragmented form, have been deleted. The above-recited embodiment wherein the first one of the plurality of storage service nodes is further configured to: cause the at least two instances of the first data block, in unfragmented form, to be stored in a replication-factor virtual disk, which is associated with an erasure-coded virtual disk for storing the N erasure-coded fragments of the first data block; wait a pre-determined amount of time before a healing process that executes at the first one of the plurality of storage service nodes identifies one or more data blocks stored in unfragmented form in the replication-factor virtual disk, including the first data block; to each of the one or more data blocks, apply the erasure coding scheme to generate N respective erasure-coded fragments; and cause the N respective erasure-coded fragments to be stored to the erasure-coded virtual disk, which is distributed among the plurality of storage service nodes. The above-recited embodiment wherein the plurality of storage service nodes is three, each storage service node comprising at least three physical data storage resources; and wherein the erasure coding scheme comprises four data fragments and two parity fragments, and wherein the count of N erasure-coded fragments is six. The above-recited embodiment wherein each physical data storage resource is configured as a distinct storage pool.

According to another illustrative embodiment, a method for healing failed erasure-coded write attempts in a distributed data storage system that uses an erasure coding scheme, wherein a count of N erasure-coded fragments includes data fragments and parity fragments of a data block comprises: by a first storage service node among a plurality of storage service nodes of the distributed data storage system, wherein the plurality of storage service nodes is fewer than the count of N, and wherein each storage service node comprises one or more hardware processors and a plurality of physical data storage resources: based on a failure to successfully store each of N erasure-coded fragments of a first data block within the distributed data storage system, causing at least two instances of the first data block, in unfragmented form, to be stored successfully within the distributed data storage system, wherein each of the at least two instances of the first data block is stored at a physical data storage resource, which is separate from other physical data storage resources that host others of the at least two instances of the first data block in unfragmented form; based on detecting that all of the plurality of storage service nodes are in service after the first data block was successfully written in unfragmented form: reading an instance of the first data block in unfragmented form, generating N erasure-coded fragments of the first data block by applying the erasure coding scheme, causing each of the N erasure-coded fragments to be stored at a physical data storage resource that is separate from other physical data storage resources hosting others of the N erasure-coded fragments of the first data block, receiving confirmations that each of the N erasure-coded fragments of the first data block was successfully stored, wherein only one instance of each of the N erasure-coded fragments of the first data block is stored in the distributed data storage system, wherein the N erasure-coded fragments of the first data block are distributed among the plurality of storage service nodes in the distributed data storage system. The above-recited embodiment further comprising: after the N erasure-coded fragments of the first data block are successfully stored within the distributed data storage system, causing all instances of the first data block, in unfragmented form, to be deleted from the plurality of storage service nodes. The above-recited embodiment further comprising: waiting a pre-determined interval of time before causing all instances of the first data block, in unfragmented form, to be deleted from the plurality of storage service nodes.

The above-recited embodiment further comprising: causing a replication-factor virtual disk to be removed from the distributed data storage system after all unfragmented data blocks in the replication-factor virtual disk, including the first data block in unfragmented form, have been deleted. The above-recited embodiment wherein the first storage service node executes a healing process that detects that all of the plurality of storage service nodes are in service and performs the reading, the generating, the causing, and the receiving. The above-recited embodiment further comprising: executing a healing process that identifies one or more data blocks stored in unfragmented form in a replication-factor virtual disk, including the first data block; wherein the healing process performs the reading, the generating, the causing, and the receiving, and further performs: after the N erasure-coded fragments of the first data block are generated, causing each of the N erasure-coded fragments to be stored within the distributed data storage system, and after the N erasure-coded fragments of the first data block are successfully stored within the distributed data storage system, causing all instances of the first data block, in unfragmented form, to be deleted from the distributed data storage system. The above-recited embodiment wherein the healing process further performs: causing a replication-factor virtual disk to be removed from the distributed data storage system after all unfragmented data blocks in the replication-factor virtual disk, including the first data block in unfragmented form, have been deleted. The above-recited embodiment further comprising: causing the at least two instances of the first data block, in unfragmented form, to be stored in a replication-factor virtual disk, which is associated with an erasure-coded virtual disk for storing the N erasure-coded fragments of the first data block; waiting a pre-determined amount of time before identifying one or more data blocks stored in unfragmented form in the replication-factor virtual disk, including the first data block; to each of the one or more data blocks, applying the erasure coding scheme to generate N respective erasure-coded fragments; and causing the N respective erasure-coded fragments to be stored to the erasure-coded virtual disk, which is distributed among the plurality of storage service nodes.

The above-recited embodiment wherein the plurality of storage service nodes is three, each storage service node comprising at least three physical data storage resources; and wherein the erasure coding scheme comprises four data fragments and two parity fragments, and wherein the count of N erasure-coded fragments is six. The above-recited embodiment wherein the failure to successfully store each of the N erasure-coded fragments of the first data block within the distributed data storage system is based on one or more of: (a) fewer than all of the plurality of storage service nodes being available, and (b) receiving fewer than N confirmations that each of the N erasure-coded fragments has been successfully stored at a physical data storage resource, and (c) receiving fewer than a replication factor of confirmations that metadata for all of the N erasure-coded fragments has been successfully stored within the distributed data storage system.

The above-recited embodiment further comprising: by the computing device that executes the storage proxy: after the second data block was successfully written in unfragmented form, detecting that all of the plurality of storage service nodes are in service; applying the erasure coding scheme to the second data block to generate N erasure-coded fragments of the second data block; causing each of the N erasure-coded fragments of the second data block to be stored within the erasure-coded virtual disk; wherein the N erasure-coded fragments of the second data block are distributed among all of the plurality of storage service nodes in the distributed data storage system; and wherein each one of the N erasure-coded fragments of the second data block is stored in a data storage resource that is separate from other data storage resources hosting others of the N erasure-coded fragments of the second data block. The above-recited embodiment further comprising: after the N erasure-coded fragments of the second data block are written, causing, by one of the plurality of storage service nodes, all instances of the second data block, in unfragmented form, to be deleted from the plurality of storage service nodes. The above-recited embodiment further comprising: causing the replication-factor virtual disk to be removed from the distributed data storage system after all unfragmented data blocks in the replication-factor virtual disk have been deleted. The above-recited embodiment wherein the distributed data storage system comprises three storage service nodes, each storage service node comprising at least three physical data storage resources; and wherein the erasure coding scheme comprises four data fragments and two parity fragments, and wherein the count of N erasure-coded fragments is six. The above-recited embodiment wherein each data storage resource is configured in the distributed data storage system as a distinct storage pool. The above-recited embodiment further comprising: by the computing device that executes the storage proxy: based on detecting that one of the plurality of storage service nodes is unavailable, skipping the first write request to the first one of the plurality of storage service nodes; transmitting a second write request to the first one of the plurality of storage service nodes, wherein the second write request comprises the first data block and indicates that the first data block is to be stored to a replication-factor virtual disk that is associated with the erasure-coded virtual disk; receiving a confirmation that the first data block was successfully written, based on the first one of the plurality of storage service nodes having received confirmations that each of at least two instances of the first data block, in unfragmented form, was successfully stored at a data storage resource among the plurality of physical data storage resources, which is separate from other data storage resources that host the others of the at least two instances of the first data block in unfragmented form; and wherein each of the at least two instances of the first data block in unfragmented form is stored in separate storage service nodes among the plurality of storage service nodes. The above-recited embodiment wherein the first one of the plurality of storage service nodes applies the erasure coding scheme to the first data block to generate the N erasure-coded fragments of the first data block. The above-recited embodiment further comprising: after the N erasure-coded fragments of the first data block are written, causing, by one of the plurality of storage service nodes, all instances of the first data block, in unfragmented form, to be deleted from the plurality of storage service nodes.

According to an example embodiment, a method of migrating erasure-coded data fragments from a failed physical data storage resource to a destination physical data storage resource that is operational in a distributed data storage system, comprises: by a storage service node among a plurality of storage service nodes of the distributed data storage system, wherein the storage service node comprises one or more hardware processors and one or more physical data storage resources: detecting that a first physical data storage resource at the storage service node is out of operation, wherein a first erasure-coded fragment of a first data block is stored in the first physical data storage resource, wherein the first data block is stored in the distributed data storage system according to an erasure coding scheme that generates N erasure-coded fragments when applied to the first data block, including the first erasure-coded fragment, wherein N includes D data fragments and P parity fragments of the first data block, and wherein the plurality of storage service nodes is fewer than the N erasure-coded fragments; recovering a count of D erasure-coded fragments of the first data block from among N−1 erasure-coded fragments of the first data block that are available from operational physical data storage resources other than the first physical data storage resource; reconstructing the first data block according to the erasure coding scheme from the recovered D erasure-coded fragments of the first data block; applying the erasure coding scheme to the reconstructed first data block to obtain the first erasure-coded fragment of the first data block; causing the first erasure-coded fragment to be written to a destination physical data storage resource that is operational in the distributed data storage system; and wherein after the first erasure-coded fragment is successfully written to the destination physical data storage resource, all N erasure-coded fragments of the first data block are available to be read from the distributed data storage system.

The above-recited embodiment wherein only one instance of each of the N erasure-coded fragments of the first data block is stored in the distributed data storage system; wherein the N erasure-coded fragments of the first data block are distributed among all of the plurality of storage service nodes in the distributed data storage system; and wherein each one of the N erasure-coded fragments of the first data block is stored in a physical data storage resource that is separate from other physical data storage resources hosting others of the N erasure-coded fragments of the first data block. The above-recited embodiment wherein the distributed data storage system comprises three storage service nodes, each storage service node comprising at least three physical data storage resources; and wherein the erasure coding scheme comprises four data fragments and two parity fragments, and wherein the count of N erasure-coded fragments is six. The above-recited embodiment wherein each physical data storage resource is configured in the distributed data storage system as a distinct storage pool, and wherein the first physical data storage resource and the destination physical data storage resource are configured as distinct storage pools in the distributed data storage system. The above-recited embodiment wherein the first erasure-coded fragment of the first data block is migrated by being successfully written to the destination physical data storage resource. The above-recited embodiment wherein the N erasure-coded fragments of the first data block are stored in an erasure-coded virtual disk maintained internally by the distributed data storage system, wherein the erasure-coded virtual disk is associated with a user virtual disk administered for erasure-coding, and wherein read requests and write commands for the first data block that arrive at the distributed data storage system are addressed to the user virtual disk. The above-recited embodiment further comprising: by a computing device comprising one or more hardware processors, wherein the computing device executes a storage proxy that intercepts read and write requests from an application: receiving from the application a read request for the first data block; determining that the first data block is stored in N erasure-coded fragments; causing the first one of the plurality of storage service nodes to obtain the first data block, wherein the first one of the of the plurality of storage service nodes reconstructs the first data block from a count of D of the N erasure-coded fragments of the first data block; receiving the reconstructed first data block from the first one of the plurality of storage service nodes; and transmitting the reconstructed first data block to the application in response to the read request.

The above-recited embodiment further comprising: by the first one of the plurality of storage service nodes: after the first erasure-coded fragment is successfully written to the destination physical data storage resource and the N erasure-coded fragments of the first data block are available to be read from the distributed data storage system, causing all instances of the first data block, in unfragmented form, to be deleted from the plurality of storage service nodes. The above-recited embodiment wherein a metadata subsystem at one of the plurality of storage service nodes indicates that the first erasure-coded fragment of the first data block was stored in the first physical data storage resource that is out of operation. The above-recited embodiment wherein a metadata subsystem at one of the plurality of storage service nodes indicates that the first erasure-coded fragment of the first data block was stored in the first physical data storage resource that is out of operation; and wherein after the first erasure-coded fragment is successfully written to the destination physical data storage resource, the metadata subsystem is updated to indicate that the first erasure-coded fragment of the first data block is stored at the destination physical data storage resource.

According to another example embodiment, a distributed data storage system for migrating erasure-coded data fragments from a failed physical data storage resource to a destination physical data storage resource that is operational, comprises: a plurality of storage service nodes fewer than a count of N erasure-coded fragments, wherein each storage service node comprises a plurality of physical data storage resources; wherein a first one of the plurality of storage service nodes is configured to: detect that a first physical data storage resource at the storage service node is failed, wherein a first erasure-coded fragment of a first data block is stored in the first physical data storage resource, wherein the first data block is stored in the distributed data storage system according to an erasure coding scheme that generates N erasure-coded fragments when applied to the first data block, including the first erasure-coded fragment, wherein N includes D data fragments and P parity fragments of the first data block, and wherein the plurality of storage service nodes is fewer than the N erasure-coded fragments; obtain a count of D erasure-coded fragments of the first data block from among N−1 erasure-coded fragments of the first data block that are available from operational physical data storage resources other than the first physical data storage resource; reconstruct the first data block according to the erasure coding scheme from the obtained D erasure-coded fragments of the first data block; apply the erasure coding scheme to the reconstructed first data block to obtain the first erasure-coded fragment of the first data block; cause the first erasure-coded fragment to be written to a destination physical data storage resource that is operational in the distributed data storage system; and wherein after the first erasure-coded fragment is successfully written to the destination physical data storage resource, all N erasure-coded fragments of the first data block are available to be read from the distributed data storage system. The above-recited embodiment wherein only one instance of each of the N erasure-coded fragments of the first data block is stored in the distributed data storage system; wherein the N erasure-coded fragments of the first data block are distributed among all of the plurality of storage service nodes in the distributed data storage system; and wherein each one of the N erasure-coded fragments of the first data block is stored in a physical data storage resource that is separate from other physical data storage resources hosting others of the N erasure-coded fragments of the first data block. The above-recited embodiment wherein the distributed data storage system comprises three storage service nodes, each storage service node comprising at least three physical data storage resources; and wherein the erasure coding scheme comprises four data fragments and two parity fragments, and wherein the count of N erasure-coded fragments is six.

The above-recited embodiment wherein each physical data storage resource is configured in the distributed data storage system as a distinct storage pool, and wherein the first physical data storage resource and the destination physical data storage resource are configured as distinct storage pools in the distributed data storage system. The above-recited embodiment wherein the first erasure-coded fragment of the first data block is migrated by being successfully written to the destination physical data storage resource. The above-recited embodiment wherein the N erasure-coded fragments of the first data block are stored in an erasure-coded virtual disk maintained internally by the distributed data storage system, wherein the erasure-coded virtual disk is associated with a user virtual disk administered for erasure-coding, and wherein read requests and write commands for the first data block that arrive at the distributed data storage system are addressed to the user virtual disk. The above-recited embodiment further comprising: a computing device comprising one or more hardware processors, wherein the computing device executes a storage proxy that intercepts read and write requests from an application; and wherein the computing device is configured to: receive from the application a read request for the first data block; determine that the first data block is stored in N erasure-coded fragments; cause the first one of the plurality of storage service nodes to obtain the first data block, wherein the first one of the plurality of storage service nodes reconstructs the first data block from a count of D of the N erasure-coded fragments of the first data block; receive the reconstructed first data block from the first one of the plurality of storage service nodes; and transmit the reconstructed first data block to the application in response to the read request. The above-recited embodiment wherein the first one of the plurality of storage service nodes is further configured to: after the first erasure-coded fragment is successfully written to the destination physical data storage resource and the N erasure-coded fragments of the first data block are available to be read from the distributed data storage system, cause all instances of the first data block, in unfragmented form, to be deleted from the plurality of storage service nodes. The above-recited embodiment wherein a metadata subsystem at one of the plurality of storage service nodes indicates that the first erasure-coded fragment of the first data block was stored in the first physical data storage resource that is out of operation. The above-recited embodiment wherein a metadata subsystem at one of the plurality of storage service nodes indicates that the first erasure-coded fragment of the first data block was stored in the first physical data storage resource that is out of operation; and wherein after the first erasure-coded fragment is successfully written to the destination physical data storage resource, the metadata subsystem is updated to indicate that the first erasure-coded fragment of the first data block is stored at the destination physical data storage resource.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for storing data in a distributed data storage system, the method comprising:
  by a computing device comprising one or more hardware processors, wherein the computing device executes a storage proxy that intercepts read and write requests from an application:
  receiving from the application a write request comprising a first data block targeted to a first virtual disk in the distributed data storage system;
  determining that the first data block is to be stored according to a Reed-Solomon erasure coding scheme that, for the first data block, generates a count of N erasure-coded fragments,
    wherein the count of N consists of D data fragments and P_parity fragments generated from the first data block,
    wherein the distributed data storage system comprises a plurality of storage service nodes fewer than the count of N, and
    wherein each storage service node comprises a plurality of physical data storage resources;
  transmitting a first write request to a first one of the plurality of storage service nodes, wherein the first write request comprises the first data block and indicates that the first data block is to be stored in an erasure-coded virtual disk in the distributed data storage system,
    wherein the erasure-coded virtual disk is associated with the first virtual disk,
    wherein one of the plurality of storage service nodes is configured to apply the Reed-Solomon erasure coding scheme to the first data block, resulting in the count of N erasure-coded fragments of the first data block; and receiving a confirmation that the first data block was successfully written, based on the first one of the plurality of storage service nodes having received confirmations that each of the N erasure-coded fragments of the first data block was successfully stored at a physical data storage resource among the plurality of physical data storage resources;

wherein only one instance of each of the N erasure-coded fragments of the first data block is stored in the distributed data storage system;

wherein the N erasure-coded fragments of the first data block are distributed among the plurality of storage service nodes in the distributed data storage system; and wherein each one of the N erasure-coded fragments of the first data block is stored in a physical data storage resource that is separate from other physical data storage resources hosting others of the N erasure-coded fragments of the first data block.

2. The method of claim 1, further comprising:
by the computing device, receiving from the application a read request for the first data block;
determining that the first data block is stored in the erasure-coded virtual disk;
causing the first one of the plurality of storage service nodes to obtain the first data block, wherein the first one of the plurality of storage service nodes reconstructs the first data block from a count of D of the N erasure-coded fragments of the first data block;
receiving the reconstructed first data block from the first one of the plurality of storage service nodes; and
transmitting the reconstructed first data block to the application in response to the read request.

3. The method of claim 1, wherein based on the first virtual disk being configured for erasure coding, the computing device that executes the storage proxy: creates the erasure-coded virtual disk, and associates the erasure-coded virtual disk with the first virtual disk.

4. The method of claim 1, wherein based on the confirmation that the first data block was successfully written, the computing device that executes the storage proxy: confirms to the application that the first data block was successfully written to the distributed data storage system.

5. The method of claim 1 further comprising:
by the computing device that executes the storage proxy:
receiving from an application a write request comprising a second data block targeted to the first virtual disk in the distributed data storage system;
transmitting a second write request to the first one of the plurality of storage service nodes, wherein the second write request comprises the second data block and indicates that the second data block is to be stored in the erasure-coded virtual disk that is associated with the first virtual disk;
based on an indication that an attempt to write the second data block to the erasure-coded virtual disk failed, transmitting a third write request to the first one of the plurality of storage service nodes,
wherein the third write request comprises the second data block and indicates that the second data block is to be stored in a replication-factor virtual disk that is associated with the erasure-coded virtual disk;
receiving a confirmation that the second data block was successfully written, based on the first one of the plurality of storage service nodes having received confirmations that each of at least two instances of the second data block, in unfragmented form, was successfully stored at a physical data storage resource among the plurality of physical data storage resources, which is separate from other physical data storage resources that host others of the at least two instances of the second data block in unfragmented form; and
wherein each of the at least two instances of the second data block in unfragmented form is stored in separate storage service nodes among the plurality of storage service nodes; and
wherein, based on the confirmation that the second data block was successfully written, the computing device that executes the storage proxy confirms to the application that the second data block was successfully written to the distributed data storage system.

6. The method of claim 1 further comprising:
based on a failure to successfully store each of N erasure-coded fragments of a second data block within the distributed data storage system, causing at least two instances of the second data block, in unfragmented form, to be stored successfully within the distributed data storage system,
wherein each of the at least two instances of the second data block is stored at a physical data storage resource, which is separate from other physical data storage resources that host others of the at least two instances of the second data block in unfragmented form;
based on detecting that all of the plurality of storage service nodes are in service after the second data block was successfully written in unfragmented form:
reading an instance of the second data block in unfragmented form,
applying the Reed-Solomon erasure coding scheme to the second data block to generate N erasure-coded fragments of the second data block,
causing each of the N erasure-coded fragments of the second data block to be stored at a physical data storage resource that is separate from other physical data storage resources hosting others of the N erasure-coded fragments of the second data block,
receiving confirmations that each of the N erasure-coded fragments of the second data block was successfully stored,
wherein only one instance of each of the N erasure-coded fragments of the second data block is stored in the distributed data storage system,
wherein the N erasure-coded fragments of the second data block are distributed among the plurality of storage service nodes in the distributed data storage system; and
after the N erasure-coded fragments of the second data block are successfully stored within the distributed data storage system, causing all instances of the second data block, in unfragmented form, to be deleted from the plurality of storage service nodes.

7. The method of claim 1, wherein the distributed data storage system comprises three storage service nodes, each storage service node comprising at least three physical data storage resources; and
wherein the Reed-Solomon erasure coding scheme generates four data fragments and two parity fragments, and wherein the count of N erasure-coded fragments is six.

8. The method of claim 1, wherein each physical data storage resource is configured in the distributed data storage system as a distinct storage pool.

9. The method of claim 1, further comprising:
by the computing device that executes the storage proxy:
based on detecting that one of the plurality of storage service nodes is unavailable, skipping the first write request to the first one of the plurality of storage service nodes;
transmitting a second write request to the first one of the plurality of storage service nodes,
wherein the second write request comprises the first data block and indicates that the first data block is to be stored in a replication-factor virtual disk that is associated with the erasure-coded virtual disk;
receiving a confirmation that the first data block was successfully written, based on the first one of the plurality of storage service nodes having received confirmations that each of at least two instances of the first data block, in unfragmented form, was successfully stored at a physical data storage resource among the plurality of physical data storage resources, which is separate from other physical data storage resources that host others of the at least two instances of the first data block in unfragmented form; and
wherein each of the at least two instances of the first data block in unfragmented form is stored in separate storage service nodes among the plurality of storage service nodes.

10. The method of claim 9, further comprising:
by the computing device that executes the storage proxy:
based on detecting that all of the plurality of storage service nodes are available, reverting to transmitting subsequent write requests to one of the plurality of storage service nodes, indicating that data blocks in the subsequent write requests are to be stored according to the Reed-Solomon erasure coding scheme.

11. The method of claim 1, wherein the first one of the plurality of storage service nodes applies the Reed-Solomon erasure coding scheme to the first data block to generate the N erasure-coded fragments of the first data block.

12. A distributed data storage system using a Reed-Solomon erasure coding scheme, wherein a count of N erasure-coded fragments consists of D data fragments and P parity fragments generated from a data block, the distributed data storage system comprising:
a plurality of storage service nodes fewer than the count of N,
wherein each storage service node comprises a plurality of physical data storage resources;
wherein a first one of the plurality of storage service nodes is configured to:
receive from a computing device comprising one or more hardware processors, wherein the computing device executes a storage proxy that intercepts read and write requests from an application: a first write request that comprises a first data block that originated with the application and was addressed to a first virtual disk configured in the distributed data storage system, and wherein the first write request indicates that the first data block is to be stored in an erasure-coded virtual disk that is associated with the first virtual disk;
apply the Reed-Solomon erasure coding scheme to the first data block, resulting in N erasure-coded fragments of the first data block;
based on having received confirmation that each of the N erasure-coded fragments of the first data block was successfully stored at a physical data storage resource, transmit to the computing device that executes the storage proxy an indication that writing the first data block succeeded;
wherein only one instance of each of the N erasure-coded fragments of the first data block is stored in the distributed data storage system;
wherein the N erasure-coded fragments of the first data block are distributed among the plurality of storage service nodes in the distributed data storage system; and
wherein each one of the N erasure-coded fragments of the first data block is stored in a physical data storage resource that is separate from other physical data storage resources hosting others of the N erasure-coded fragments of the first data block.

13. The distributed data storage system of claim 12, wherein the first one of the plurality of storage service nodes is further configured to:
receive from the computing device, a second write request that comprises a second data block, wherein the second write request indicates that the second data block is to be stored in a replication-factor virtual disk associated with the erasure-coded virtual disk;
distribute at least two instances of the second data block, in unfragmented form, to at least two of the plurality of storage service nodes; and
based on receiving confirmations that each of the at least two instances of the first data block has been stored at a physical data storage resource, which is separate from other physical data storage resources that host others of the at least two instances of the first data block in unfragmented form, and wherein each of the at least two instances of the first data block in unfragmented form is stored in separate storage service nodes among the plurality of storage service nodes: transmit to the computing device a confirmation that the second data block was successfully written into the distributed data storage system.

14. The distributed data storage system of claim 13, wherein the first one of the plurality of storage service nodes is further configured to: based on detecting that one of the plurality of storage service nodes is unavailable, refrain from distributing an instance of the second data block, in unfragmented form, to the unavailable storage service node, and distribute the at least two instances of the second data block, in unfragmented form, to storage service nodes that are available.

15. The distributed data storage system of claim 12, wherein the first one of the plurality of storage service nodes is further configured to: report to the computing device a failed write of a given data block if only one of the plurality of storage service nodes is available for storing the given data block in unfragmented form.

16. The distributed data storage system of claim 12, wherein the first one of the plurality of storage service nodes is further configured to: report to the computing device a failed write of a given data block if: (i) fewer than N of the N erasure-coded fragments of the given data block were successfully stored and (ii) only one instance of the given data block in unfragmented form was successfully stored.

17. A data storage appliance using an erasure coding scheme that generates a count of N erasure-coded fragments including data fragments and parity fragments of a data block, the data storage appliance comprising:

a plurality of storage service nodes fewer than the count of N erasure-coded fragments, wherein each storage service node comprises a plurality of physical data storage resources;

wherein a first one of the plurality of storage service nodes is configured to:
- receive from a computing device comprising one or more hardware processors, wherein the computing device executes a storage proxy that intercepts read and write requests from an application: a first write request that comprises a first data block that originated with the application and was addressed to a first virtual disk configured in the data storage appliance, and wherein the first write request indicates that the first data block is to be stored in an erasure-coded virtual disk that is associated with the first virtual disk;
- apply the erasure coding scheme to the first data block, resulting in N erasure-coded fragments of the first data block;
- based on having failed to receive confirmations that each of the N erasure-coded fragments of the first data block was successfully stored at a physical data storage resource, transmit to the computing device that executes the storage proxy an indication that writing the first data block failed;
- receive from the computing device, a second write request that comprises the first data block, wherein the second write request indicates that the first data block is to be stored in a replication-factor virtual disk associated with the erasure-coded virtual disk;
- distribute at least two instances of the first data block, in unfragmented form, to at least two of the plurality of storage service nodes;
- based on receiving confirmations that each of the at least two instances of the first data block has been stored at a physical data storage resource, which is separate from other physical data storage resources that host others of the at least two instances of the first data block in unfragmented form, and wherein each of the at least two instances of the first data block in unfragmented form is stored in separate storage service nodes among the plurality of storage service nodes: transmit to the computing device a confirmation that the first data block was successfully written in the data storage appliance.

18. The data storage appliance of claim 17, wherein the plurality of storage service nodes is three storage service nodes, and wherein each of the three storage service nodes comprises at least three physical data storage resources; and wherein the erasure coding scheme comprises four data fragments and two parity fragments, and wherein the count of N erasure-coded fragments is six.

19. The data storage appliance of claim 17, wherein each physical data storage resource is configured as a distinct storage pool.

20. The data storage appliance of claim 17, wherein the first one of the plurality of storage service nodes is further configured to: report to the computing device a failed write of a given data block if one or more of:
- (a) only one of the plurality of storage service nodes is available among the plurality of storage service nodes, and
- (b) (i) fewer than N of the N erasure-coded fragments of the given data block were successfully stored and (ii) only one instance of the given data block in unfragmented form was successfully stored.

* * * * *